US 8,346,932 B1
Jan. 1, 2013

(12) United States Patent
Holland et al.

(10) Patent No.: US 8,346,932 B1
(45) Date of Patent: Jan. 1, 2013

(54) SYSTEM FOR PROVIDING INTEGRATED VOICE AND DATA SERVICES

(75) Inventors: Phil Holland, North Vancouver (CA); Jeff Brace, Coquitlam (CA); Henk Spaay, Vancouver (CA); Martin Leonard, North Vancouver (CA); Peter Donald Baker, North Vancouver (CA); Michael Sample, North Vancouver (CA)

(73) Assignee: Sutus, Inc., North Vancouver, BC (CA)

( * ) Notice: Subject to any disclaimer, the term of this patent is extended or adjusted under 35 U.S.C. 154(b) by 1065 days.

(21) Appl. No.: 12/183,024

(22) Filed: Jul. 30, 2008

Related U.S. Application Data

(60) Provisional application No. 60/953,156, filed on Jul. 31, 2007.

(51) Int. Cl.
*G06F 15/173* (2006.01)
(52) U.S. Cl. .......................... 709/226; 370/401; 709/220
(58) Field of Classification Search .................. 709/206, 709/204, 223–224, 226, 220; 379/88.22, 379/88.13, 88.12; 370/356, 401; 455/466
See application file for complete search history.

(56) References Cited

U.S. PATENT DOCUMENTS

| | | | |
|---|---|---|---|
| 5,960,348 A | 9/1999 | Eisdorfer et al. | |
| 6,333,973 B1 * | 12/2001 | Smith et al. ................ | 379/88.12 |
| 6,469,201 B1 | 10/2002 | Martin et al. | |
| 7,194,080 B2 | 3/2007 | Worsham et al. | |
| 7,286,990 B1 | 10/2007 | Edmonds et al. | |
| 7,886,048 B1 * | 2/2011 | Holland et al. ............... | 709/224 |
| 2002/0010781 A1 | 1/2002 | Tuatini | |
| 2003/0037136 A1 * | 2/2003 | Labovitz et al. ............. | 709/224 |
| 2004/0030750 A1 * | 2/2004 | Moore et al. .................. | 709/204 |
| 2004/0128354 A1 | 7/2004 | Horikiri et al. | |
| 2004/0181457 A1 | 9/2004 | Biebesheimer et al. | |
| 2004/0236818 A1 | 11/2004 | Bantz et al. | |
| 2004/0267623 A1 | 12/2004 | Vivadelli et al. | |
| 2005/0232402 A1 | 10/2005 | Greve | |
| 2006/0025113 A1 | 2/2006 | Nguyen et al. | |
| 2006/0067501 A1 | 3/2006 | Piatt | |
| 2006/0069656 A1 | 3/2006 | Horikiri | |
| 2006/0177025 A1 * | 8/2006 | Frifeldt et al. ............. | 379/88.22 |
| 2006/0206629 A1 | 9/2006 | Sasaki et al. | |
| 2006/0259564 A1 * | 11/2006 | Stark et al. .................... | 709/206 |

(Continued)

OTHER PUBLICATIONS

Office Action dated May 19, 2010 in U.S. Appl. No. 12/183,026 in 15 pages.

(Continued)

*Primary Examiner* — Jungwon Chang
(74) *Attorney, Agent, or Firm* — Knobbe, Martens, Olson & Bear LLP

(57) ABSTRACT

Embodiments of the use case-based management system enable non-technical users to manage devices, resources, and services that are remote to the premises where their integrated system management devices, applications, or appliances are located. This permits users to subscribe to remote voice, data, and other services without having to first configure their local equipment to ensure proper acceptance of these services. The users can simply select the desired remote services in the use case-based management system, enter a minimum amount of non-technical information such as account information provided by the service provider, and enable the service. The use case-based management system automatically creates generalized system management requests and passes them externally to the proper remote service, resource, or device managers, which then translate and broker these requests into proper low-level commands. Example remote services that can be managed include domain and sub-domain registration services, email seconding services, and Internet telephony services.

16 Claims, 38 Drawing Sheets

U.S. PATENT DOCUMENTS

| | | | |
|---|---|---|---|
| 2007/0083625 | A1 | 4/2007 | Chamdani et al. |
| 2007/0124373 | A1 | 5/2007 | Chatterjee et al. |
| 2007/0171899 | A1* | 7/2007 | Schroeder et al. ............ 370/356 |
| 2007/0180060 | A1* | 8/2007 | Patel et al. .................... 709/219 |
| 2007/0239429 | A1 | 10/2007 | Johnson et al. |
| 2007/0239859 | A1 | 10/2007 | Wilkinson et al. |
| 2007/0286237 | A1 | 12/2007 | Mallya |
| 2007/0294632 | A1 | 12/2007 | Toyama et al. |
| 2008/0095331 | A1 | 4/2008 | Wlasiuk |
| 2008/0151766 | A1 | 6/2008 | Khasnabish et al. |
| 2008/0155023 | A1* | 6/2008 | Kadashevich ................ 709/206 |
| 2008/0198979 | A1* | 8/2008 | Skakkebaek et al. ...... 379/88.13 |
| 2009/0013043 | A1 | 1/2009 | Tan |
| 2009/0019141 | A1* | 1/2009 | Bush et al. .................... 709/223 |
| 2009/0325609 | A1* | 12/2009 | Rosen et al. .................. 455/466 |
| 2010/0030734 | A1 | 2/2010 | Chunilal |

OTHER PUBLICATIONS

Office Communication dated Aug. 23, 2010 in U.S. Appl. No. 12/183,015 in 2 pages.

Notice of Allowance dated Oct. 7, 2010 in U.S. Appl. No. 12/183,015 in 9 pages.

* cited by examiner

SYSTEM FOR PROVIDING INTEGRATED VOICE AND DATA SERVICES

CROSS-REFERENCE TO RELATED APPLICATIONS

This application claims priority to U.S. Provisional Patent Application No. 60/953,156 filed on Jul. 31, 2007, entitled "System and Method of Managing Integrated Systems with Use Cases," the entire contents of which are hereby incorporated herein by reference in their entirety. All publications and patent applications mentioned in this specification are herein incorporated by reference in their entirety to the same extent as if each individual publication or patent application was specifically and individually indicated to be incorporated by reference.

BACKGROUND

1. Field

This disclosure relates to integrated systems, and in particular to systems and methods for managing and configuring integrated data, networking, and communication systems.

2. Description of Related Art

Modern integrated systems, such as integrated voice and data (Information Technology) IT systems, are technically too complex for typical end users to install, manage, and configure without expert assistance. These systems often integrate a number of local or remote managed entities (e.g., services, resources, hardware, and devices), each of which must be configured and managed individually. The rise in popularity of these systems has necessitated the need for a large number of IT professionals to manage them. However, many small organizations cannot afford the costs of hiring these professionals, and as such, these organizations often opt for less capable or customized integrated systems. Even for organizations that can afford professional assistance, the complexity of these integrated systems often impose high overhead costs and disruptive periodic maintenance downtime.

SUMMARY OF THE DISCLOSURE

Embodiments of the disclosure include systems and methods for managing integrated systems with use cases that vastly simplify the tasks of integrating and maintaining integrated systems. In one embodiment, a use case-based management system directly presents a set of relevant use cases implemented as an integrated interactive Graphical User Interface framework. The use case GUIs allow the dynamic manipulation of the underlying use case models, which are charged with manipulating the underlying technical configuration of the integrated systems. The user is in this way presented configuration and management tasks with intuitive user interfaces and with a language that is relevant to the user's perceived task at hand rather than the unfamiliar technical language of the underlying system. The high-level, non-technical, user input from these interfaces is translated by the use case-based management system into lower level generalized system management requests for the underlying system and to the technical language of each service, resource, or devices in the integrated system by related low level managers that are also part of the use case-based management system.

One embodiment is a use case-based management system that enables non-technical users to install, manage, and configure integrated Information Technology (IT) systems without additional learning or professional assistance. The use case-based management system is preferably executed on an integrated system management appliance, which may be a server, a group of servers, or a hardware appliance or device with embedded voice, data, and/or network services and devices. Although the use case-based management system is applicable as a general management system for integrated systems of various sizes and applications, it is particularly valuable for managing small business integrated systems with converged data, voice and other capabilities and features. For these small business integrated systems, the use case-based management system may be a software application executed on an integrated system management appliance such as a server or an appliance that communicates with or embedded with the various components of an integrated system. Even for those organizations that rely on professionals to manage their integrated systems, the use case-based management system can dramatically lower the specialized training required of these professionals and enable them to focus on tailoring the integrated systems to fit the organizations' and the end users' needs.

In one embodiment, the use case-based management system is integrated with network infrastructure, voice, and data devices/services into a single integrated system management appliance named the multiple services router. While the single appliance setup offers great physical and connectivity simplification, the individual hardware and software components remain sophisticated, and in various embodiments are scaled down versions of highly technical enterprise components. The addition of a use case-based management system makes these single appliance embodiments cost effective by enabling the installation, configuration, and management of these systems to be performed without detailed technical knowledge. For example, upon first installation, default use cases that are tailored to the expected usage of a small business are automatically loaded so that basic services can be quickly set up without any or much user input. This may include setting up shared Internet access, enabling telephones to receive and place calls, and establishing a corporate presence on the Internet through the assignment of a public IP address and domain name. In addition, the use case-based management system is tailored to provide user interfaces that simplify the setup and management process by suggesting common default configuration so that the user is not encumbered by device level configuration details. Additional configuration details are separated out into tab-accessible interfaces should the user desire to make additional adjustments. Furthermore, relevant related use cases are suggested to guide the user through the setup and management process.

One embodiment provides use cases for creating and managing converged workspaces that include the services, resources, and devices the individuals or groups may require in the course of their normal daily use of the IT system. As used in various embodiments, workspaces may be personal or shared. A personal workspace for an individual may include a number of data and voice services such as a personal file share, an email account, and telephone service. A personal workspace may be a member of a shared workspace for a team, department, company or organization. The shared workspace provides its members shared access file shares, shared email accounts, and voice services on behalf of the entire shared workspace. The shared workspace enables and promotes collaboration by providing these shared services, resources, and underlying devices in a manner that directly relates to the structure of most businesses and organizations. In one embodiment, a special permanent shared workspace enables administrative privileges to those with personal workspaces that are members of this special workspace. Also, voice services associated with the workspaces may be set up so that incoming calls are handled in a call flow process. For example, for a personal workspace, incoming calls may be set up to ring first the telephone(s) assigned to a personal workspace, and if un-answered after a period of time be directed to a personal mail box of a voice messaging system. For a shared workspace, incoming calls may be directed to all telephone(s) assigned to that shared workspace and the telephones of the members of that workspace, and if un-answered after a period of time be directed to another workspace, a receptionist, or a shared mail box on a voice messaging system. For calls coming into a company or an organization, a permanent shared workspace called a Reception workspace similarly supports call flows, but includes call destinations such as all telephones assigned to the Reception shared workspace, other workspaces that might be assigned to assist with reception duties, and finally falling through to an auto attendant service that will try to automatically assist the caller by further directing the call within the company or organization. Call flows have multiple levels through which calls are routed when they are un-answered, so that an incoming call is successively routed to the next call flow destination(s) until the call is answered or reaches a terminating destination such as voice messaging or an auto attendant.

One embodiment of the use case-based management system additionally includes components to manage devices, resources, and services that are remote to the premises where the integrated system management appliance or other managed equipment is located. The management of these remote devices, resources, and services is conducted via secure protocols, allowing them to be managed in the same non-technical manner as local devices, resources, and services and without burdening the user with security concerns. For example, a remote office including its computers and telephones can be managed using secure Virtual Private Network services. In these cases, these user devices are seen by the use case-based management system as part of the local area network as the VPN provides a secure tunnel through the interconnecting networks to the remote devices. In one embodiment, this ability to remotely manage services, resources, and devices is provided by one or more remote managers connected to the use case-based management system by an interconnecting network such as the Internet and communicating via secure protocols. The managers may be co-resident with the services or located at a convenient intermediary, such as a co-operating set of services. This ability permits a small business to subscribe to a number of remote voice, data, and other services offered on the Internet without having to first configure the small business' equipment to ensure proper acceptance of these remote services. Instead, the small business may simply select the desired remote services in the use case-based management system, enter a minimum amount of non-technical information such as service account information provided by the service provider, and enable the service. In these cases, the generalized system management requests generated by the use case-based management system are passed externally to the correct remote service, resource, or device managers, which then translate and broker these requests into the proper low level service management and configuration commands required by the remote services, resources, or devices. Some example remote services supported by the use case-based management system include domain and sub-domain registration services, email seconding services, and Internet telephony services.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIGS. 10B-10H illustrate example user interfaces for the workspace use case according to one embodiment;

FIGS. 11B-11C illustrate example user interfaces for the collaborative team workspace setup use case according to one embodiment;

DETAILED DESCRIPTION OF PREFERRED EMBODIMENTS

Embodiments of a use case-based management system will now be described with reference to the drawings. Where possible, the same reference numbers are used throughout the drawings to refer to the same or like components. This description is intended to illustrate certain preferred embodiments, but other embodiments that are apparent to those of ordinary skill in the art, including embodiments which do not provide all of the benefits and features set forth herein, are also within the scope of this invention. As one example, some embodiments may omit some or all of the features described herein. Thus, nothing in this detailed description is intended to suggest that any particular feature or component is essential. The invention is defined by the claims. In addition, the present disclosure provides multiple inventions and embodiments that may be practiced independently of one another. Nothing this detailed description is intended to suggest these inventions or embodiments are required to be practiced together.

Embodiments of the use case-based management system enable non-technical users to manage complex integrated systems based on familiar languages and workflows, and thus reduce the costs of installing and managing these integrated systems. The dynamic use cases respond to user input as well as continuous feedback of system status and health. Based on these input and feedback, the use case-based management system then subscribes to and authorizes services, manages services and resources, and configures and provisions services, resources, and devices.

1 THE INTEGRATED SYSTEM ENVIRONMENT

Figure 1A:
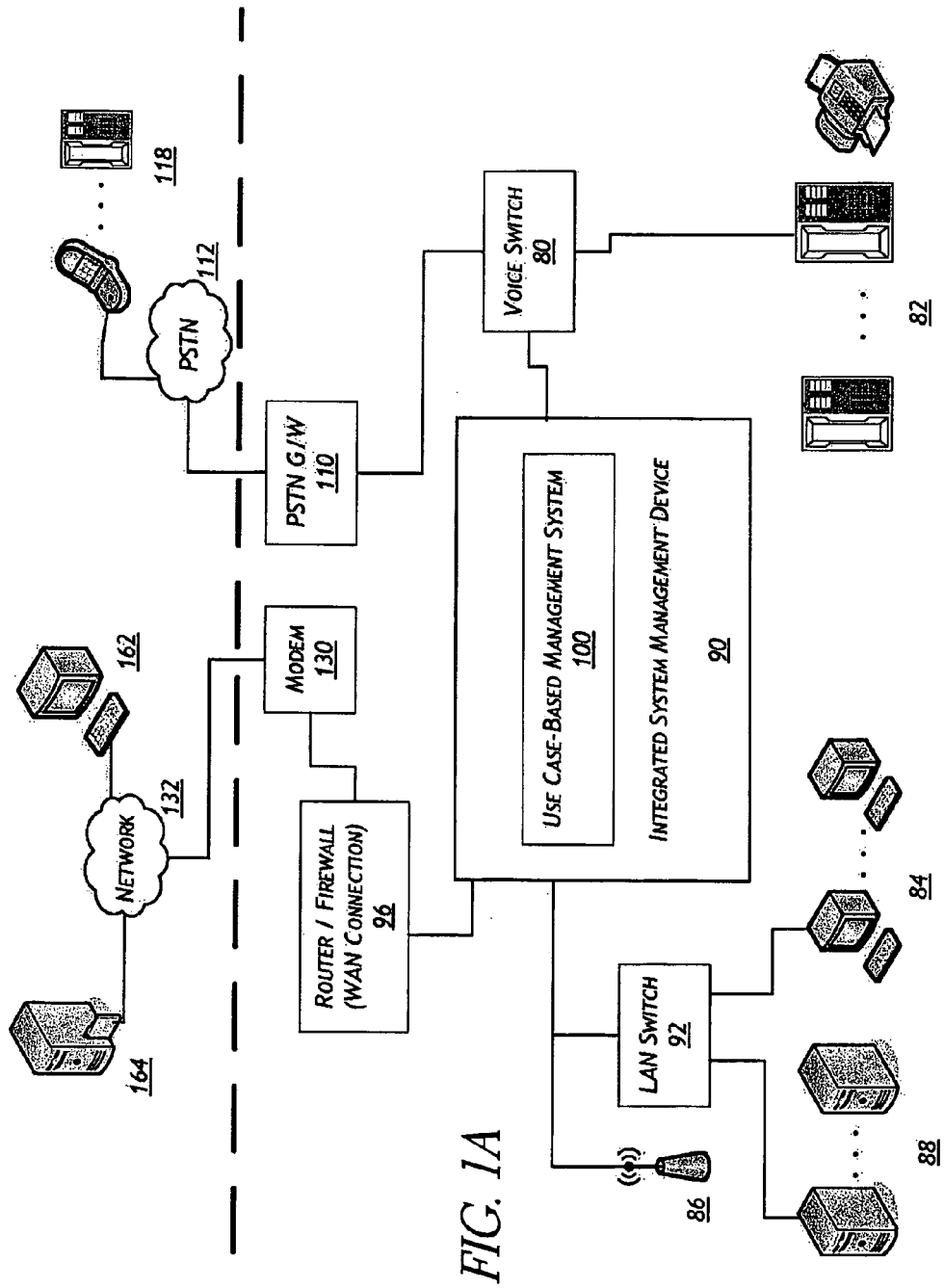
FIG. 1A is a block diagram showing the application context of an integrated system management appliance according to one embodiment.

FIG. 1A is a block diagram that depicts an example integrated system appliance in its application context. As shown, an integrated system management appliance 90, which includes a use case-based management system 100, is preferably adapted to connect to a number of local and remote voice, data, or networking devices and services and manage these devices and services. In one embodiment, the use case-based management system 100 comprises software that is stored in a memory associated with the integrated system management appliance 90 for storing computer executable components, and executed on a processor within the integrated system management appliance 90. The data and/or components for the use case-based management system may be stored on a computer readable medium and loaded into memory of computer device using a drive mechanism associated with a computer readable storing the computer executable components such as a CD-ROM, DVD-ROM, or network interface. Further, the component and/or data can be included in a single device or distributed in any manner. The integrated system management appliance 90 may be a server, a group of servers, or a hardware appliance or device with embedded voice, data, and/or network services and devices.

As shown, the integrated system management appliance 90 is connected to and manage a Local Area Network (LAN) switch 92 and a wireless access point 86, both of which connect a number of computing devices 84 to the LAN. In addition, the integrated system management appliance 90 also manages a number of applications and services provided by a number of servers 88 connected to the LAN. These applications and services may include email services, shared file services, security services, databases, and/or other data or communication applications or services. Wide Area Network (WAN) connectivity is provided by a router/firewall component 96 that is also connected to and managed by the integrated system management appliance 90. The router/firewall component 96 may be connected to a modem device 130, which provides a connection link to a network 132 (e.g., Internet) that is outside of the premise in which the integrated system management appliance 90 is located. The modem device 130 may be an ADSL (Asymmetric Digital Subscriber Line) modem, a cable modem, a fiber optic modem, or any other device that provides a link to a network. Servers 164 with remote services may be connected to the network 132 and such services may be accessed and managed by the use case-based management system 100. Remote computing devices 162, such as a home office computers, may access the internal network managed by the integrated system management appliance 90 through remote secured protocols.

The integrated system management appliance 90 may also manage a voice switch 80, which connects a number of voice devices 82 (e.g., phones and fax machines). The voice switch may be connected to a voice interface 110, which interfaces Voice over IP (VoIP) communications with traditional analog telephone lines, e.g., a PSTN (public switched telephone network) gateway that connects to a voice network 112 such as a PSTN. Communication devices 118 that are located outside of the premise in which the integrated system management appliance 90 is situated may be accessed through the PSTN.

In other embodiments, the integrated system management appliance 90 may be embedded or co-located as a management service with one or more application, data, voice, or other services such as a network router, a telephone system, a file server, a firewall, an email server, etc.

Figure 1B:
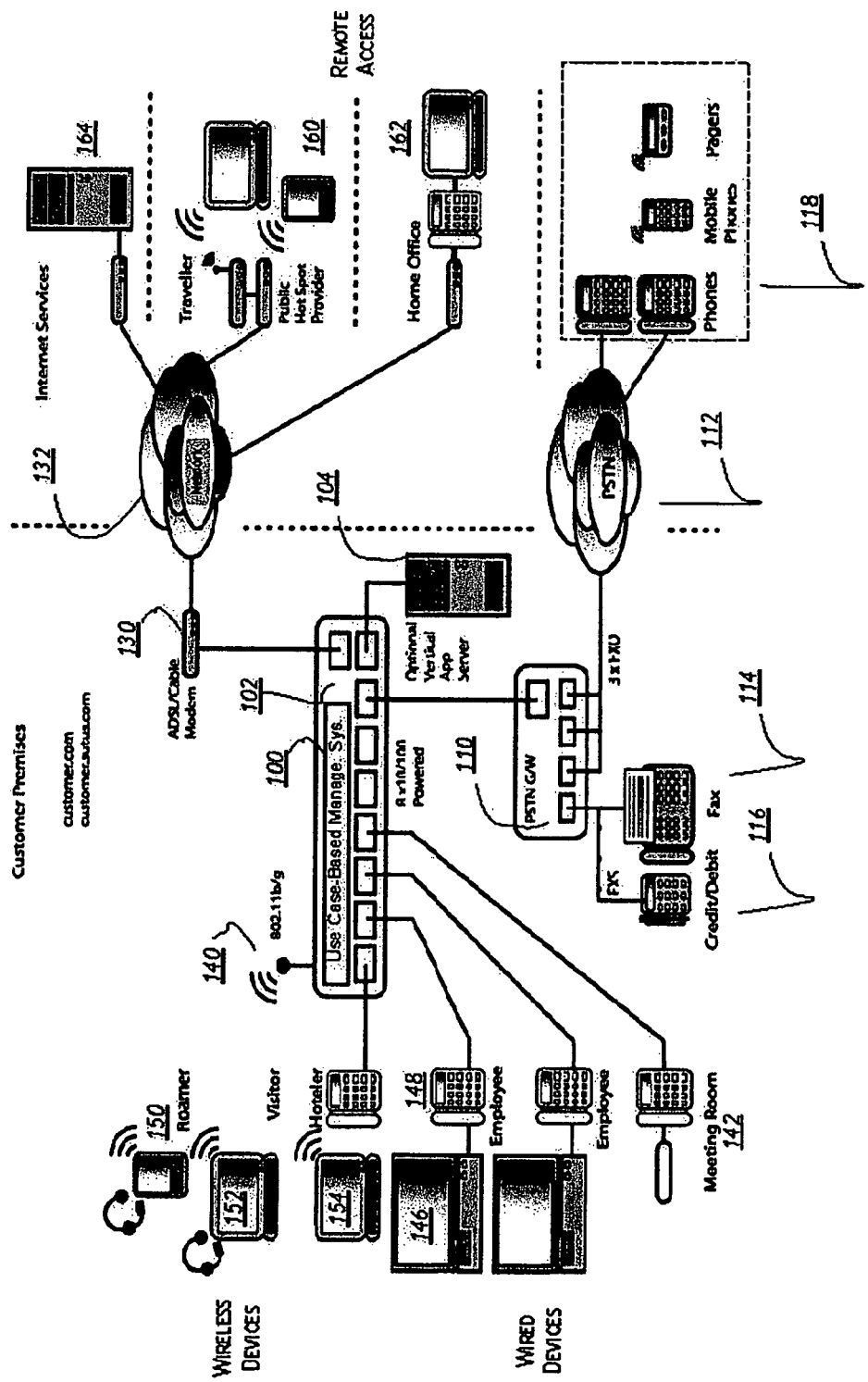
FIG. 1B is a block diagram of an integrated system management appliance providing the converged network WAN and LAN infrastructure and embedded data and telephone services of a small business or organization according to one embodiment.

FIG. 1B is a block diagram that depicts an example integrated system appliance which, together with its interconnected devices and services, provides the environment in which embodiments of the use case-based management system are used. Shown in FIG. 1B is a specific implementation of the integrated system management appliance termed a multiple services router 102. The multiple services router 102, which includes a use case-based management system 100, is preferably adapted to connect to a number of local and remote devices and services. In one embodiment, the multiple services router 102 includes the functions of an integrated system management appliance, and the use case-based management system 100 is a software application executed on the multiple services router 102.

As shown, the multiple services router 102 provides both the Wide Area Network (WAN) connectivity to the Internet and a switched wired and wireless Local Area Network (LAN and WLAN) to which other devices such as computers, printers, other servers, IP telephones, and IP based PSTN telephone gateways are connected. In this example, the multiple services router 102 is connected to a voice interface device 110 that interfaces Voice over IP (VoIP) communications with traditional analog telephone lines, e.g., a PSTN (public switched telephone network) gateway that connects to a voice network 112 such as a PSTN. A number of voice-based devices such as a fax machine 114 or a credit/debit point-of-sale device 116 may be connected to the voice interface device 110, allowing them to also communicate with the Voice over IP communications devices and services provided by the multiple services router and other devices such as IP telephones which connect to it on the LAN or optionally remotely over the WAN. The multiple services router 102 is also connected via a data network connection device 130 to a network 132, which may include, e.g., the Internet, another public or private WAN or an upstream LAN that may optionally provide wider interconnectivity to the Internet or another WAN. The data network connection device 130 may be an ADSL modem, a cable modem, a fiber optic modem, or any other device that provides a link to a network.

The multiple services router 102 may be used in a number of physical application environments such as in the office of a small business providing various networking, data, voice, and other services as is typical in the example embodiment of a multiple services router. A number of user devices in the application environment are connected to the multiple services router 102. They may include computing devices 146 (e.g., a laptop, a desktop computer, a kiosk, or other computing device) and telephones 148. In the example shown, a number of employee desktop computing devices and phones may be connected to the multiple services router 102 via the embedded wired or wireless LAN. In addition, a conference telephone 142 located in a meeting room may also be connected. The conference telephone 142 may support enhanced features for conferencing, including video conferencing. The multiple services router 102 may provide data/voice connections and other services to these connected user devices. For example, a user's computing device 146 may be able to access the Internet or an internal corporate network through the WAN networking services (e.g. routing, firewall, NAT, etc.) embedded in the multiple services router 102. Likewise, the telephone 148 may be a VoIP phone that sends voice packets over the data network connection provided and managed by the multiple services router 102. Alternatively, the telephone 148 may be a phone that sends its voice signal over the PSTN connection provided and managed by the multiple services router 102. Other telephones connected to the multiple services router 102 may also route calls either through the VoIP or PSTN connection as needed.

In one embodiment, the multiple services router 102 includes a wireless connection point 140 (e.g., 802.11a/b/g, WiFi, WiMax) so that devices may also be wirelessly connected to the system. As shown, a number of computer devices and phones (e.g., 150, 152, 154) may be connected to the system. In addition, a number of remote computers 160 and 162 may connect to the multiple services router 102 securely over the network 132. For example, corporate users who are traveling and/or working from home offices may connect to the corporate network through the network 132. Finally, through the multiple services router 102, the aforementioned locally and remotely connected devices can access a number of Internet services 164 connected to the network 132. Internet services 164 may include domain name lookup service, remote assistance service, automatic update service, etc.

Finally, local applications or services on the multiple services router with an integrated system management service may be supplemented by an optional application server 104 that provides services to a particular business vertical segment. This server is connected to the multiple services router 102 via the embedded LAN of the example multiple services router. The use case-based management system 100 supports any such vertical application server that needs to be added to supplement the services provided by the use case-based management system by providing standard managed network infrastructure supporting standard network protocols directly between applications and services. For example, the vertical application server 104 may provide a parts data base required by an auto parts store, a medical records system required by a doctor's office, a specialized e-commerce server required by an Internet business, a contact resource management support application, an accounting system, or other enterprise resource planning systems. In one embodiment, these additional services may be unmanaged or minimally managed by the use case-based management system 100. In another embodiment, these applications and services within the vertical application server 104 could be managed by a vertical services extension to the use case-based management system 100. The vertical services extension may provide the appropriate use case models and context and the vertical application server 104 may contain the appropriate service, resource, device and hardware managers that respond to the use case-based management system 100. In yet another embodiment, the applications or services hosted on vertical application server may be integrated directly into the use case-based management system 100.

Having described an integrated system environment in which the use case-based management system may be applied, a use case-based management system that enables non-technical users to manage the various components and devices in the environment will be described in detail below.

2 THE USE CASE-BASED MANAGEMENT SYSTEM

Embodiments of the use case-based management system include a use case framework that provides non-technical users an intuitive and interactive method of managing complex integrated systems. The framework includes dynamic use case models that are designed to accommodate non-technical users' level of knowledge of the system and present workflows that closely match these users' expected uses of the systems. For example, in one embodiment, the use case framework can be used to manage a company's integrated system that has Internet service, email, remote access services, phone and telephony services, file services, and backup services. Unlike traditional integrated systems where configuration information must be entered individually for each device or service, the use case framework enables common configuration entered for a particular use case to be propagated to other use cases. Thus, for example, upon the receipt of configuration information in a user account creation use case, the same information could be propagated to the other services within the integrated system (e.g., Internet services account, email account).

In addition to configuration propagation, another primary feature of the use case framework is the automatic translation of user input into system level instructions. Upon receiving user input via a use case presentation client, the use case-based management system automatically translates the user input into instructions to the relevant components, devices and services within the integrated system. In addition, the use case-based management system may update other dependant use case models that provide system context, status and health feedback into the dynamic use cases.

Figure 2A:
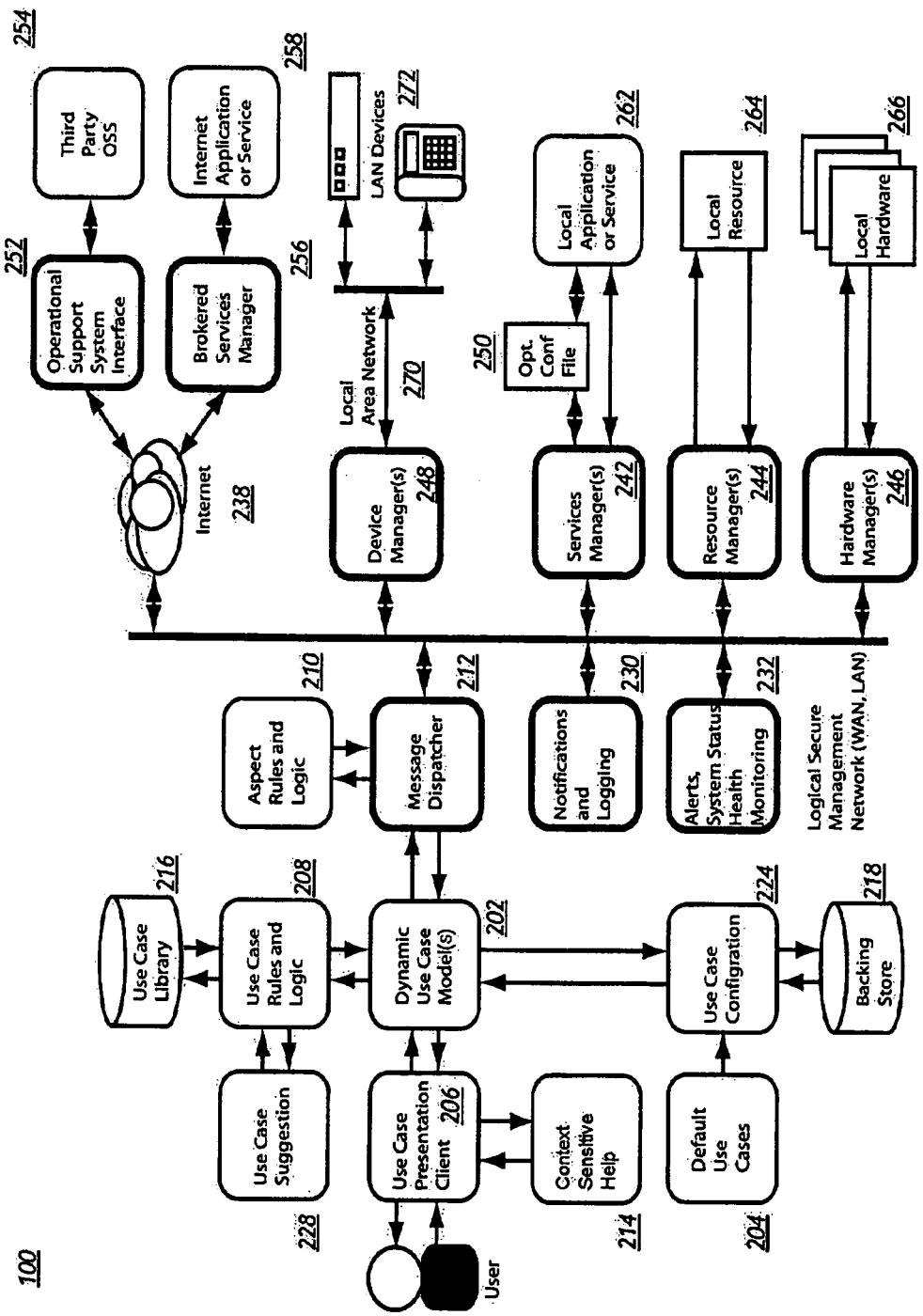
FIG. 2A is a block diagram depicting the logical components of a use case-based management system and their interactions according to one embodiment.

FIG. 2A is a block diagram that depicts the logical components of the use case-based management system 100. The depicted components will be further described in detail below

2.1 Use Case Presentation Client

In one embodiment, the use case-based management system 100 includes a use case presentation client 206, which is a graphical user interface that dynamically and interactively shows changes to the integrated system as the user provides input and as feedback from the underlying integrated system is received. The use case presentation client 206 also provides a visual presentation of the dynamic use case models for the integrated system that is being managed. In one embodiment, use cases are visual presentations of the use case models. FIGS. 6B-6G show a series of operating screenshots of an example initial setup use case within the use case presentation client 206. Through the example user interfaces shown, a user can perform the task of initial setup for a managed integrated system. This and other example use cases will be further described in more detail below in Section 4.

In addition to presenting information on a current use case, the use case presentation client 206 may also provide:

a menu of all relevant use cases, suggested use cases to enhance or improve system services, wizards to guide users through the implementation of a use case, editors to allow a user to edit use case parameters, auxiliary windows and widgets that provide real-time notification of system, status, alerts, and notifications, and/or a comprehensive context sensitive help system.

Figure 2B:
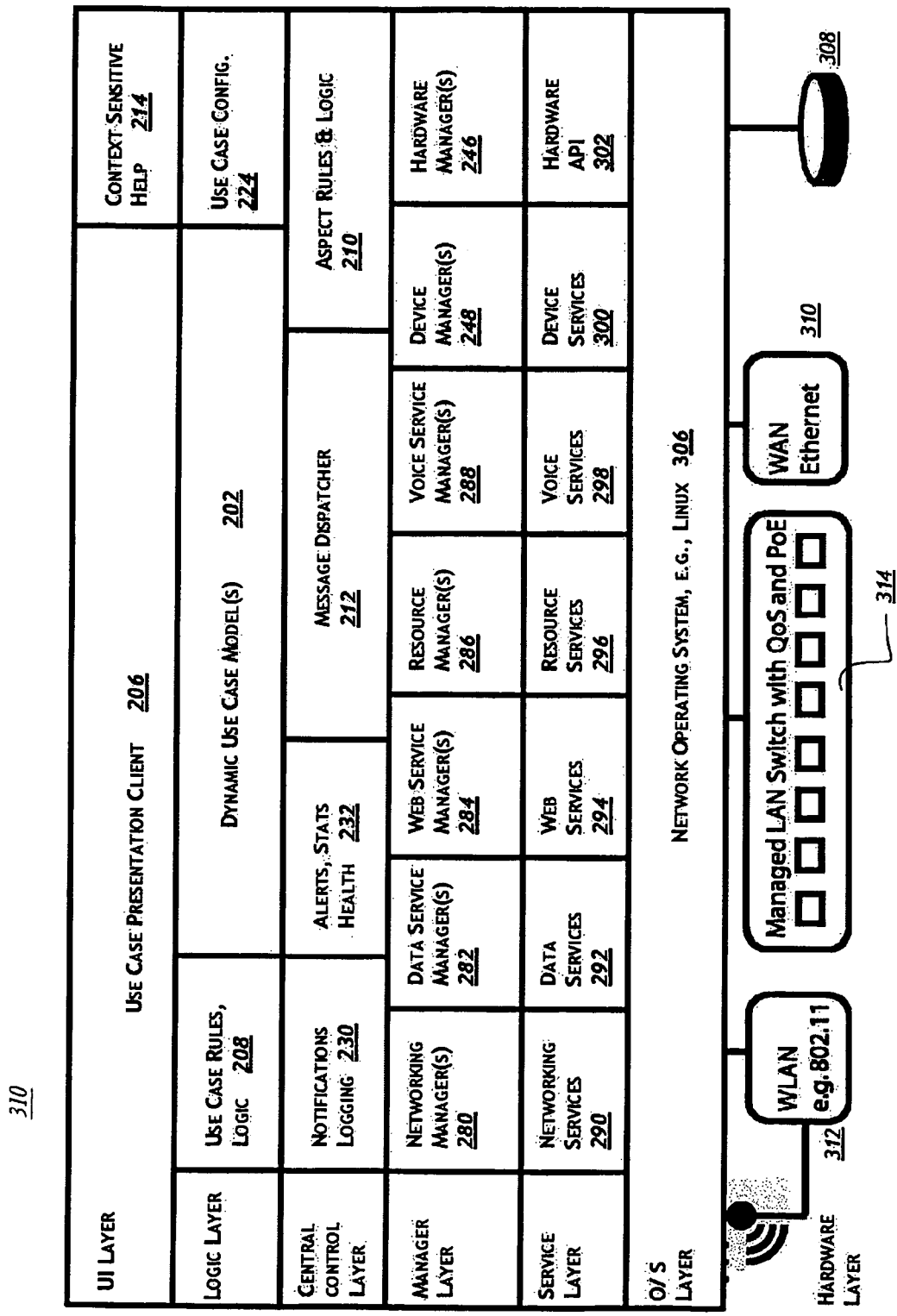
FIG. 2B is a block diagram depicting the layered software architecture of a use case-based management system according to one embodiment.

As depicted in FIG. 2B, the use case presentation client 206 is at the top of the software architecture and is in the user interface layer through which the user interacts with the use case-based management system 100. In one embodiment, the use case presentation client 206 is implemented in a client/server architecture with dedicated client software that can be installed on a user's computing device. In one embodiment, a Rich Internet Application (MA) presents a network based GUI using a form of Web 2.0 application framework. In one embodiment, the use case-based management system hosts the server side of the architecture in a standard backend Web Server with CGI capability to serve out application frames and receive and process transactions from the GUI. Transactions can be transmitted using standard HTTP protocol or the more secured HTTPS protocol. Alternatively, in another embodiment, the use case presentation client 206 is implemented within a web application framework that may employ Flash, Flex, Java, or AJAX technologies. Such frameworks execute within a standard web-browser and can communicate with the rest of the use case-based management system via the HTTP/HTTPS protocol (e.g., by using XML-RPC or SOAP).

In some embodiments, the context sensitive help module 214 presents to the user information, suggestions, and assistance that enable the user to immediately resolve uncertainties and issues that may have arisen in the context of the use case currently presented. As shown in FIG. 2B, the context sensitive help module 214 also resides in the same user interface layer as the use case presentation client 206.

2.2 Dynamic Use Case Models and Use Case Library

In one embodiment, the use case-based management system 100 includes one or more dynamic use case models 202. The dynamic use case models 202 are based on active use case frameworks that reflect the application context of the use case-based management system 100. These active use case frameworks serve as the source for the use case presentation client 206. A use case framework is a set of related use case models presented in the use case presentation client 206. A framework is made active by the user selecting a specific use case and manipulating its service options presented in non-technical language. For example, when the user selects a use case for enabling Internet telephony services, the corresponding framework guides the necessary changes to the telephone services, but may also present to the user related use cases within the framework to configure any support services such as the underlying router, firewall, and other services, resources, and devices. With reference to FIG. 2B, the dynamic use case models reside in the logic layer and, among other functions, govern the behavior of the use case presentation client 206. As such, these dynamic use case models serve as the primary components that process the user input received in the user interface layer.

As shown in FIGS. 2A and 2B, the dynamic use case models 202 mediate between the use case presentation client 206 and the message dispatcher 212 and other system components in the central control layer. This mediation is bidirectional. In one direction, user input from the use case presentation client 206 is interpreted, applied, and/or otherwise translated to generalized system management requests to other components residing in the lower layers. For example, a user may configure a new service in the context of a use case. The use case model would interpret the user's input for the new service and translate the input into a number generalized system management requests such as "provision service," "start service," etc. If the user's input modifies the parameters for a service, the input may be translated into generalized system management requests such as "modify parameters" and "restart service." These generalized system management requests are further translated into device or service specific commands once they reach the appropriate device or service managers. In this manner, the user is able to manage various devices and services without having to learn the specific details of the underlying mechanism required to manage these devices and services.

In the other direction, the dynamic use case models 202 respond to input from the alerts, system status, and health component 232 and notifications and logging component 230, and may in turn send such status information for display in the use case presentation client 206. In one embodiment, an active dynamic use case model uses the appropriate use case framework to:

provide automatic suggestion of input (e.g., suggesting login names based on an employee's name), give immediate feedback with respect to whether inputs are valid in the current system context (e.g., numeric data is of the correct length, correct format is entered into a telephone number field, alpha numeric data is of the correct length, syntax, and valid characters are entered into a user name or password field), issue generalized system management requests when complete information for a discrete management request has been received from the user, guide the user to the next step of a multi-step use case, and/or allow the user to go back to a previous step if correction is required.

Additionally, an active dynamic use case model may use the appropriate use case framework to immediately update the use case presentation based on system context as management requests are processed. For example, as the user enters the necessary information to connect to the Internet, the use case-based management system issues discrete management requests to request a new dynamic IP address from the Internet Service Provider and provide any necessary authentication. Once this has been accomplished and an Internet connection has been established and tested, the use case-based management system updates in real time the displayed status of the Internet connection (e.g., an indicator goes from red to green). In another example, when a new IP telephone is plugged into the network, the use case-based management system detects the telephone, issues it a new private IP address, and then updates the use case presentation client to show it as available to be assigned to a personal or shared workspace. Similarly, when a telephone is unplugged, if it was unassigned it would be removed from the list of available telephones. If it was assigned to a workspace as a destination for a particular call flow, the call flow destination would be flagged to show that it is invalid, while call processing continues to other destinations in the call flow. If the same telephone is again plugged in, the flag showing unavailability would be removed and the telephone would be restored to the workspace call processing and flow. This real time feedback allows the non-technical user to perceive changes that may not be otherwise obvious.

These provided dynamic use case model features assist the non-technical user in the process of configuration. Some of the immediate feedback and update features are important because non-technical users rarely know or are familiar with the technical restrictions on entries in the required configuration information fields.

In one embodiment, the selection of the appropriate user case model(s) occurs automatically and does not require active participation from the user. As a user selects a specific use case, the use case-based management system 100 loads, from the use case library 216, dynamic use case models that govern the implementation of the selected use case. These models guide the input of necessary plain language, non-technical information such as an Employee's or a Team's name. Each use case model can be loaded from the use case library 216 and made active by reading appropriate use case rules and logic and backing store information (i.e., previously saved configuration information) and obtaining the appropriate system status with an information request.

2.3 Use Case Suggestions

In one embodiment, the use case-based management system 100 further includes a use case suggestion module 228 that may, based on the current system state and context, suggest to the user one or more related use cases that the user may wish to utilize in order to customize the system according to the user's needs. For example, when a system is first connected and only default functionality is available, the use case suggestion module may suggest the following example use cases for:
- initially setting up the system and connecting to the Internet,
- adding services for a new employee with a personal workspace,
- configuring a personal computer for email,
- enrolling a personal computer on the network (domain),
- adding services for a new team with a shared workspace,
- modifying the system's backup services and schedule,
- restoring files, and/or
- checking for updates.

These suggestions are not static, but are modified dynamically to reflect the most likely use cases a user might want to use. For example, using hints from the use case rules and logic 208 and knowing the current context of the selected use case, a use case suggestion list may be built. For example, the use case-based management system may suggest to a user, from the default enabled use cases of a newly installed system, that the user may wish to create a personal workspace that is a member of the System Administrator's shared workspace to gain further privileges, or that the user may wish to enable remote office functionality over VPN (Virtual Private Network) services. These suggested use cases aid non-technical users by presenting a workflow for common setup tasks that need to be performed when the system is first installed. The users are saved from having to learn which tasks need to be performed.

Figure 2C:
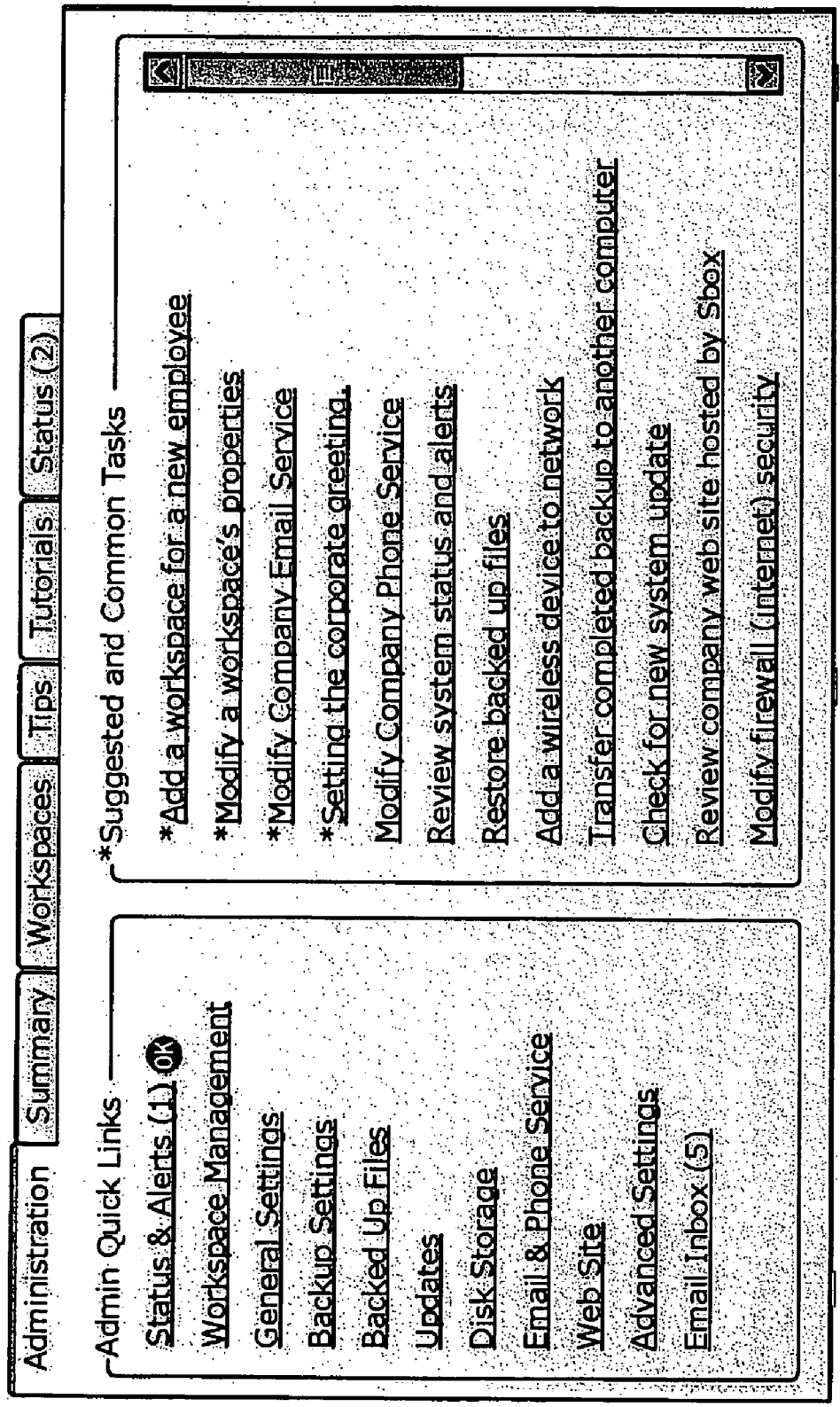
FIG. 2C illustrates an example user interface showing a list of suggested use cases according to one embodiment.

FIG. 2C shows an example list of use case suggestions. As shown, the use case presentation client 206 describes these suggested use cases as "tasks," a term that is more understandable to the non-technical user. In one embodiment, these tasks are listed under an "Administration" tab within the use case presentation client. In this example, the use case presentation client 206 is suggesting common administrative tasks, which include tasks for setting up various aspects of the integrated system and adding a personal workspace for a new employee. In one embodiment, when a user selects one of these tasks, the use case presentation client 206 will display either the appropriate use case or configuration pane for accomplishing the selected task.

Figure 2D:
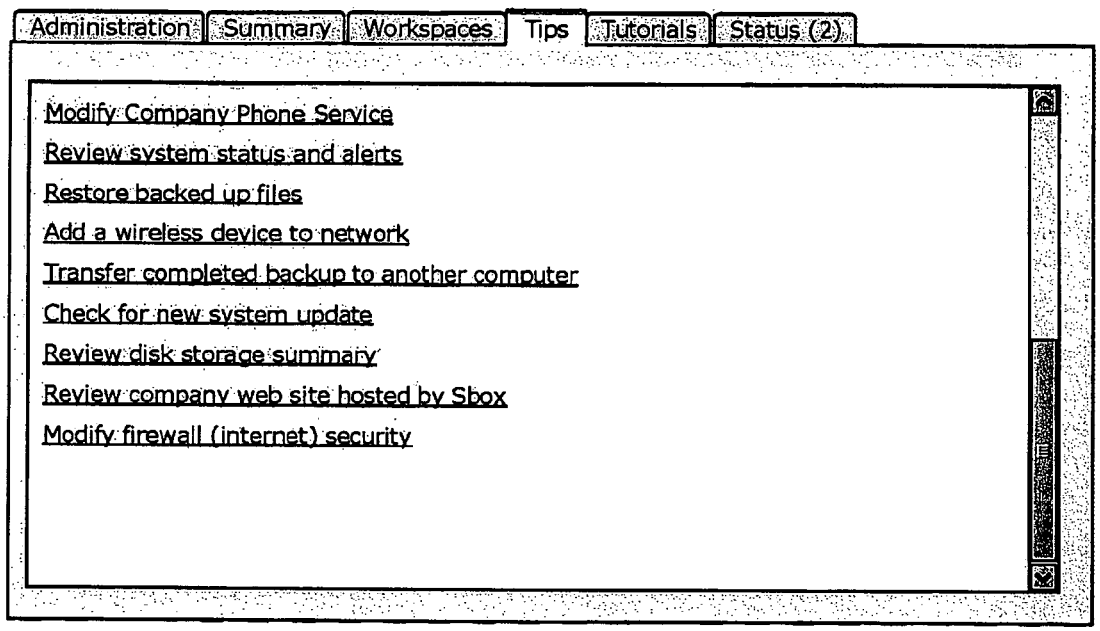
FIG. 2D illustrates another example user interface showing a list of suggested use cases according to one embodiment.

Besides suggesting use cases as administrative tasks, use case suggestion module 218 may suggest use cases as "general tips" for accomplishing specific tasks. As shown in FIG. 2D, the use case presentation client 206 may include a "Tips" tab that lists a number of suggested tasks as well.

2.4 Use Case Rules and Logic

Returning to FIG. 2B, the use case rules and logic module 208 is one of two additional components that also resides in the logic layer with dynamic use case models 202. In one embodiment, use case rules and logic module 208 defines the behaviors of the dynamic use case models 202. More specifically, the use case rules and logic module 208 interpret use case selection, mediate amongst the different use case models, adjust for system status and health, and provide the rules to the dynamic use cases for translating changes (e.g., user input and system feedback such as lost or stored internet connection, or a device has been connected or disconnected) into generalized system management requests. In addition, these rules and logic may mediate between selections in different use cases that may require conflict resolution. Example conflicts include when a user selects to enable a remote office feature but has previously disabled all incoming services in the firewall. In this case, the conflict is mediated by allowing just the minimum incoming services needed for the remote office feature (e.g., IPSec or PPTP services) to be enabled. Another example would be when a user reassigns a telephone to another workspace and removes it from the list of call flow destinations of the previous assignment. In this case, the call flow destination list of the previous workspace is updated to remove the telephone that has just been reassigned. The rules and logic also vary the use case selection depending on the services, resources, hardware, and devices available.

In the specific example of a small office data and communications system, the use case rules and logic module 208 could allow the call processing of a personal workspace to be adjusted based on device availability or user preference, the call processing of a shared workspace to be adjusted in real time based on the membership of a shared workspace, or the domain name and dependant email address to be changed if the company name changes.

2.5 Use Case Configuration and Backing Store

In one embodiment, the dynamic use case models are initialized from a backing store 218 that ensures the persistence of each dynamic use case context. A use case context may include the full state (e.g., the states of services, resources, and devices, health status of the system, use case model configuration, user account and registration data, etc.). More specifically, the backing store 218 contains use case configuration 224, which is used to initialize the active use case models. The use case configuration 224 includes configuration information entered by the user and other system information that is generated as the system is installed and tailored to meet the needs of a particular organization.

In one embodiment, when the system is shut down or restarted, the entire set of use case models are restored by reading from the backing store and reapplying the use case selections. These selections are then reprocessed by dynamic user case models 202 and reissued as generalized system management requests to ensure system synchronization and integrity, even in the event of service, resource, hardware, or device configuration corruption. This approach has considerable security benefits. Because the backing store does not store lower level configurations, on initialization the use case-based management system regenerates these lower level service, resource, and device configurations from the appropriate use case models and frameworks. Thus, if a system has been compromised and the lower level service, resource, and device configurations have been modified by malware or directly by an attacker to enable or disrupt clandestine activity, the compromise will be eliminated by a system reboot. In another embodiment, these lower level configurations are re-generated by the use case-based management system only if a guardian checksum showed they are not in sync with the use case-based management system generated settings. In other embodiments, a subset of the use case models is restored. For example, if a malware or an attacker were able to enable administrative access to the system by granting itself or himself root shell privileges and enabling the firewall to gain access through bypassing the use case-based management system, a reboot would restore the firewall and privileges to be consistent with the use case-based management system settings and wipe out the efforts of the malware or hacker.

2.6 Default Use Cases Context

When the use case-based management system is first installed and before its first configuration, the dynamic use case models on the backing store 218 are initialized from a set of default use case contexts 204. The default use cases 204 are configured to be relevant to the application context (e.g. the small business context) and provide default services that are of immediate use to the users. Once these default use case contexts are set, the dynamic use case models are processed to ensure the system state synchronizes with the default use case models.

In the example of the small business IT system, the default use cases 204 are configured to provide a core of standard telephony and Internet access services to the telephones and computers when the system is first plugged together and turned on. These defaults are designed to ensure at least core services are available on installation so that a business is not taken down when the system is installed.

2.7 Message Dispatcher and Aspect Rules and Logic

Returning to FIG. 2B, the next lower layer within the software architecture is the central control layer. Within the layer are a number of system control components, including a message dispatcher 212. The message dispatcher 212 receives and dispatches generalized system management requests. In one embodiment, it may be advantageous to give the message dispatcher a central role, wherein the system wide aspect rules and logic 210 are applied that provide context to system management requests.

In this embodiment, the system message dispatcher is configured to communicate over one or more communication channels to the components in the manager layer. These components include service, resource, hardware, and device managers (e.g., 242, 244, 246) as well as to auxiliary managers that provide alerts, system status, and health monitoring (232) or notifications and centralized system logging (230).

In the example of an IT system, where the different use case management entities may not be located in the same device or even on the same local area network, the message dispatcher 212 can be configured to communicate securely over networks and network boundaries. Embodiments for these communications include secure network protocol sessions such as HTTPS, where the individual generalized system management requests are passed as XML-RPC or SOAP requests and responses.

Using these secure communication sessions, it is possible that a managed entity may be a service hosted on the Internet such as an Internet telephony service, a hosted backup service or other service of interest to the small business and yet all entities can be securely managed by the use case-based management system.

The aspect rules and logic 210 allow the message dispatcher to apply system wide rules and context to the generalized system management requests. For example, security policy (authentication and authorization) can be applied to the messages at this central point and context such as user presence on the LAN (more secure) or WAN (less secure) can be interpreted to determine whether the user initiated requests meet security criteria. Since the message dispatcher is a centralized point where generalized system management requests are handled, the aspect rules and logic 210 can perform the function of a watchman and ensure that these requests are proper and not generated as a result of a system compromise.

2.8 Local Service, Resource, Hardware, and Device Managers

The next layer in the FIG. 2B is the manager layer. In one embodiment, the use case-based management system 100 includes one or more service managers 242, one or more resource managers 244, and one or more hardware managers 246. Other managers such as networking managers 280, data service managers 282, web service managers 284, resource managers 286, voice service mangers 288, and other customized managers may be included as well. These managers publish a management vocabulary, interpret the generalized system management requests and provide specific requests for the underlying service, resource, hardware or device in accordance with various device-level requirements. The management vocabulary may be considered to be akin to a network API, where a set of defined network protocol requests and responses creates and adds to a body of existing functionality that is accessible to a software system that resides on and across a local area and possibly a wide area network. In one preferred embodiment, the managers would use remote procedure calls with XML syntax (e.g., XML RPC) to implement such a network API. The managers also provide generalized service, resource, hardware, and device start, restart, shutdown, and provision commands to support general system starts or restarts, graceful shutdowns and configuration changes.

Other manager tasks include automatic detection and registration of new managed services, resources, hardware, or devices and automatic service, resource, hardware, and device health monitoring. This information is sent to the System Status and Health component 232 for aggregation, mediation, and processing into reflective changes to the dynamic use case models.

In the embodiment of a small business IT system example, managed services, resources, devices, and hardware may include but are not restricted to:

WAN Access and Router Services
Stateful Packet Inspection (SPI) Firewall Services
Network Address Translation (NAT) Services
Virtual Private Network Services
Dynamic Host Configuration Protocol Services (DHCP)
Network Time Services (NTP)
Domain Control Services
File Sharing Services (SAMBA)
Disk Drive Configuration
Memory, Queue, and Resource Limitations
Email Services
Calendar Sharing Services
Presence and Instant Messaging Services
Soft PBX Services
Voice Mail Services
PSTN Gateways
VoIP Business Feature Telephones
LAN Switches
Wireless Access Points There is considerable flexibility with the physical location of the managed entities with this architecture, provided that an appropriate channel is used for the generalized system management requests from the message dispatcher to the particular service, resource, or hardware manager(s) (242, 244, 246, etc.).

In one embodiment, it may be advantageous to aggregate many of these services onto a multiple services router managed by the use case-based management system. The multiple services router, in turn, may be implemented in a single piece of hardware. The multiple services router may be considered as a specific implementation of the integrated system management appliance and is further described below in Section 3.

Figure 3A:
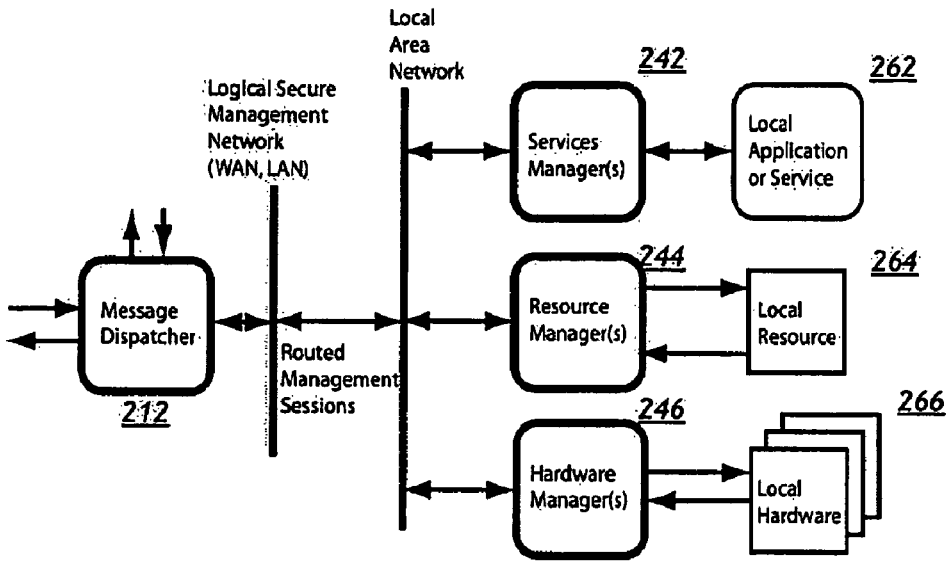
FIG. 3A is a block diagram of local services interfacing with the message dispatcher according to one embodiment.
Figure 3B:
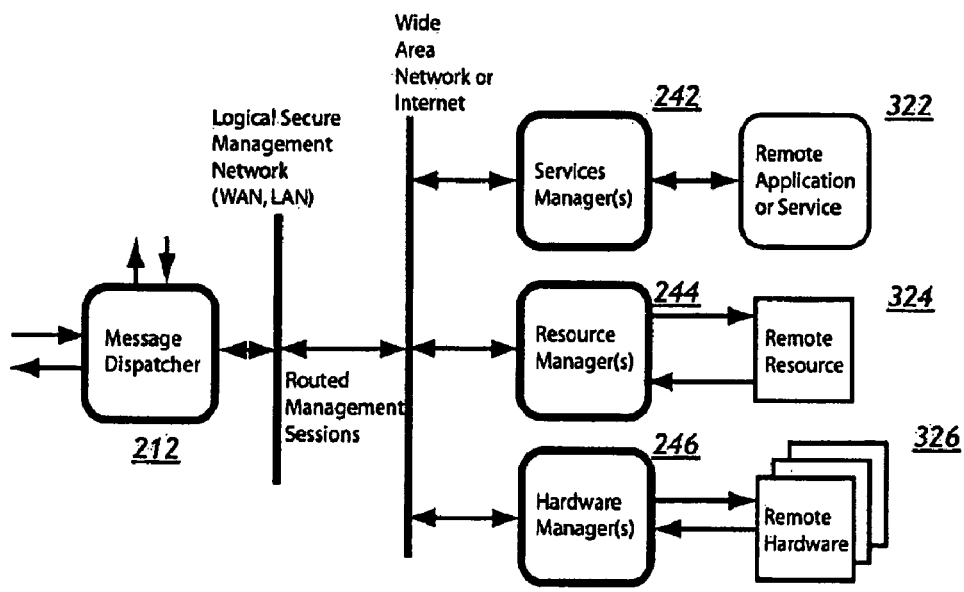
FIG. 3B is a block diagram of remote services interfacing with the message dispatcher according to one embodiment.

However, some service managers, like the brokered services manager 252 and operational support system interface 256, may have to be accessed through the Internet 238. Also, local applications or services may be implanted on other platforms or on an optional vertical application server 104 (FIG. 1B). Alternatively, services may be located on other server platforms on a LAN as illustrated in FIG. 3A to fit the more conventional multi-platform enterprise IT case or even across the Internet as illustrated in FIG. 3B to support a system that must be managed across a wider area network at multiple geographic locations.

One advantage of the use case-based management system is the ability to update and easily set up managed resources when a resource status changes. In one embodiment, the integrated system management appliance (e.g. multiple services router) recognizes a device when it is plugged it and receives a local IP through DHCP (Dynamic Host Configuration Protocol). DHCP then sends notification to the integrated system management appliance that the new device has been connected. At that point, the integrated system management appliance may recognize that the new device has already been assigned, in which case the device will receive a previously saved configuration specific to that device. Alternatively, the device may be a new device or a user has released the device to an unused device pool. In that case, the integrated system management appliance may allocate the device into an available device pool that can be seen in the management interface.

2.9 Monitoring Components

The use case-based management system also includes a few other monitoring components. The system status and health monitoring component 232 aggregates, mediates, and processes reflective changes to the dynamic use case models based on status and health input events sent by the individual service, resource, and device managers (e.g., 242, 244, 246). The system notifications and logging component 230 provides aggregated logging for system management actions. It also provides a mechanism for issuing alerts, system status, and health notifications to both internal and external users.

3 MULTIPLE SERVICES ROUTER

The use case-based management system is hardware independent and can be run as a generalized software package that manages various functional blocks of any integrated system through a management communications channel. For security reasons, this channel should be preferably secured either physically or by encryption and should include controlled key exchanges between the various components. For example, it is possible to implement an enterprise IT management system using a use case-based management system that has each functional block (router, firewall, switch, server, telephones, gateways, etc.) as discrete physical entities. By modifying the implementation of the various service, hardware, device, and resource managers, the various existing communications channels (e.g., serial communications, Ethernet protocols) and their underlying management protocols (e.g., command lines, SNMP, HTTP embedded web pages) can be integrated with the rest of the system.

Figure 4:
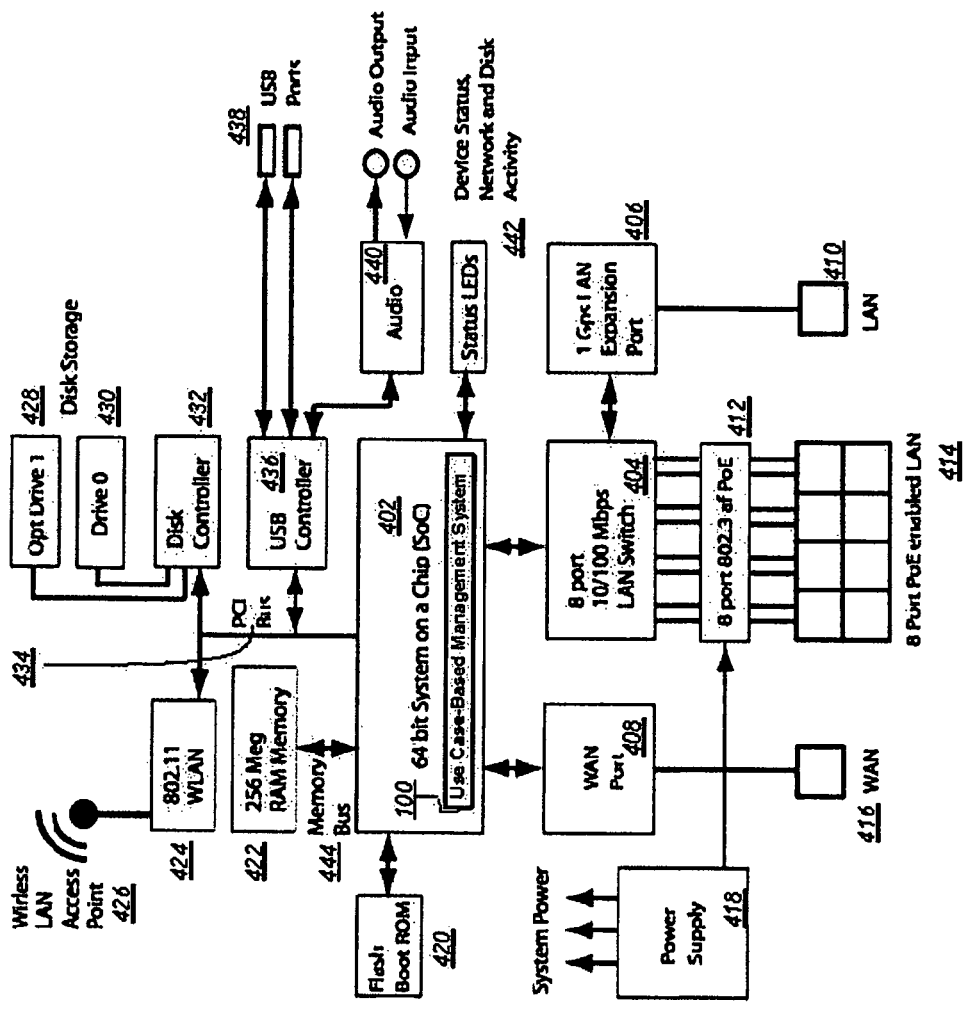
FIG. 4 is a block diagram depicting the hardware architecture of a multiple services router according to one embodiment.

FIG. 4 is a block diagram showing the hardware configuration of an example multiple services router hardware in which the use case-based management system may be used. The hardware is developed on powerful system-on-a-chip technologies that include one or more 32 and 64 bit processors, with a number of host embedded devices providing various types of functionalities. The resulting embedded system can be a small, cost-effective hardware platform complete with integrated server and network infrastructure hardware and peripherals such as LAN switches with Power over Ethernet (PoE) and Quality of Service (QoS) capabilities (404), one or more WAN ports (408), and sufficient computing capability on the system chip 402 to run Network and Application services such as a software or firmware based router, firewall, file server, email server, web server and PBX.

As the multiple services routers are often used in small businesses and organizations, the application of the use case-based management system to multiple services routers is particular valuable because it simplifies the setup and management process and enables small businesses that cannot afford professional IT help to setup and run their own integrated data and communication systems. A use case-based management system embedded in a multiple services router can make use of web based application frameworks and be accessed locally or remotely over secure HTTPS protocols. This enables effective remote assistance and management services that also benefit from the business use case focus of the management system.

The communications channels to managed services, hardware and resources can be implemented in any number of ways, including via the on-board Ethernet channels or via dedicated serial or parallel buses running to the various components such as an on-board managed Ethernet port, managed LAN switch with Power over Ethernet capabilities, or other device in the case of an embedded system such as a multiple services router. External devices can be managed over the LAN (404, 406) using existing network protocols such as HTTP, FTP, DHCP, and others (such as IP Phones and Gateways) or over the WAN (408, 416) externally with these protocols operating within a Virtual Private Network (VPN) tunnel using IPSec, PPTP, or other suitable protocols. Externally brokered Internet services can be similarly managed using Internet protocols using such protocols as HTTPS carrying XML-RPC or SOAP based requests and responses to an appropriate manager of broker co-located or at an intermediary location to the remote service.

The configurations and components shown in FIG. 4 are illustrative of a sample embodiment embedded multiple services router that executes a use case-based management system. There can be many applicable embodiments, with either embedded and/or discrete components. For example, instead of a 64-bit System on a Chip (SOC) design, a discrete processor design with separate CPU, cache, and bus interface chips could be implemented. Other variations could include designs with additional Ethernet LAN switch ports to allow for the direct connection of additional user workstations, printers, servers, IP telephones, and gateways or additional WAN ports to allow redundancy of Internet Service connections or bandwidth aggregation to the wider Internet. Also, other managed devices can be added via the Universal Serial Bus (USB) ports. For example, an external backup disk plugged into this port can be connected and mounted in the System Administrator's shared workspace to enable easier and more efficient transfer of backup data to an external drive for easy transport offsite as part of a disaster recovery plan.

One embodiment of the multiple services router includes one or more of the following IT system capabilities:
WAN Router
Stateful Packet Inspection Firewall
Network Address Translation
Virtual Private Network Access
DHCP Services
Network Time Server
Network File Services
Secure IMAP Email Services
PBX Telephone Services including Audio on Hold
Paging capabilities
Voice Mail
Auto Attendant
Brokered Access to Internet Domain Services
Brokered Access to Internet Telephony Services

4 EXAMPLE USE CASES

Having described an example multiple services router embodiment, this section describes in more details example use cases that may be used in a use case-based management system. These example use cases include a number of primary use cases for ensuring that, at the first time of physical installation and power-up, at minimum basic services for a small business or organization are provided. Although these example use cases are described in the context of a multiple services router, they are applicable to any generalized integrated system management appliance that executes the use case-based management system.

These basic use cases include establishing a local area network, providing Internet access and sharing, providing Internet security (e.g., through firewall services and network address translation), and providing basic telephone service. They enable a user to quickly set up the entire system, such that all PCs can securely access the Internet, all phones can place and receive calls from their PSTN telephone service, and any pre-existing software such as PC based peer file sharing or Internet services such as POP email accounts continue to function properly. For a small business or organization that has a few computing devices, a few telephone lines and individual telephone sets, these default use cases provide considerable service benefits in helping the business or organization quickly setup its integrated data and voice system.

Figure 5:
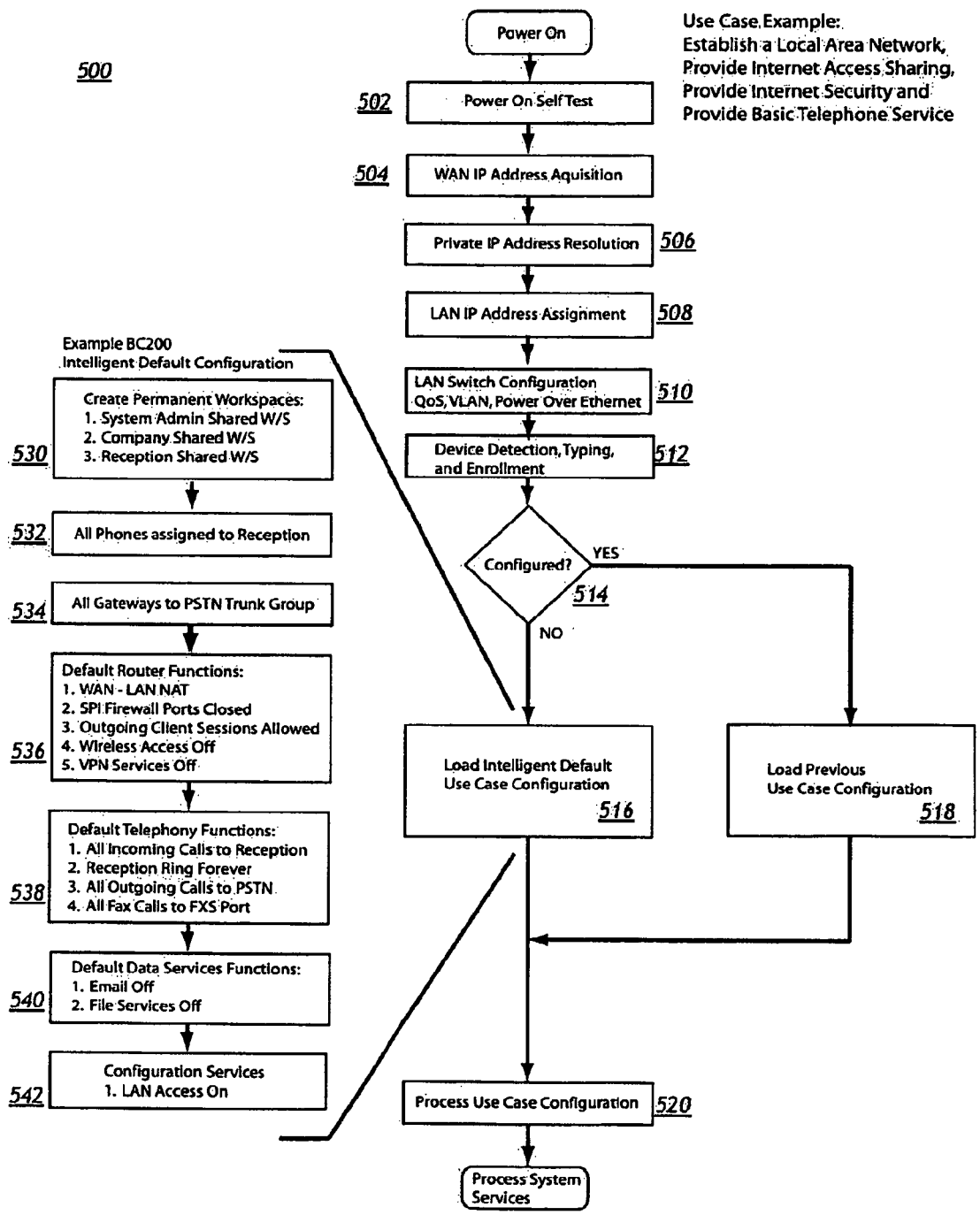
FIG. 5 is a flow diagram showing the use case process for automatically setting up the system when powered on according to one embodiment.

FIG. 5 shows the use case process of initial setup. After power on, at state 502 the process conducts a power on self test. Then at 504, the process acquires a WAN IP address. Private IP address resolution, LAN IP address assignment are performed at states 506 and 508, respectively. Then at state 510, LAN Switch configuration is performed, which includes configuring QoS, ULAN, and Power Over Ethernet. The process next performs device detection, typing and enrollment at state 512. Once these tasks are performed, the process checks to see if these devices and services are configured at state 514. If so, previous the use case configuration from the backing store is loaded at state 518 and the loaded configuration is processed at state 520.

If any of the device or service is not configured, intelligent default use case configuration is loaded at state 516. In one embodiment, the intelligent default configuration creates permanent workspaces at state 530, assigns all phones to reception at state 532, and assigns all gateways to the PSTN trunk group at state 534. Then the process performs default router functions at state 536, default telephony functions at state 538, data services functions at state 540. At state 542, the process performs any additional configuration services such as turning LAN access on.

4.1 Connect to the Internet and Establish a Corporate Presence on the Internet One embodiment provides an initial set up use case with an automated setup wizard that leads the user through the initial setup process. It may resolve of any issues that may be encountered with setting up basic Internet service, establishing a system administrator workspace, and registering the server for access to dynamic Domain Name Services offered by a provider. The dynamic Domain Name Services may establish the small business with an Internet domain name so that its external services (e.g., email, VPN, and web services) can be conveniently accessed by a domain name rather than by a numeric IP address that may change.

Upon installation, the user may access the use case presentation client to run the setup process. In the example embodiment of the multiple services router, the use case presentation client is accessed via a standard web browser on a computing attached to the LAN by typing in the URL "http://central/start." This URL is resolved by the multiple services router to an internal web server that downloads to the web browser a rich Internet application that provides the user case presentation client and indexes to the setup wizard automatically. The setup wizards guide the user through the multiple-step setup process, and in one embodiment appear in the child windows of the use case presentation client.

Figure 6A:
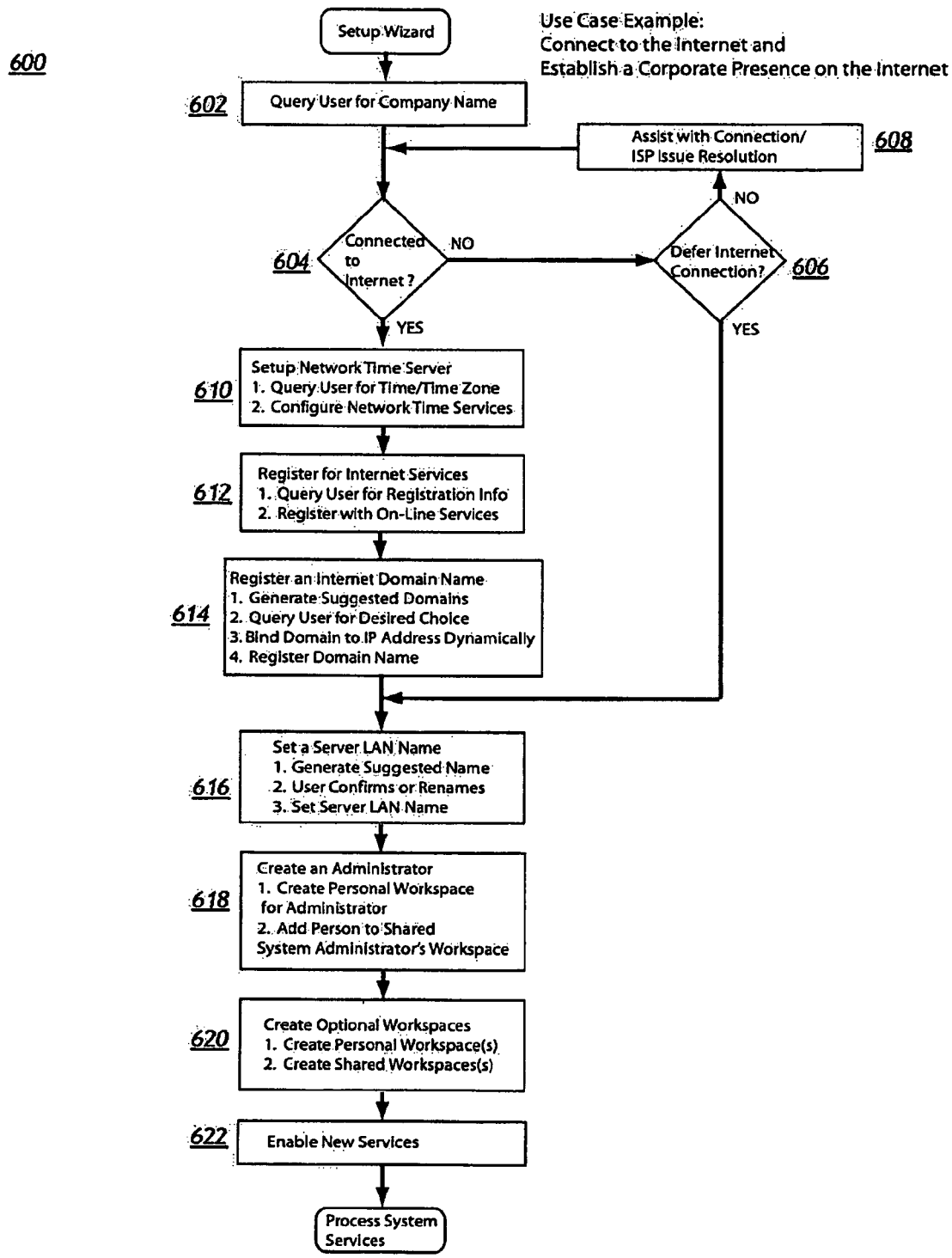
FIG. 6A is a flow diagram showing the use case process for the initial setting up of a shared Internet connection, system registration, domain name registration, and the setting up of a personal workspace with administrative capabilities for the system according to one embodiment.
Figure 6B:
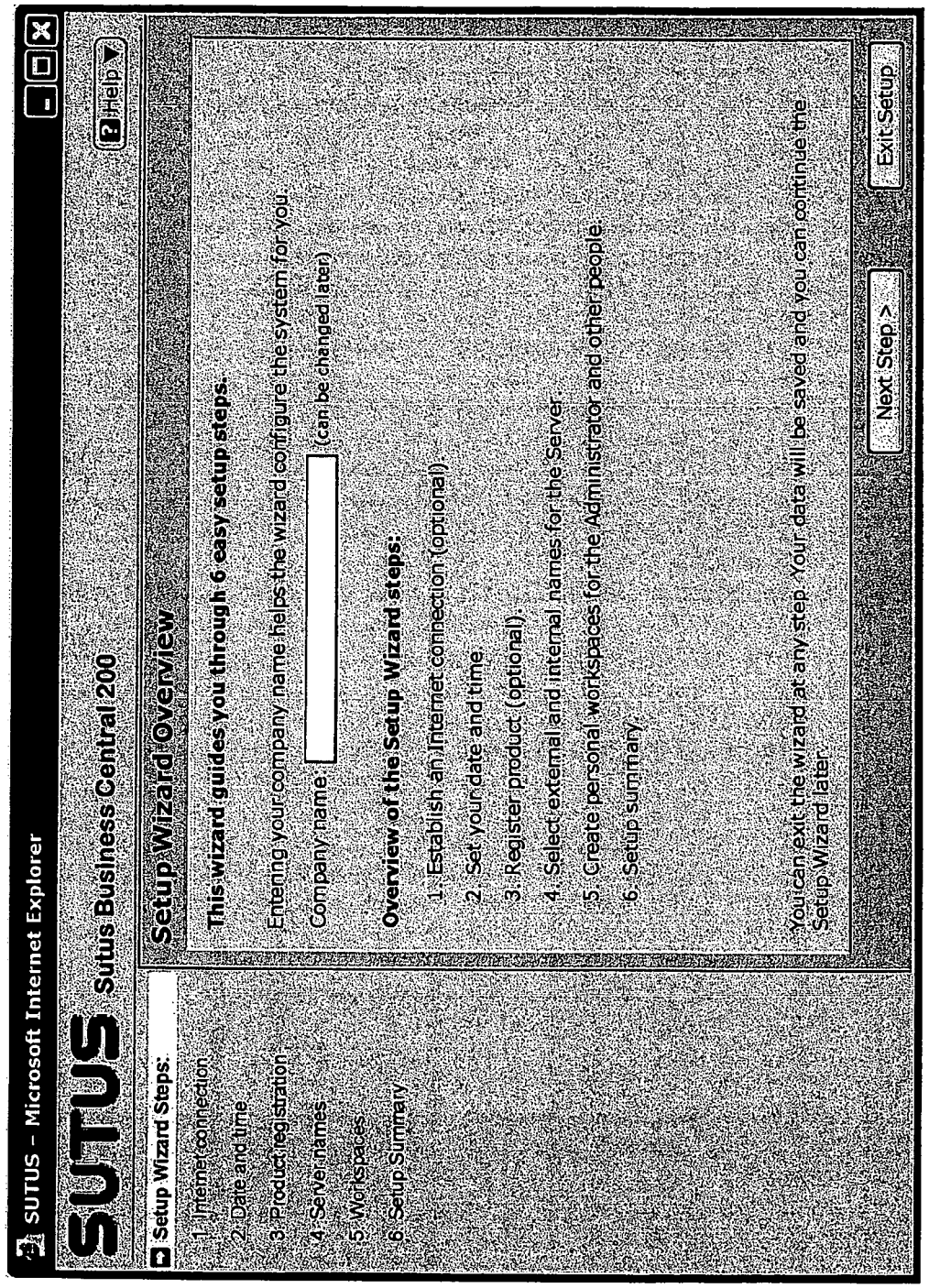
FIGS. 6B-6I illustrate example user interfaces for the initial setup use case according to one embodiment.
Figure 6C:
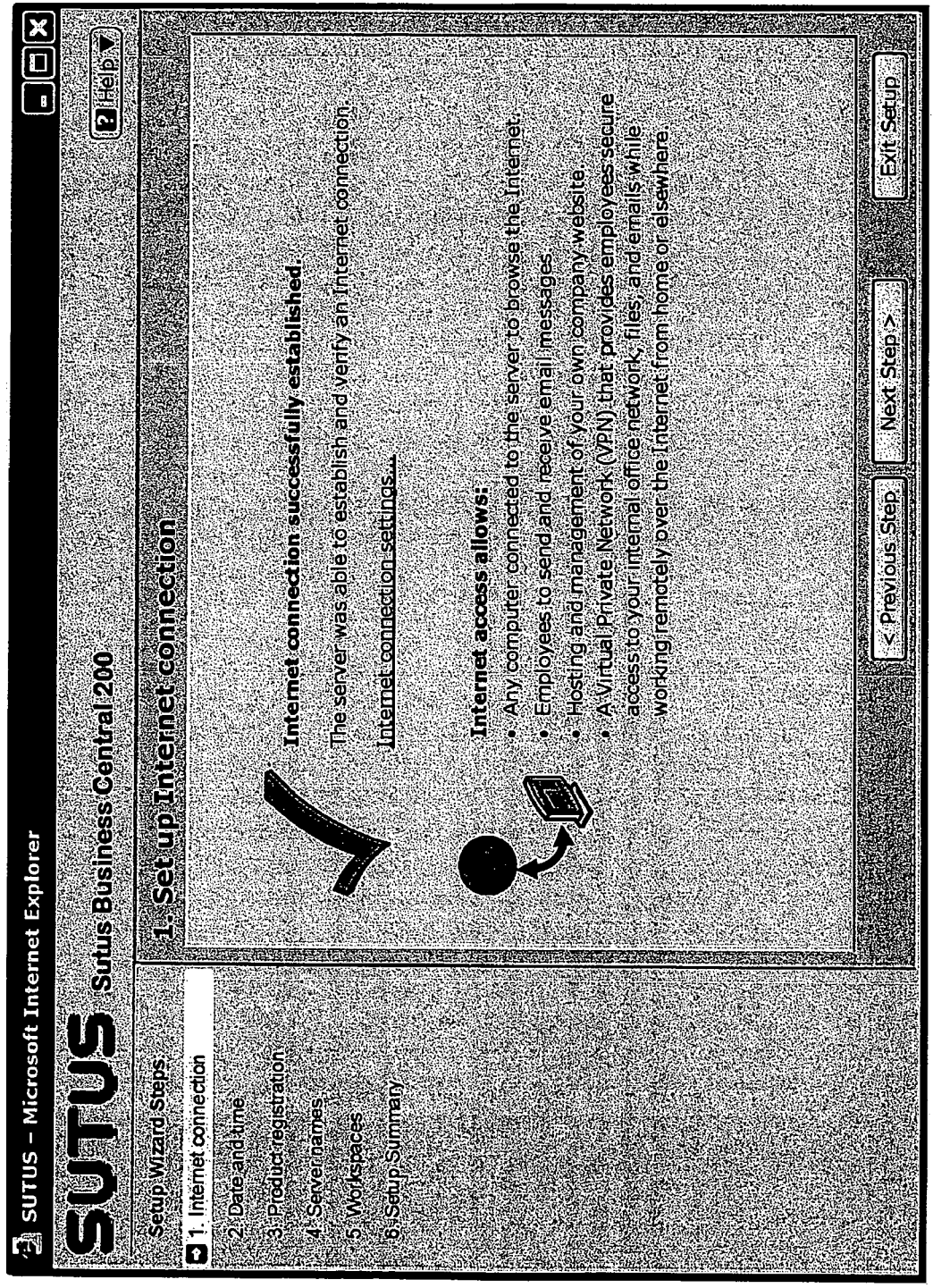
Figure 6D:
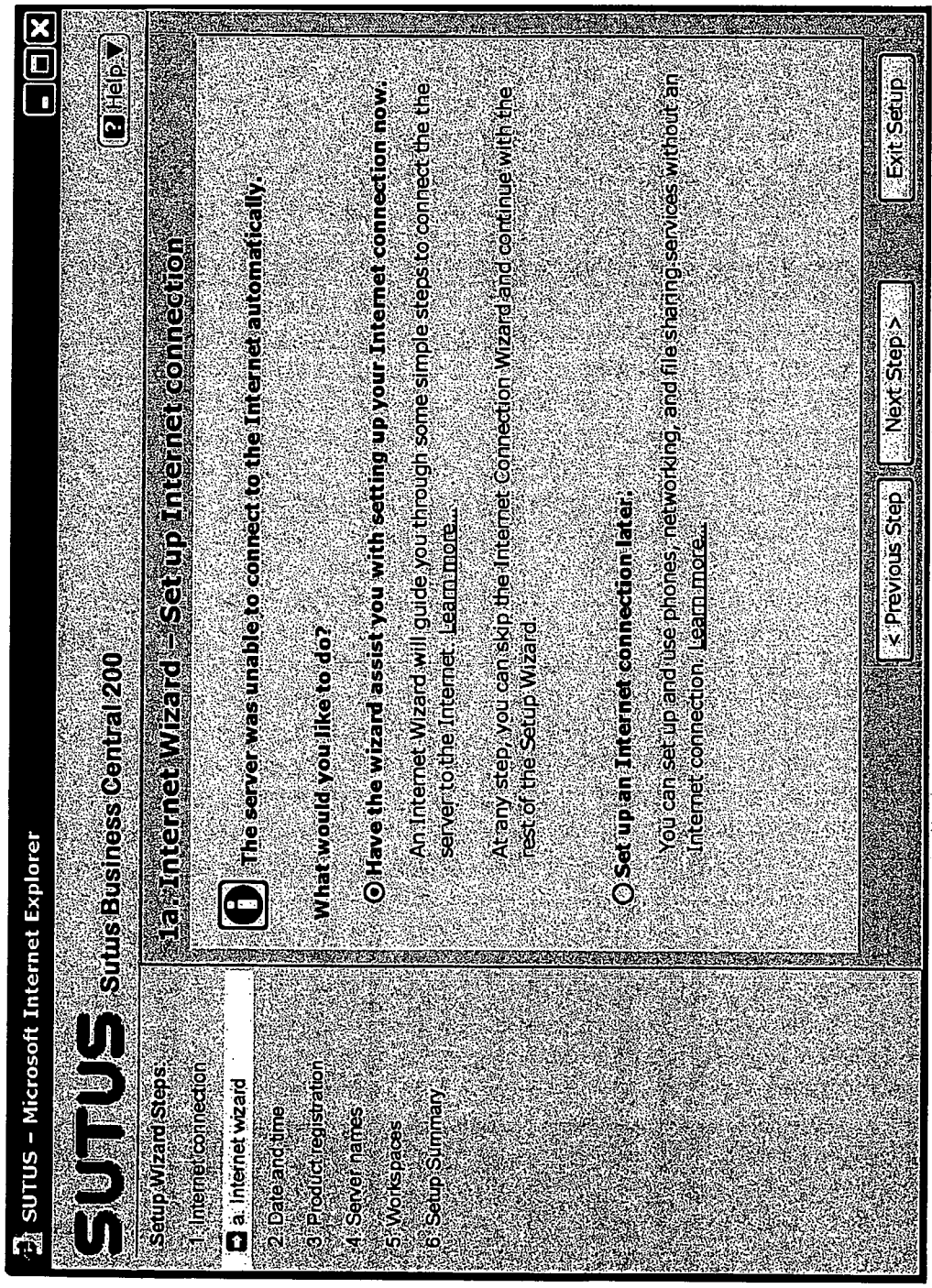
Figure 6E:
Figure 6F:
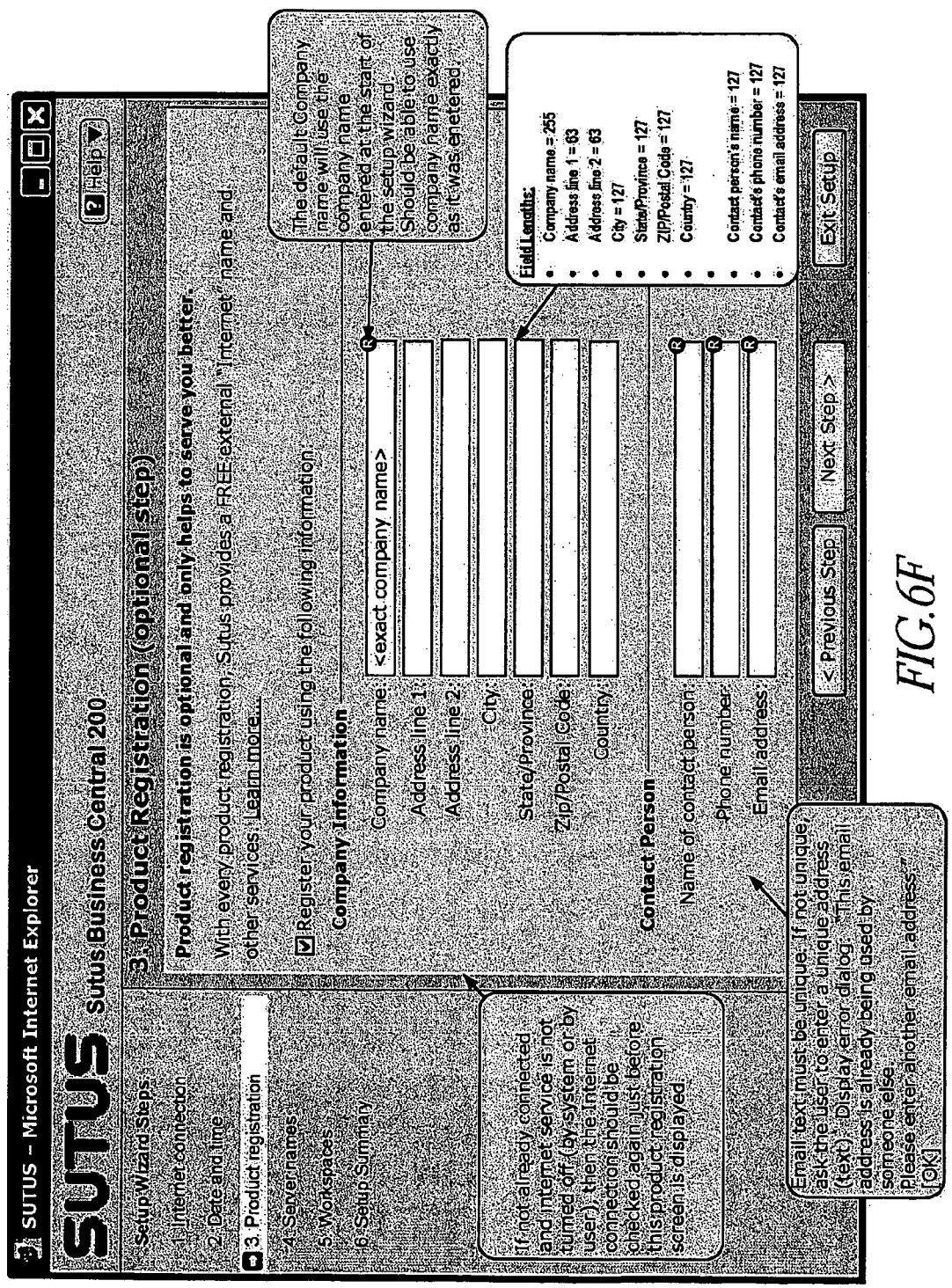
Figure 6G:
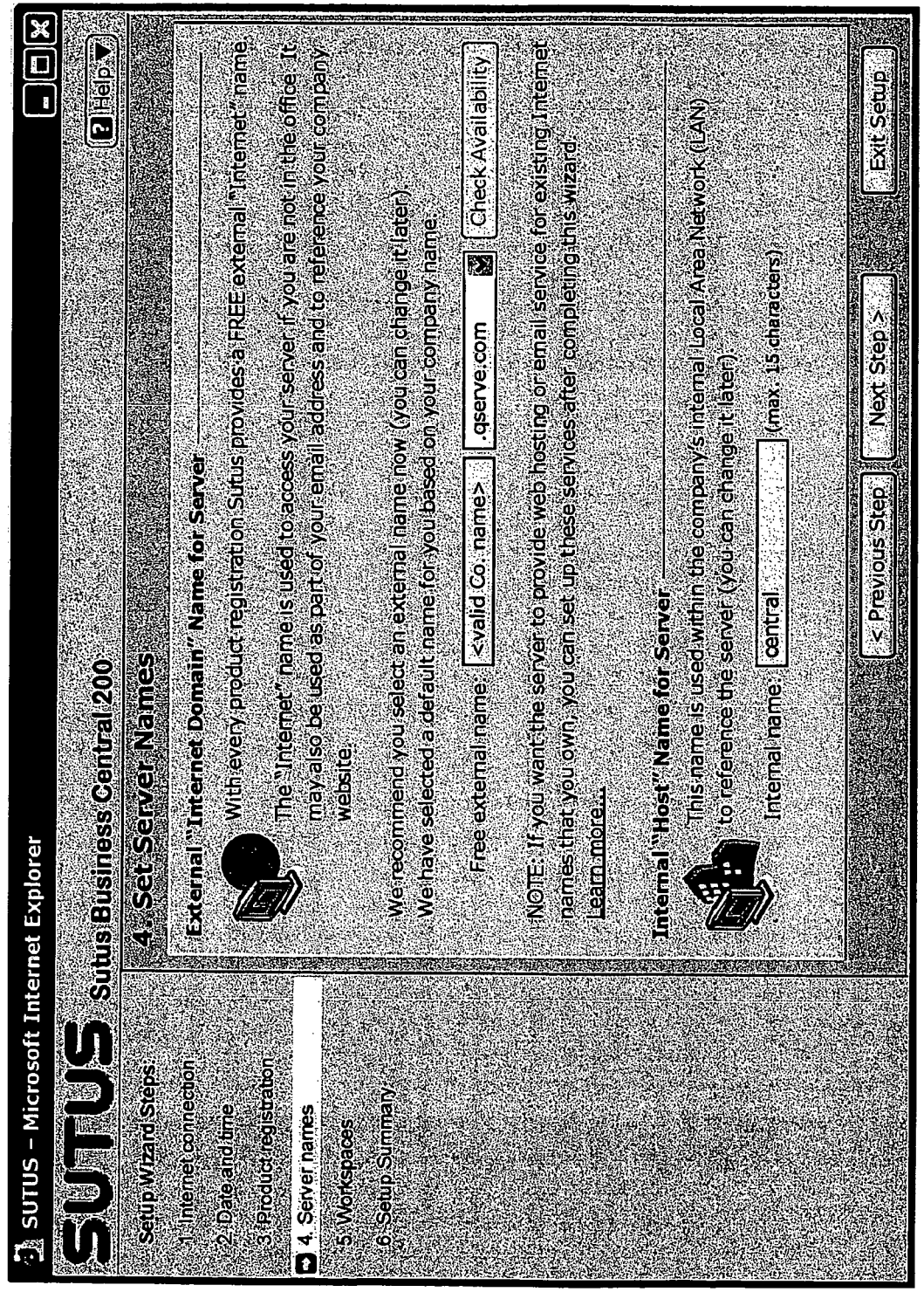

FIG. 6A is a flow diagram that illustrates the setup process as assisted by the setup wizard, and FIG. 6B though FIG. 6G illustrate example user interfaces of the use case presentation client as the setup wizard is executed. FIG. 6A shows the setup process 600. At state 602, the process queries the user for the company name. An example user interface is shown in FIG. 6B, which asks the user to identify the company or organization that will be using the system. At state 604, the process checks for Internet connectivity. FIG. 6C shows the user interface for confirming Internet connectivity. The user interface explains to the user in non-technical language what is involved in this step of the set up process. If Internet connectivity is not detected, the process goes to state 606 to determine if the setup of Internet connectivity can be deferred. If so, the process moves to state 616. Otherwise, if the set up Internet connectivity cannot be deferred, the process moves to state 608, where the process further assists the user in resolving Internet connectivity issues. FIG. 6D shows the user interface of a wizard for helping the user to resolve Internet connectivity issues. As shown, the user interface informs the user that Internet connection was not detected and offers the user a series of guided steps to help resolve the problem.

After Internet connectivity is detected or set up, the process moves to state 610, where the network time is configured. The process queries the user for the time and time zone via an example user interface shown in FIG. 6E. Once the input is received, the process configures the network time services automatically. Then at state 612, the process assists the user in registering for Internet services. The process queries the user for registration information and automatically registers with the appropriate online services. An example user interface is shown in FIG. 6F. These are treated as brokered services in one embodiment. These services may include a Dynamic DNS service, a registration service, email seconding service and relay services, etc. Then at state 614, the process assists the user in registering for an Internet domain name. The process may first generate suggest domain names, query the user for a desired choice, bind the domain name to the IP address dynamically, and register the domain name. At state 616, the process assists the user in setting a server LAN name. The process may generate a suggested name, ask the user to confirm or change the name, and set the server LAN name. FIG. 6G shows an example user interface used to accomplish the tasks performed at states 614 and 616.

Figure 6H:
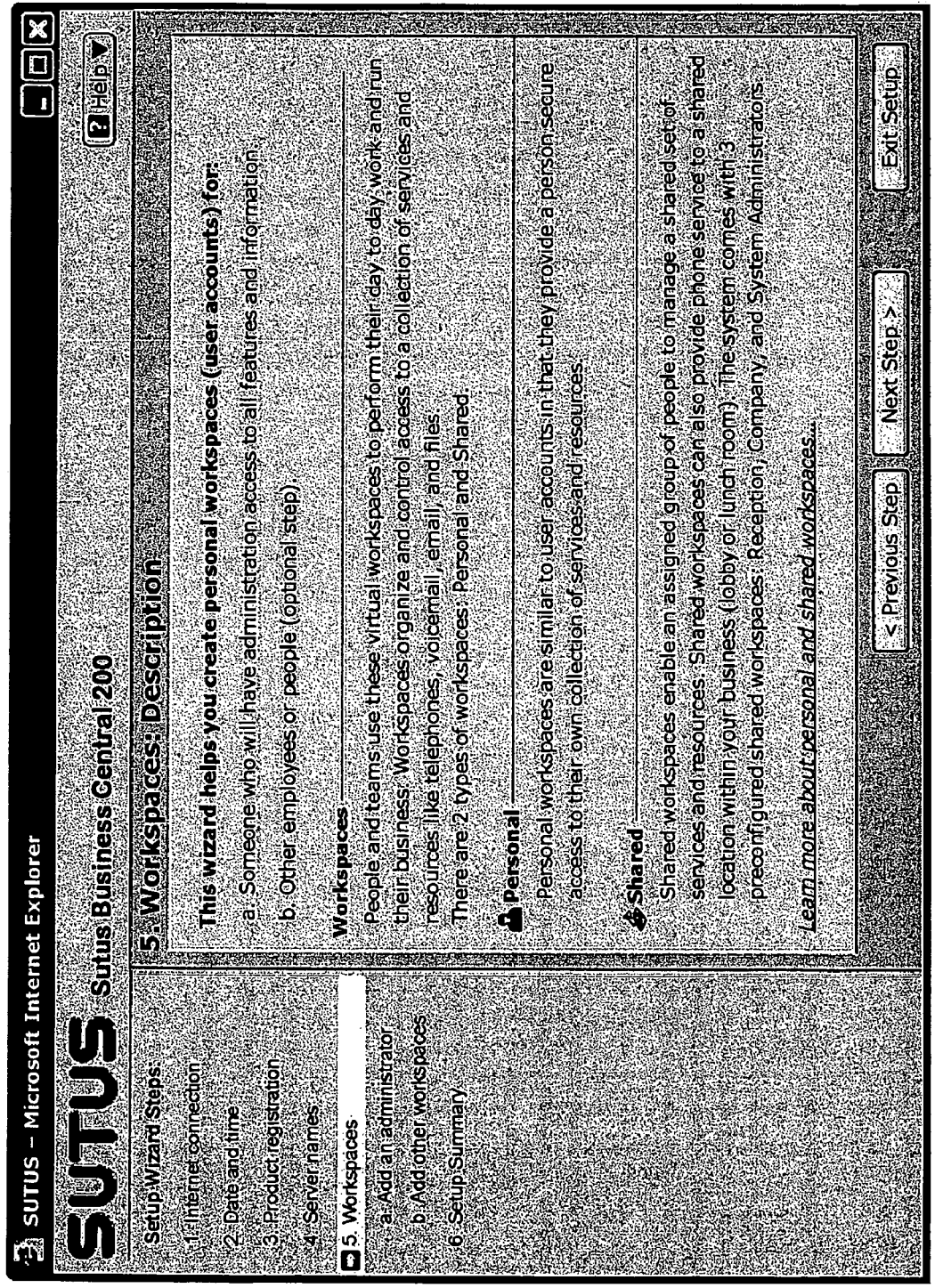
Figure 6I:
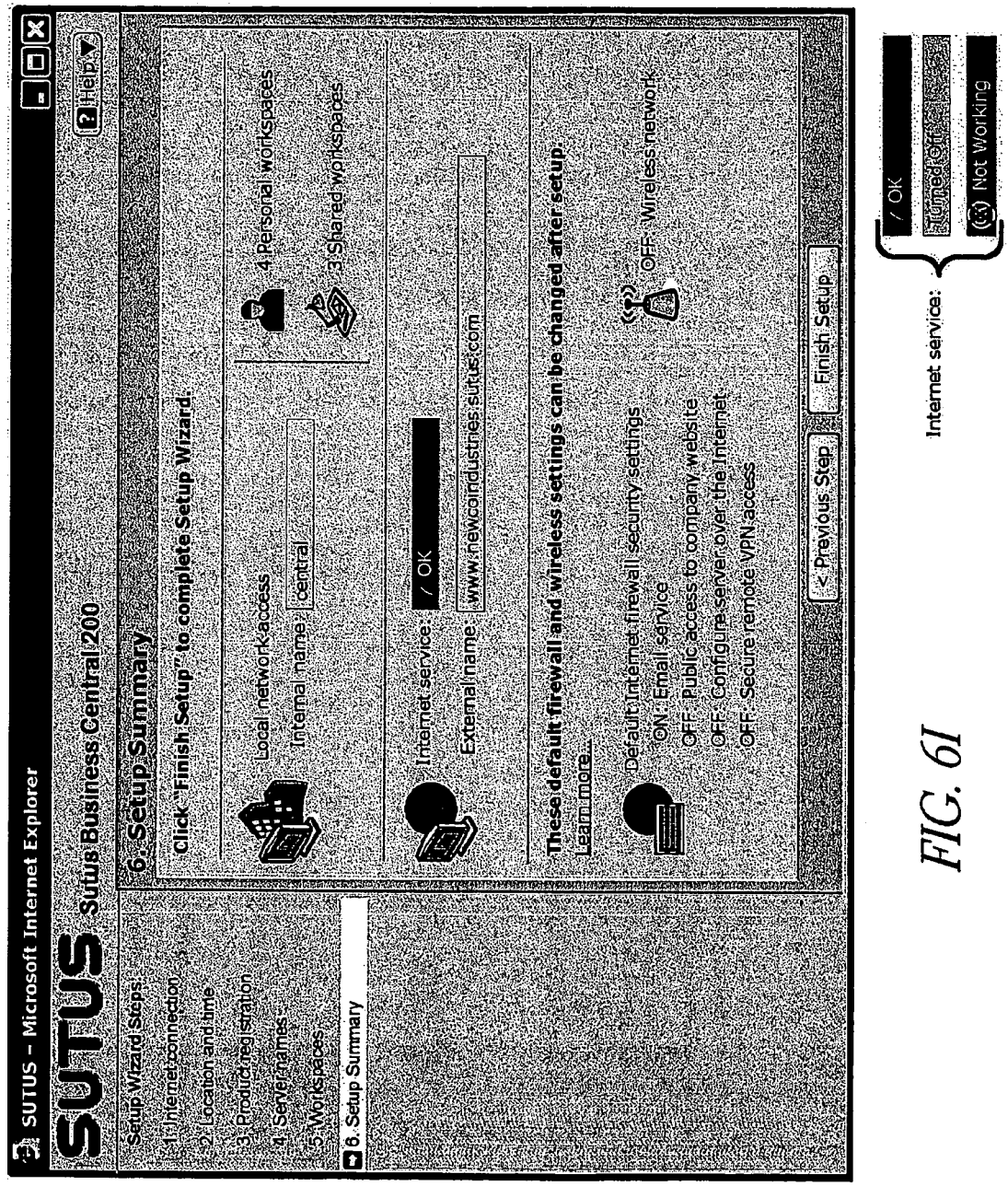

At state 618, the process assists the user in creating an administrator for the system. The process may create a personal workspace for the administrator and add a person to the administrator's workspace. A workspace may include data and voice services as well as other services such as security and identity management. The concept of workspace will be described in more details in the next Section. At state 620, the process assists the user in creating additional optional workspaces including personal and shared workspaces via an example user interface as shown in FIG. 6H. Finally, at state 622 other additional services may be enabled. FIG. 6I shows an example user interface that provides the user a summary of the setup process upon its completion. In one embodiment, the Internet service field within the user interface can be color coded to indicate the present status of Internet service. The color-coded status is an example of how a use case presentation client 206 can incorporate feedback received from the System Status and Alerts component 232.

4.2 Wireless Network Use Case

In one embodiment, the use case-based management system further provides a create wireless network use case that allows non-technical users to setup a secure wireless network. Although wireless networks provide a fast and easy method for add portable devices to a local area network (LAN), wireless network configuration is not well understood by non-technical users. As a result, many wireless networks are not properly secured. The wireless network use case overcomes this problem. In one embodiment, the wireless network may be private or public. A private network is configured to provide access to the primary LAN of the business or organization, and a public wireless network is configured to provide access to the Internet but not the primary LAN. This first use case is most useful where the wireless users are employees of the business or organization, whereas the second use case is most useful where the wireless users are visitors who need access to the wider Internet while on premises but not the business or organization's LAN or services. In this case, access to these resources can only be gained through using VPN services to tunnel through the firewall to the LAN.

Figure 7:
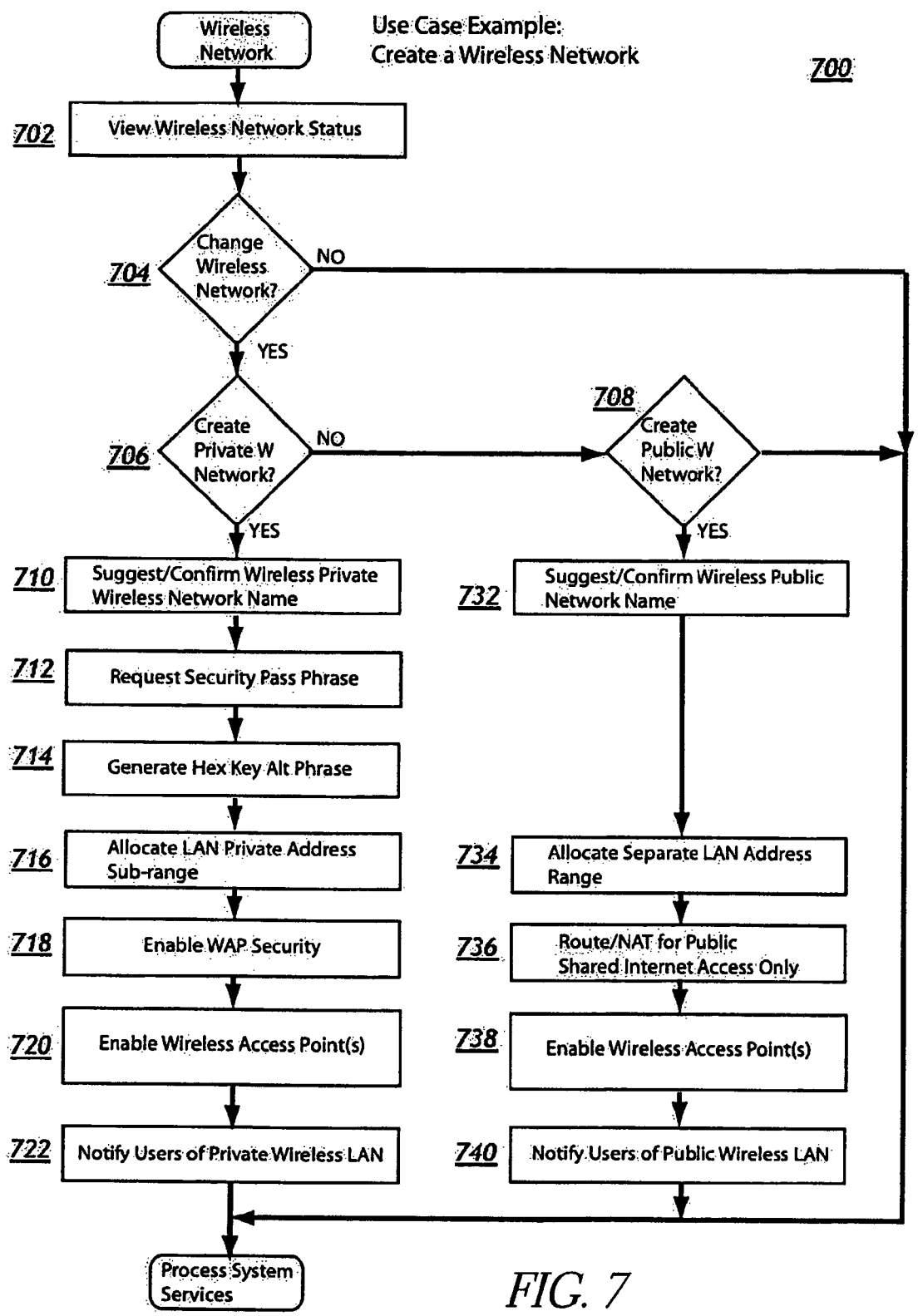
FIG. 7 is a flow diagram showing the use case process for setting up a wireless connection according to one embodiment.

FIG. 7 is a flow diagram showing the use case process for creating a wireless network. At state 702, the process allows the user to view the current wireless network status if there is already a wireless network. The user is given the option to modify the current wireless network setup at state 704. If the user chooses to do so, then at state 706 the user is given the option to create a private or public wireless network.

If the user chooses to create a private wireless network, the process continues at state 710, where the process suggests a private wireless network name and allows the user to confirm it. Then at state 712, the process requests a security pass phrase from the user, and at state 714 the process generates a hex key alt phrase. At state 716, the process allocates a LAN private address sub-range for the private wireless network. Then at state 718 the process enables WAP security for the private wireless network. Wireless access point(s) for the private wireless network are then enabled at state 720 and then at state 722, users of the private wireless network LAN are notified. Once the wireless access point is enabled, the name of the private wireless network is broadcast as the SSID, although an alternative embodiment may choose to not do this. Other notification includes notifying all users of the multiple services router, or alternatively a subset of those users, via secure email, of the private wireless network service and SSID name and security credentials. An alternative embodiment may implement a Radius login server for the private wireless network that would allow users to sign on with the same account names and passwords they use for their personal workspaces on the multiple services router.

If the user chooses to create a public wireless network, the process for creating a public wireless network then follows at state 732, where the process suggests a public wireless network name and allows the user to confirm it. Then at state 734, the process allocates a separate LAN address range for the public wireless network. Then at state 736, the process routes accesses or creates network address translation (NAT) for public shared Internet access only. Wireless access point(s) for the public wireless network are then enabled at state 738 and then at state 740, users of the public wireless network LAN are notified.

4.3 System Backup Use Case

Besides the common need of a wireless network, many businesses or organizations also need backup services. However, due to the difficulties with setting up a regularly scheduled backup system, many small businesses do not have routine backups. Even if a backup is scheduled, correct rotation of backup sets to off-site locations for disaster recovery is frequently neglected.

To solve this problem, in one embodiment the multiple services router by defaults backs up the system to a backup hard drive volume set on a weekly basis. If a second hard drive is added to the multiple services router, it automatically configures the new drive as a RAID mirror to the first drive to provide additional redundancy. Additionally, in one embodiment, backup sets appear in a folder of the system administrator's backup file share and can be "dragged and dropped" to any volume on a networked PC. In one embodiment, the backup process includes an "offsite backup" phase that copies the backup set automatically to an Internet backup service or on-line file storage for disaster recovery. This process may be conducted through a secure channel and may use an encrypted backup set to ensure data privacy in the hands of third parties.

Figure 8:
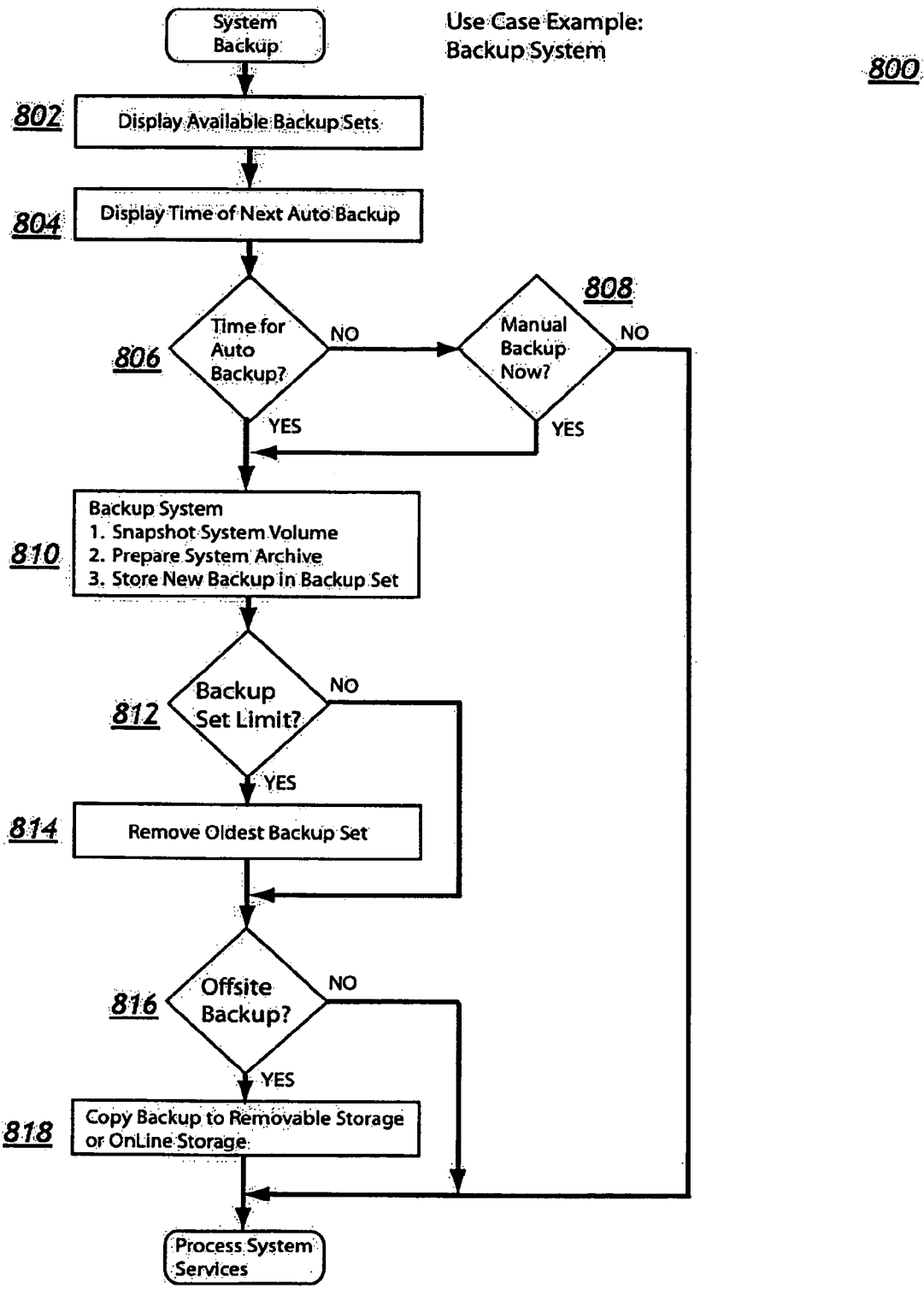
FIG. 8 is a flow diagram showing the use case process for setting up a backup schedule according to one embodiment.

FIG. 8 is a flow diagram illustrating the backup system use case process. At state 802, the process displays to the user available backup sets. Then, at state 804, the time of the next automatic backup is displayed. The process then detects whether it is time for an automatic backup at state 806. If so, a backup is performed. Otherwise, the user can trigger a manual backup at state 808. In either case, the backup proceeds at state 810. In one embodiment, the backup includes taking a snapshot of the system volume, preparing the system archive, and storing the new backup in the backup set. At state 812, the process checks to see if the backup set limit has been reached. If so, the oldest backup set is removed at state 814. Otherwise, the process continues to check whether an off-site backup is needed at state 816. If so, the backup is copied to a removable storage or an online storage at state 818.

5 CONVERGED WORKSPACES

Embodiments of the disclosure provide a system and method to support the creation and management of converged workspaces. As its name suggests, a converged workspace goes beyond the general concept of storing of related files and additionally includes other features such as identity and security management; membership and hierarchy management; file and data storage; and data, voice, and potentially other communications services. In sum, these services and entities converge into a single logical entity—the converged workspace. In various embodiments, the converged workspace includes the ability to manage all of these services within the context of a use case rather than at the underlying technical level of each resource, service, or device that makes up these services. Thus, despite the potentially large number of services that may be included in a converged workspace, the setup and management of these services remain simplistic to the user because of the advantages of the use case construct as previously described.

Three primary types of converged workspaces are implemented in various embodiments—personal workspaces, shared workspaces, and permanent workspaces. Personal workspaces are converged workspaces that provide access to a collection of personal services, devices, and resources of an integrated voice and data IT system. These personal services may include both data and voice services such as personal logins, personal file shares, personal email accounts, personal VPN access service, and personal telephone and voice mail services.

Shared workspaces are converged workspaces that group access to a collection of the shared services, devices, and resources of an integrated voice and data IT system. These shared services may include both data and voice services such as group file shares, shared email accounts, and shared telephone and voice mail services.

Permanent workspaces are shared workspaces that are provided by default in one embodiment. Examples include a company workspace that provides collaborative access for an entire company or organization, a system administrator's workspace for the individual(s) who collectively administer the integrated IT system, and a receptionist's workspace for the individual(s) who provide reception duties for the company or organization. Permanent workspaces allow a considerable enrichment of the intelligent default capabilities that are provided when an integrated system management appliance (e.g., multiple services router) is first plugged in and powered up.

The converged workspace provides a management entity that spans the multiple services and is intuitive to organizations and businesses where individuals and teams are usually assigned physical workspaces with collections of physical devices (e.g., desks, chairs, computers, telephones, etc.). Thus, in contrast to the traditional device-focused IT system management approach, the converged workspace provides a metaphor that is conveniently user-focused and correlates well to existing physical setups of businesses or organizations.

5.1 Converged Workspace Properties

In one embodiment, a converged workspace may have the following properties or include the following services or components.

5.1.1 Identity and Authentication

In one embodiment, a workspace identity spans all of the properties of a converged workspace, enables appropriate access through a workspace authentication service to all network storage and services of a workspace. As such, the workspace identity provides single means of authentication to all workspace services, resources, and devices. For example, the user uses the same workspace name and password to sign into email, file sharing, and virtual private networking services. Telephony services in small businesses traditionally do not require sign in and can be simply accessed by using the physical telephone assigned to the user. However, remote office telephones and soft telephones require the user to sign in appropriately to the virtual private network services for access.

5.1.2 Membership and Hierarchy

Workspaces may be members of other workspaces. Specifically, a personal workspace can be a member of a shared workspace. This allows team or department collaborative resources, services, and devices to be shared. For example, the personal workspace of "John" may be a member of the shared workspace "Accounting Department." As such, the user "John" may receive emails sent to the "Accounting Department" workspace and "John" may also have access to the printer within the "Accounting Department" workspace.

5.1.3 Storage of Data and Files

In one embodiment, a workspace provides file storage in the form of a network file share with appropriate file access permissions control for a user or group of users. This configuration provides a robust central file storage location distinct from the user's computer and the files are accessible using standard local network file access protocols such as SMB (Server Message Block). The following auxiliary attributes are also provided:

Privacy and Collaboration: The user or members of a workspace are free to create hierarchies of directories in each workspace network file share as they see fit. Each subdirectory in the workspace network file share inherits the permissions of the parent directory. A sub-directory of each file share is automatically created by the use case-based management system to allow for the sharing of data and files with others in a read-only fashion. This allows for a natural privacy of information for those users unfamiliar with the technicalities of group file and folder permissions within any given computer operating system.

Active Management and Permissions Enforcement: Each workspace network file share is automatically created at the when workspace is created and is actively managed by the use case-based management system. If workspace network file share permissions are altered, the root access control permissions will be re-instated automatically.

Remote and Local Access: Remote access over the public Internet to a workspace network file share is provided through standard secure network VPN protocols such as PPTP (Point-to-Point Tunneling Protocol) and IPSec (Internet Protocol Security).

5.1.4 Data Communication Services

A workspace may provide data communications services, including email service via standard protocols such as IMAP (Internet Message Access Protocol). Access may be provided to both a primary email box associated with a current workspace and additional secondary email box(es) associated with other workspaces of which the current workspace is a member. In the "John" personal workspace example, the user "John" may be able to access his own email box as well as the email box of the "Accounting Department" workspace, since his personal workspace is a member of the "Accounting Department" workspace. In one embodiment, additional data communications services provided may include instant messaging, presence, SMS (Short Message Service), text paging, and other text or data based services.

5.1.4.1 Email Services

In one embodiment, the email service(s) associated with workspaces may have one or more of the following properties.

Secure Email Access: Workspace email may be accessed using standard email protocols such as IMAP or standard encrypted secure email protocols such as IMAPS.

Multiple Inboxes: A user may access, through his or her workspace, the inboxes for the workspaces of which the user's workspace is a member. This allows for natural separation of personal and team data.

Multiple Clients: The workspace email service stores all emails and updates and synchronizes email across multiple email clients. This allows a PC/laptop and/or a mobile device to have access to the same emails and email status.

Multiple Email Folders or Mailboxes: A workspace provides its user with the ability to create additional email folders or mailboxes to store and sort email as required.

5.1.4.2 Voice Services

In one embodiment, workspace voice communications services include the support of one or more telephone extensions for each workspace, and a number of call flow processing features. A call flow processing feature may handle calls directed to a particular extension and redirect the calls to both non-terminating and terminating destinations in successive stages. For example, an extension can simply terminate in a physical telephone registered to a workspace or the call can be forwarded to other destinations such as an auto attendant, external numbers, voice mail, or other workspaces including shared workspaces. As the call flow proceeds through stages, additional phones and/or workspaces are added into an expanding dynamic call group by branching the call, ringing all destinations in the call group. The call is completed whenever the call flow processing (1) reaches a terminating destination such as a voice mail or an external number, or (2) when a party in the dynamic call group answers the call. In one embodiment, the voice service(s) associated with workspaces may have one or more of the following additional properties.

Do Not Disturb: Each workspace telephone device may have a Do Not Disturb function that causes the immediate skip of that device in the call flow processing. This allows other devices or phones at that stage of the call flow to answer the call. If the workspace telephone is the only destination at that stage of the call flow, the call flow then proceeds immediately to the next stage.

Voice Messaging: Each workspace is provided with voice messaging services in the case the call is not answered. A telephone user interface is provided for accessing voice messaging and mail.

Voice Messaging to Email Forwarding: Voice messages and voice mails are forwarded to the email service as audio enclosures. This allows each workspace to access their voice mail from a PC locally or remotely through VPN or secure email services.

Auto Attendant Services: Workspaces are automatically provided with an auto attendant service, with each workspace entered automatically in the auto attendant directory.

5.1.5 Calendaring

In one embodiment, workspaces support group calendaring by providing, for example, a centralized storage location for calendar information. In other embodiments, workspaces may provide a centralized set of calendars using a calendaring service.

5.1.6 Directory Services

In one embodiment, workspaces provide directory services for workspace file shares, workspace email contacts, and workspace telephone extensions. Access to the directory service is provided via web pages, auto-generated text files, and can be extended to include other directory specific services based on standard directory protocols such as LDAP.

5.1.7 Management Entity

In one embodiment, workspaces are managed as a single use case entity with default properties that set up processes, privileges, and workflows tailored to the application context of the use case-based management system. In one embodiment, these processes, privileges, and workflows are based on the expected or common requirements of small businesses. This single entity setup allows these processes, privileges, and workflows to be easily customized by non-technical users under the user-friendly use case framework.

5.2 Workspace Implementation

In one embodiment, workspace state and metadata are centrally stored with appropriate locking of information records on writes to allow workspaces to be shared amongst multiple clients. In the example embodiment, the storage is integrated with the backing store 218 (FIG. 2A) of the use case-based management system 100.

This centralized storage of state and metadata addresses the need of a user who works both from home and office. For example, a single sign-on identity and credential for each personal workspace grants access to PC clients from multiple locations. As such, files associated with both the user's personal workspace and the shared workspaces of which the user's personal workspace is a member can be stored, modified, or retrieved using industry standard protocols. In addition, communications services that are part of these workspaces can be accessed as well. In one embodiment, email inboxes and other folders can be simultaneously viewed in multiple locations (e.g. office and home). Phone calls directed to the workspace with multiple clients ring all the phones registered to that workspace including any remote phones, with the first phone that is answered receiving the call.

Figure 9:
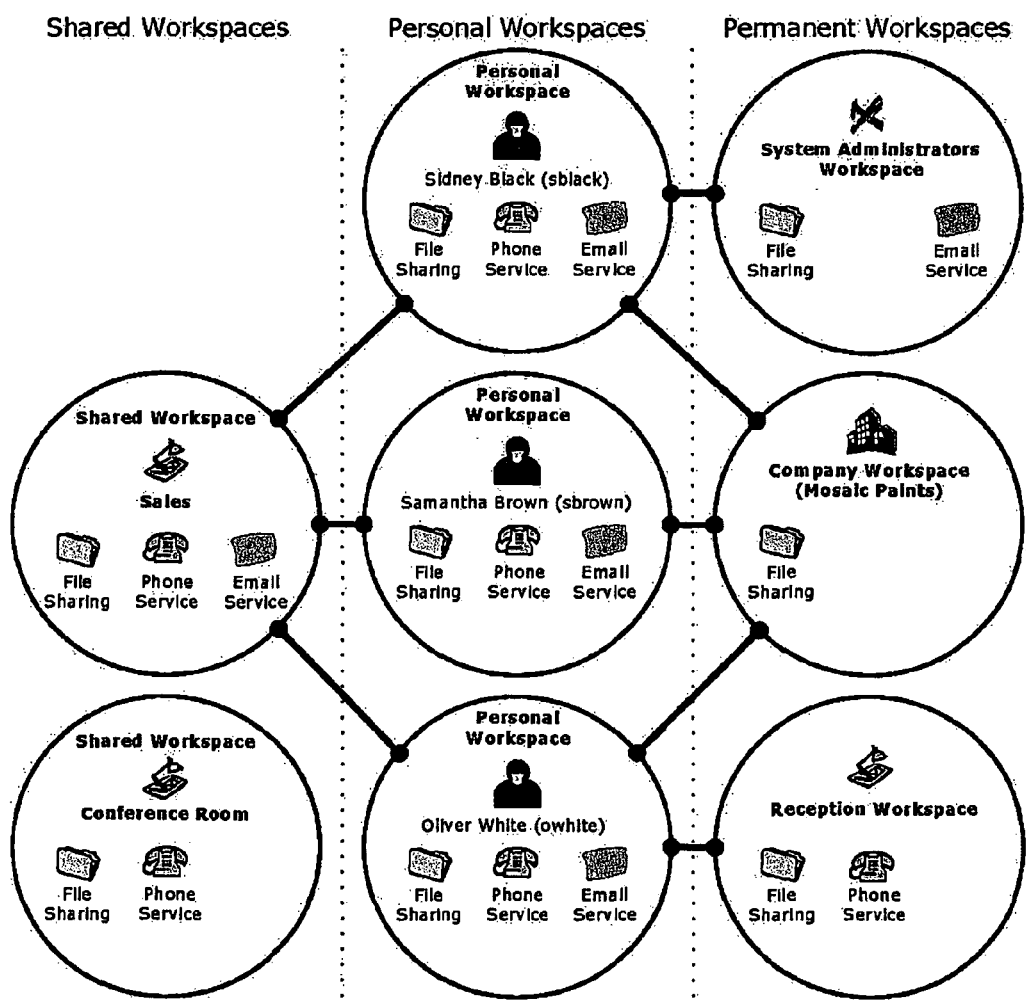
FIG. 9 is a schematic diagram showing the relationship among various types of workspaces in accordance with one embodiment.

FIG. 9 is a schematic diagram that shows various types of workspaces. In particular, the figure illustrates the relationships between personal, shared, and permanent workspaces. As shown, every personal workspace is a member of the permanent Company workspace. This provides a network file share repository for all collateral shared company wide, a corporate wide email address that allows for efficient company wide communications, and possibly a corporate wide telephone paging as well. Specific personal workspaces may also be members of the System Administrator's Workspace (allowing for system management access to files, email, telephone services and management privileges) or the Reception Workspace (allowing for manual reception telephone duties and access to reception resources and services). For example, Sidney Black is a member of System Administrator's Workspace and Oliver White is a member of the Reception Workspace. Beyond these permanent workspaces, personal workspaces may also be members of specific shared workspaces, providing resources and services for collaboration or possibly a shared workstation area such as a conference room.

With respect to the use case-based management system itself, a user with a personal workspace can generally view all use cases and manage the use cases that specifically affect the user. A user whose personal workspace is also a member of the System Administrator's workspace can view and manage all use cases supported by the system.

5.3 Example Workspace Related Use Cases

One embodiment of the use case-based management system is applicable to manage a small business integrated IT system with both data and voice services. Upon start up, the use case-based management system may first go through a set of default initial set up use cases as described in Section 4.1, and may then go on to provide, to the user, the following example use cases that enable specific customization of services to the individuals and teams of an organization.

5.3.1 Use Case for Adding a Workspace for a New Employee

In one embodiment, any user who is a member of the System Administrator's shared workspace can add a personal workspace for a new employee. The sequential steps of this use case may be automated by a user interface wizard in one embodiment. The wizard sets up a personal workspace for that employee and allocates a personal file share, email services, and telephone services for that employee. Other services such as VPN access may also be created as part of the workspace.

Unlike conventional management systems, the use case-based management system captures user or employee information once and each service associated with the workspace is then configured appropriately for the employee, the underlying integrated system, and the use case. For example, if a service associated with a user or employee workspace has particular use cases that affect all services such as call restrictions for telephony services, or outbound call routing to use a particular PSTN or ITSP telephone services, then these use cases would be applied to the services for the user or employee. During the creation of a personal workspace for an employee, automatic suggestions fill in the required fields of the wizard where possible. For example, when the employee name is entered, an appropriate login name is automatically generated, eliminating the need for a user to understand the appropriate rules for forming a consistent login name based on a corporate schema. In one embodiment, the wizard allows the editing of the suggestions if the user wishes to override it.

Figure 10A:
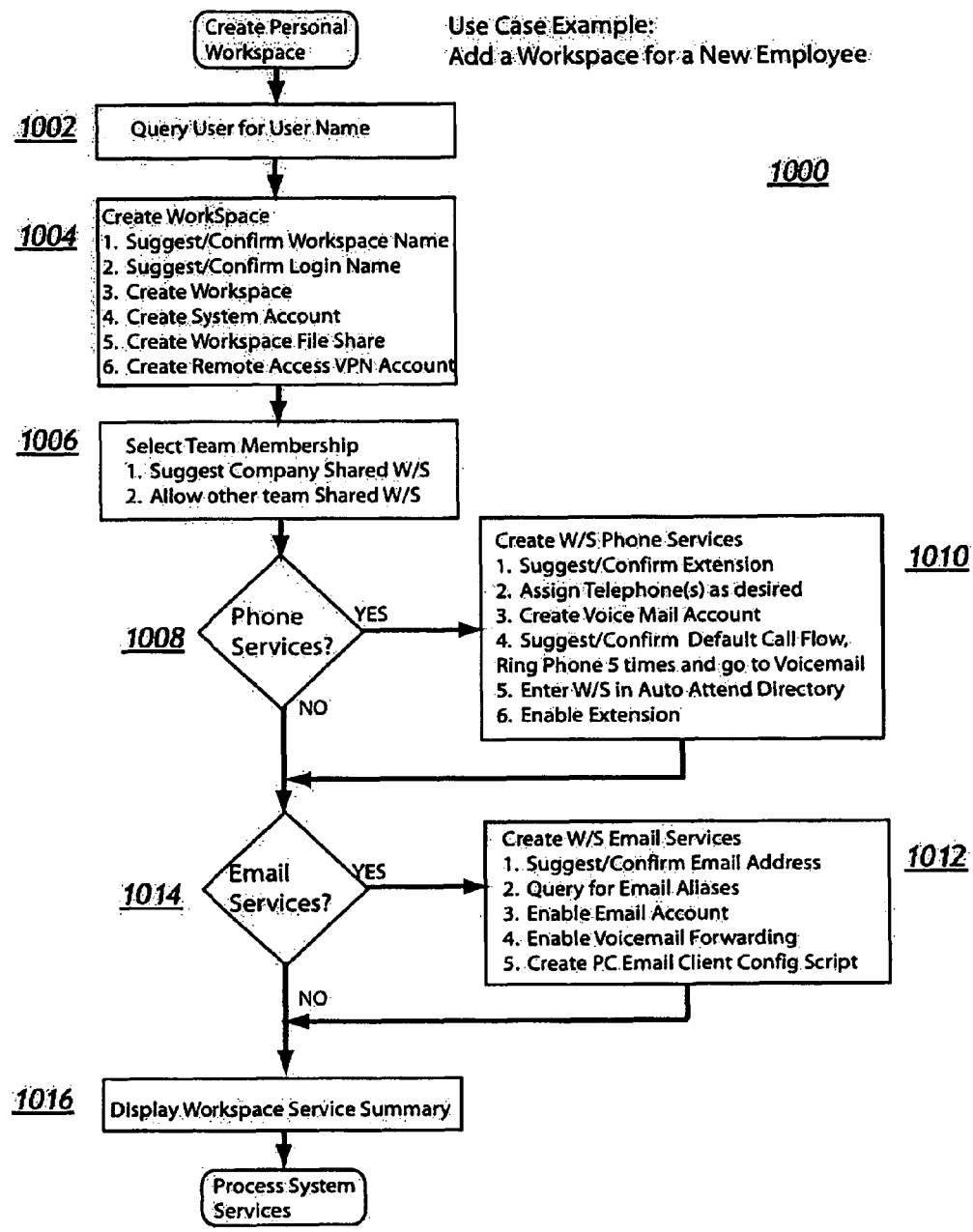
FIG. 10A is a flow diagram showing the use case process for setting up an employee with a personal workspace according to one embodiment.
Figure 10B:
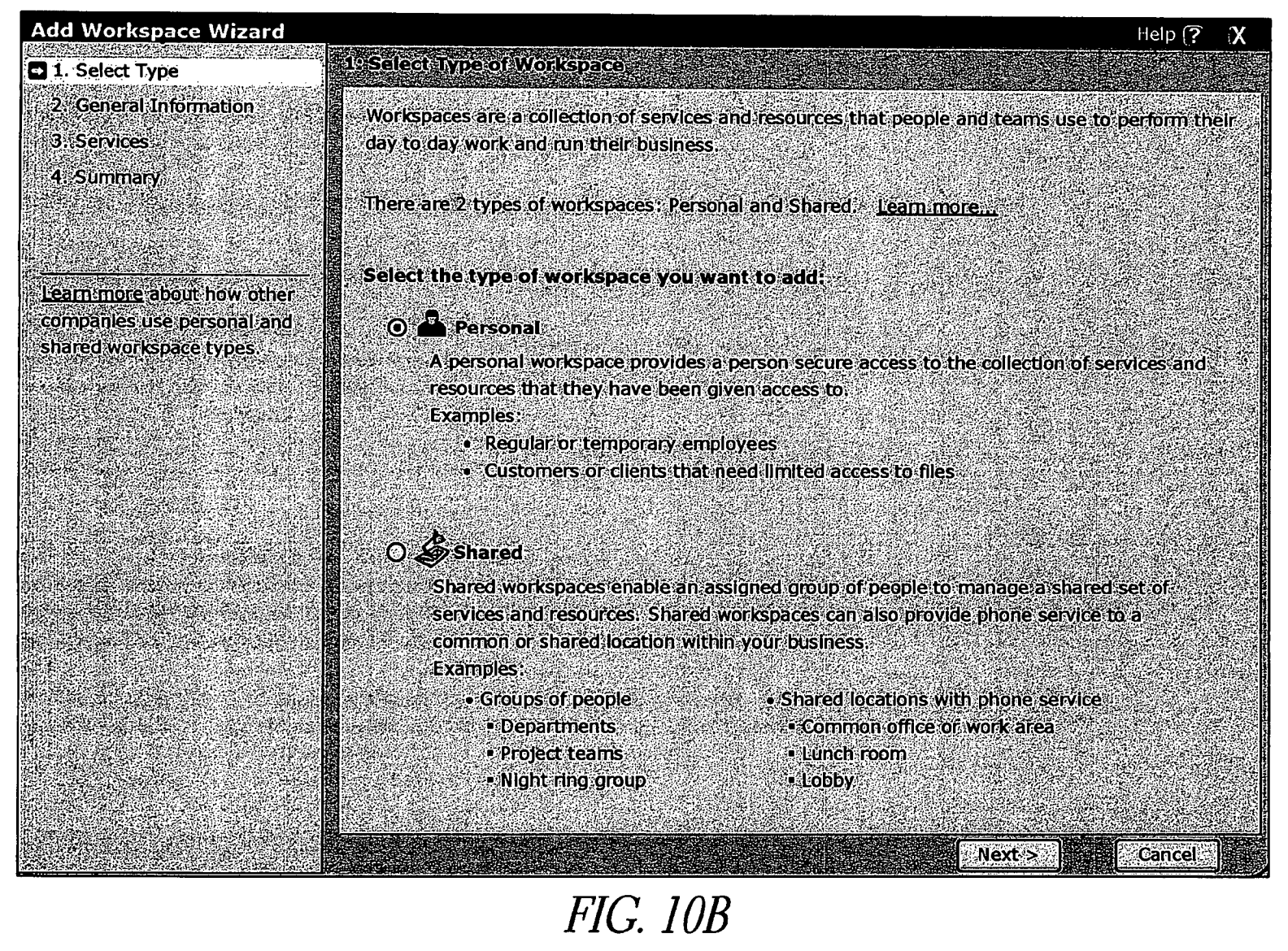
Figure 10C:
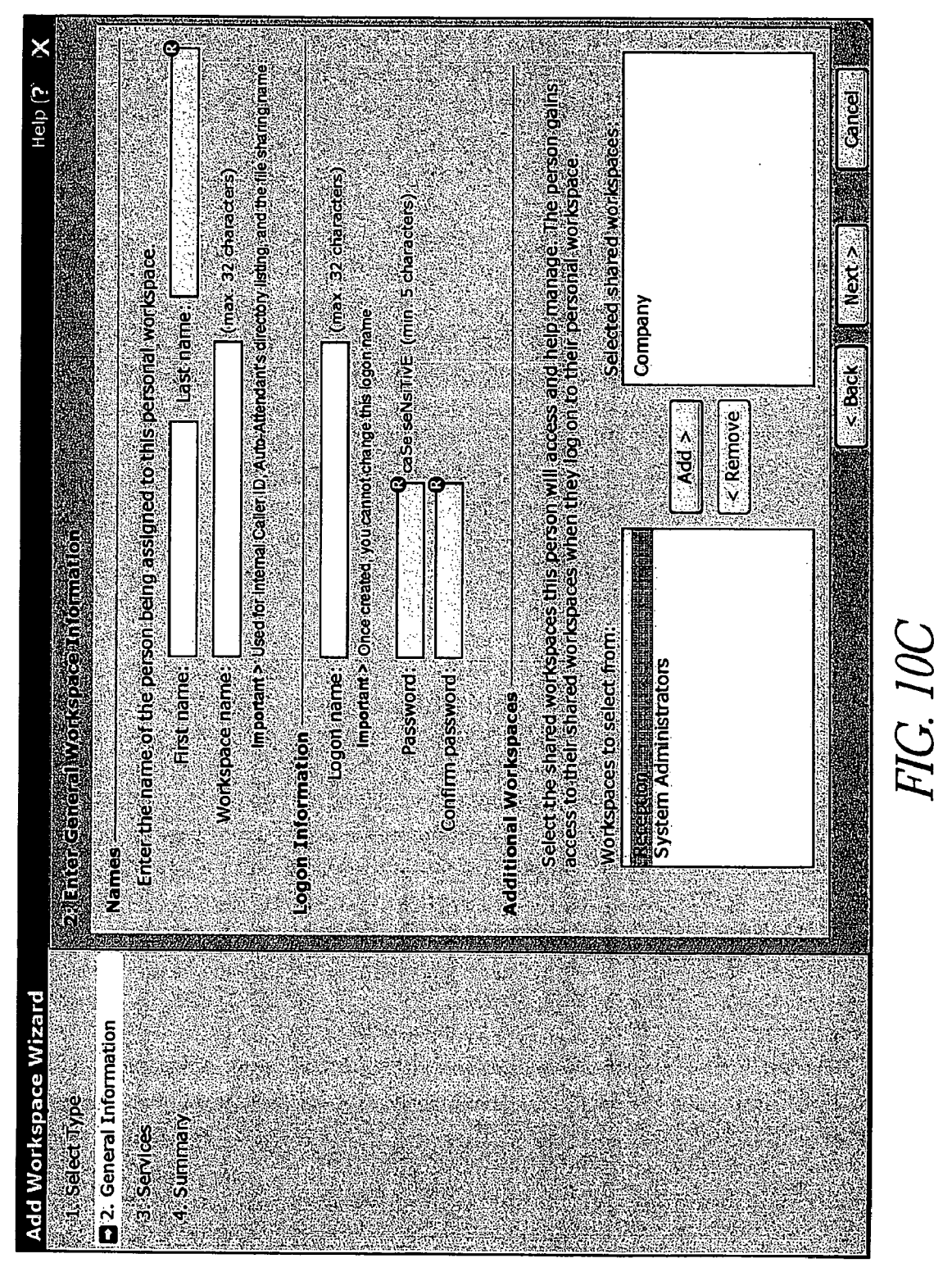
Figure 10D:
Figure 10E:
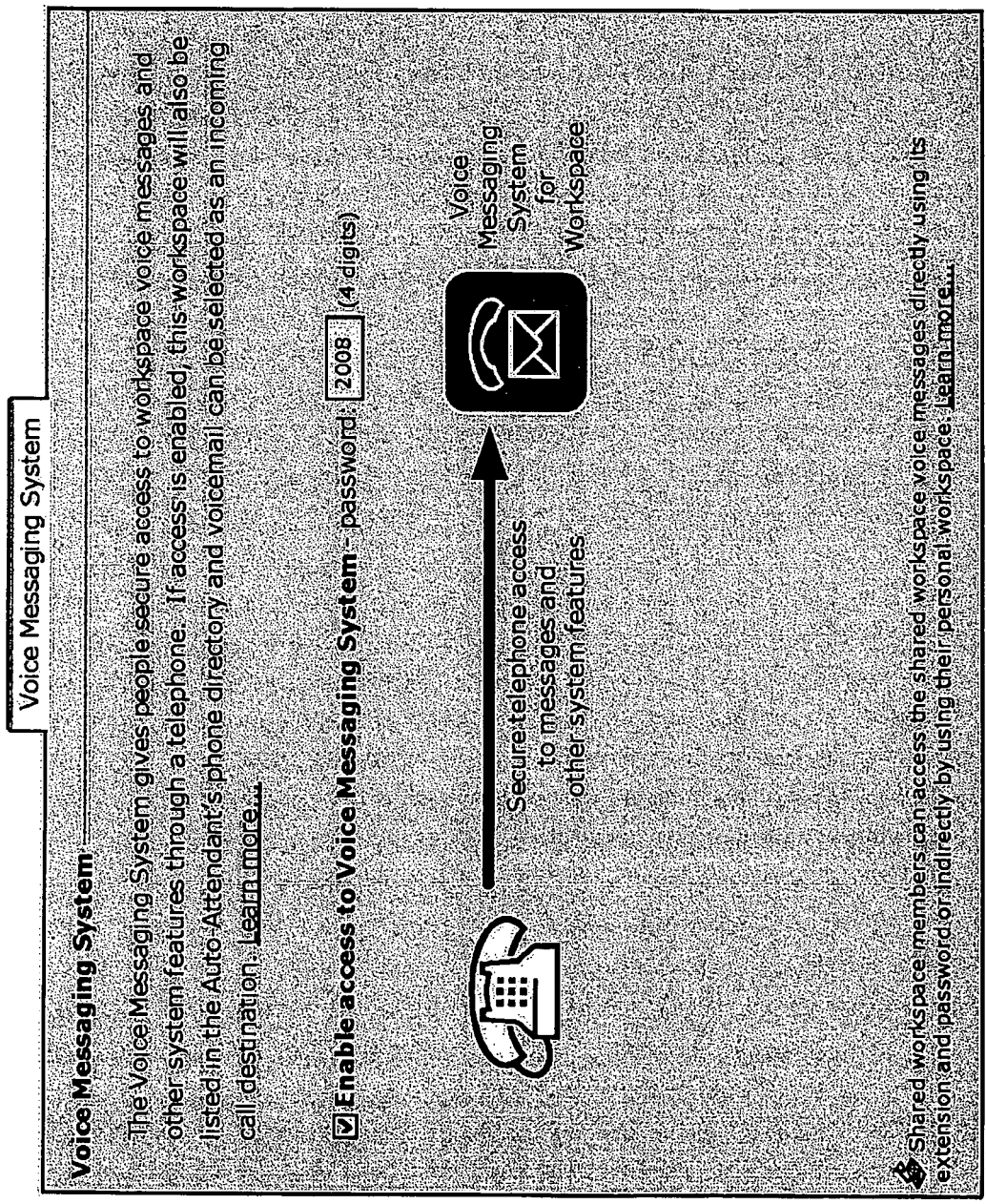
Figure 10F:
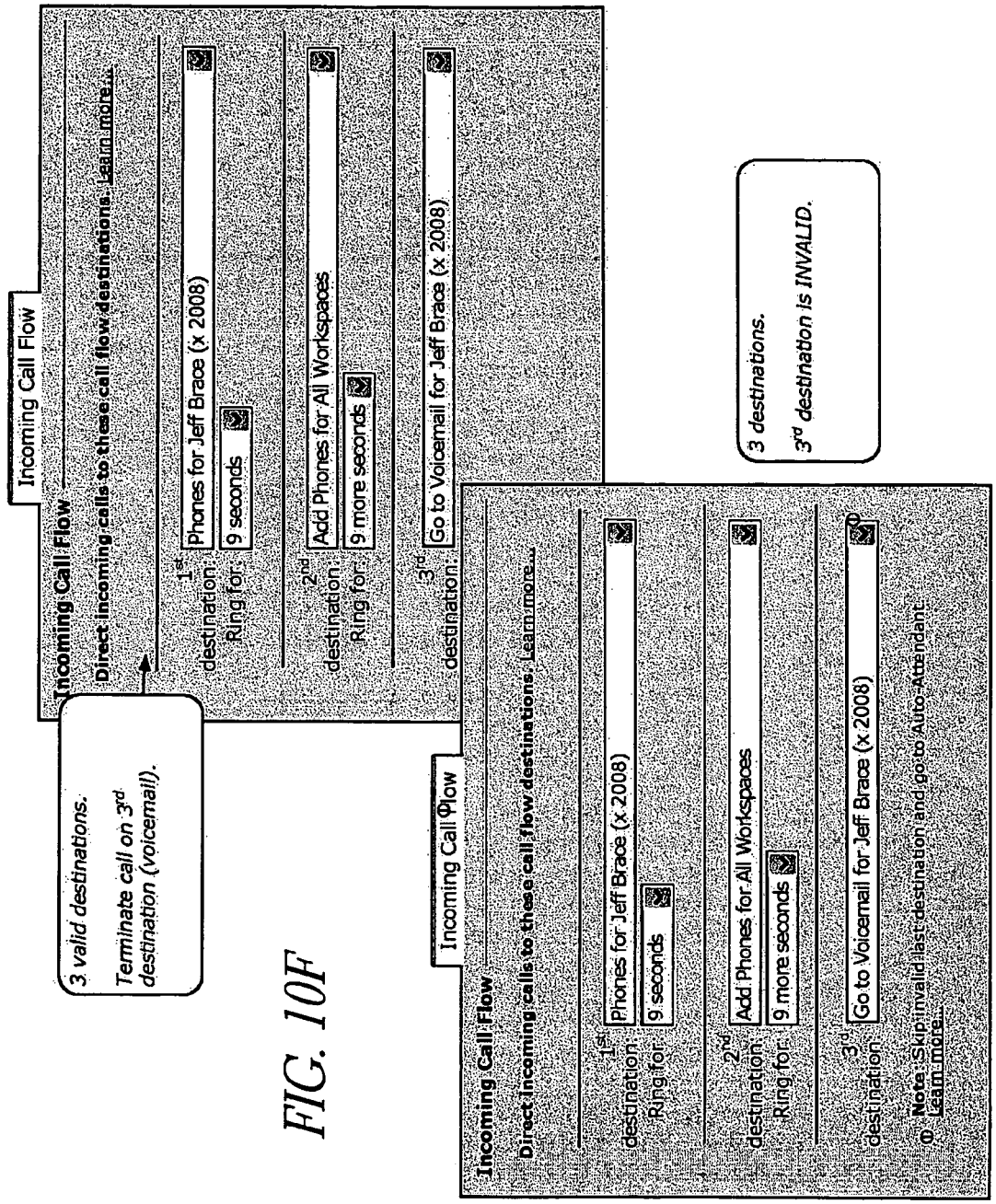
Figure 10G:
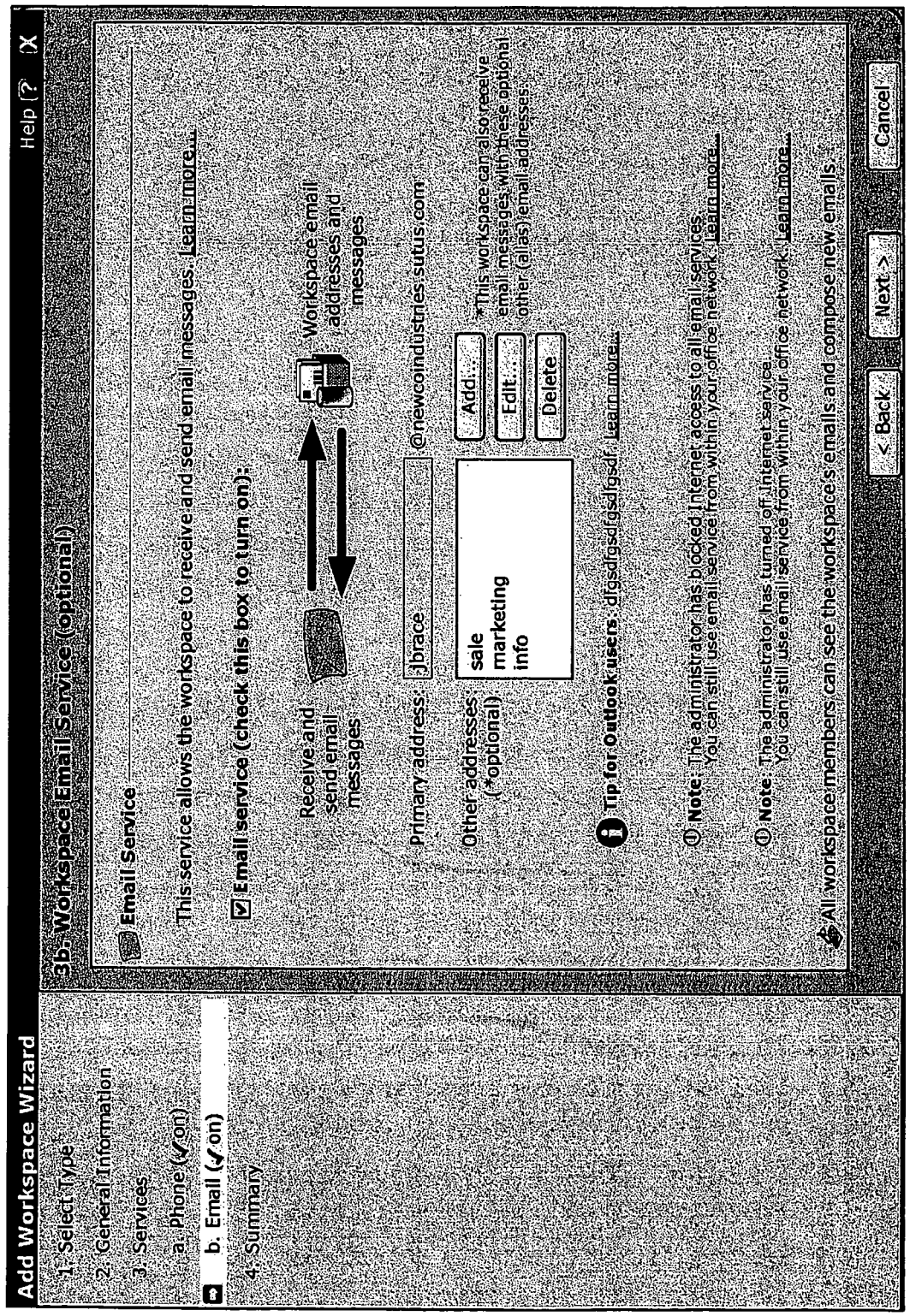
Figure 10H:
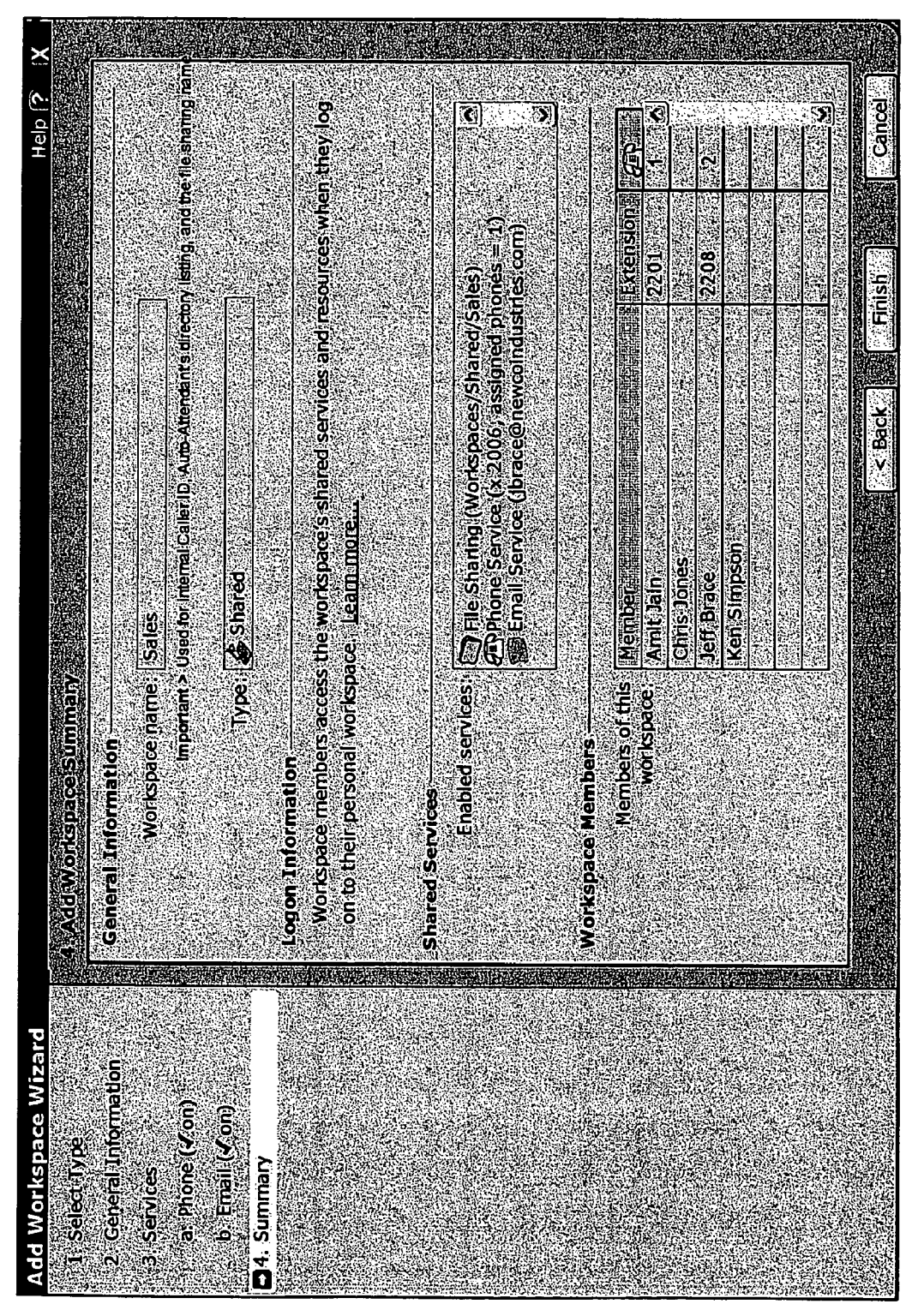

FIG. 10A is a flow diagram that shows the use case process for adding a new employee personal workspace. FIGS. 10B-10H illustrate the user interfaces presented by the use case presentation client during the process. FIG. 10B shows an example user interface of the use case presentation client for displaying the choice of creating either a personal workspace or a share workspace. Once the user selects the creation of a personal workspace, the process (FIG. 10A) begins at states 1002, 1004 and 1006, where the process queries the user for information for the new employee and optional shared workspace membership. The associated user interface is shown in FIG. 10C. Then at state 1010, if phone service is desired, the process asks the user for information relating to the setup of the phone service for the new employee (e.g., extension number and phone assignment). The user interface shown in FIG. 10D allows the user enter information for the phone service and also shows a number of configuration options in tabs across the top. These options allow for additional customization beyond the default selections. For example, FIG. 10E shows the setup details including default values in the Voice Messaging tab. Another example tab, the Incoming Call Flow tab, is shown in FIG. 10F. This tab displays and solicits user input on various options for configuring the sequence, timing, and destinations of incoming calls. In one embodiment, destinations are changeable through a pop-up list of all possible system destinations. Returning to FIG. 10A, at state 1012 the process asks the user for configuration information relating to the email service for the workspace. FIG. 10G shows the associated user interface. In addition to the automatic suggestion of the email address for the workspace, optional adding and deleting of additional email aliases are permitted. This alias capability accommodates employee preferences for nicknames or other monikers as an email address. Finally, in state 1016, a summary of the personal workspace services are displayed so the user can see what services have been setup. An example user interface showing the summary is shown in FIG. 10H.

As shown, the user interfaces associated with the new workspace setup process uses intelligent defaults values tailored to the expected normal usage to expedite the setup process. If the user desires additional customization, tabs leading to additional options allow for adjustment from the expected normal usage.

5.3.2 Use Case for Adding a Workspace for a New Team or Department

The user case process of adding a shared workspace for collaborative services for a new team or department is similar to the process for adding a personal workspace for a new employee. One difference is that, in the shared workspace process, the team or department needs to be identified and the team members are added by selecting from the user's personal workspaces.

Figure 11A:
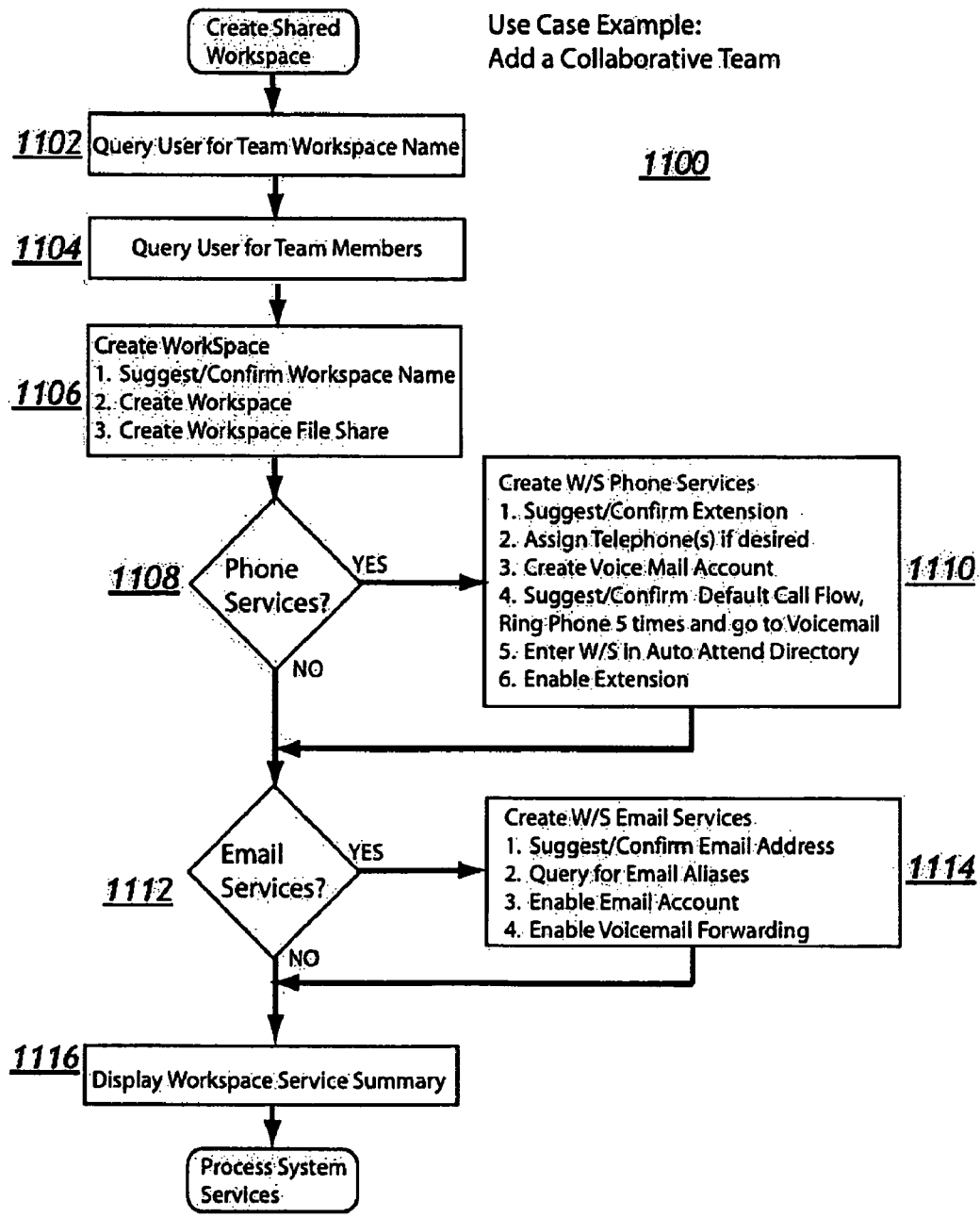
FIG. 11A is a flow diagram showing the use case process for setting up a collaborative team or department with a shared workspace according to one embodiment.
Figure 11B:
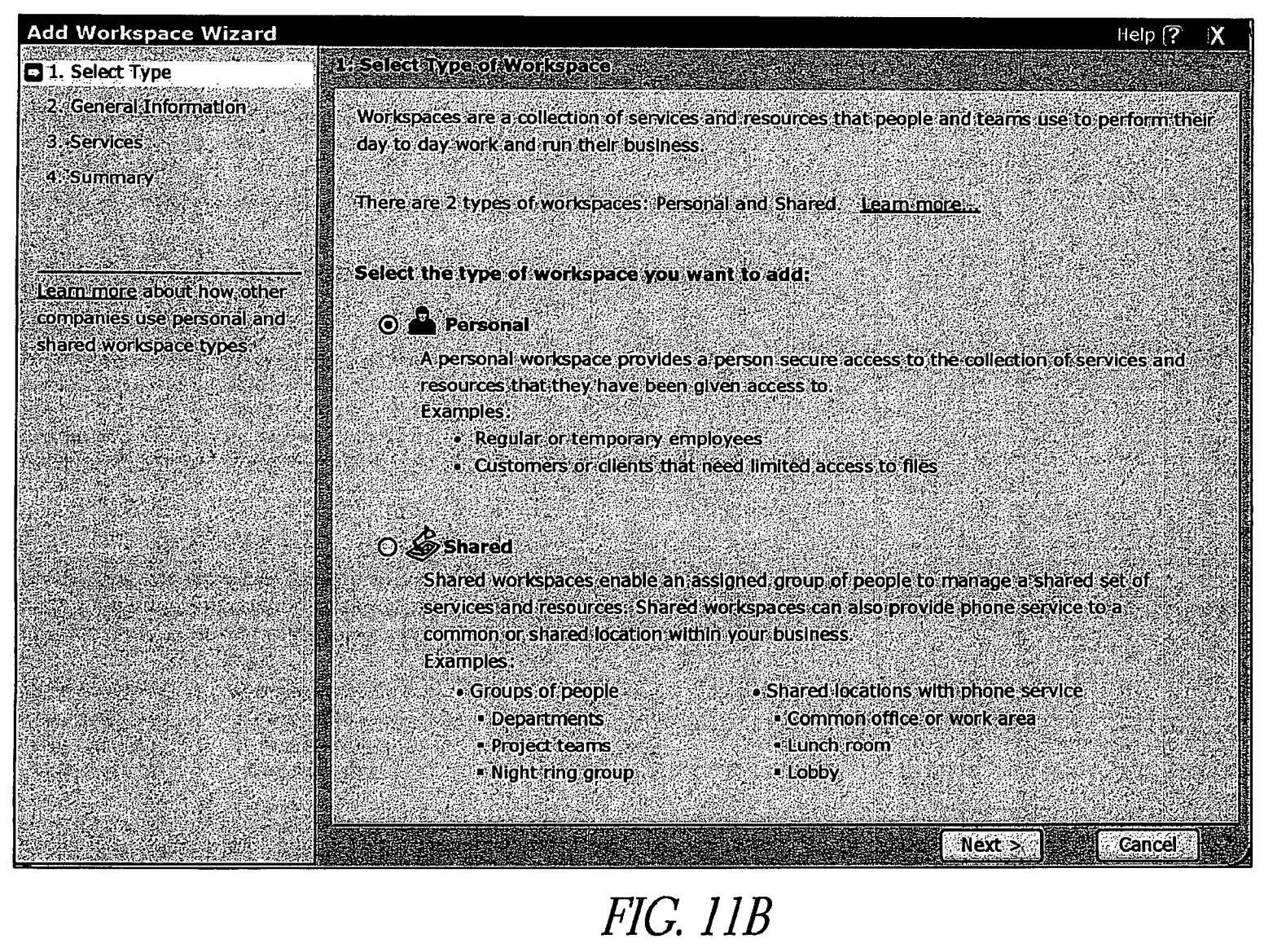
Figure 11C:
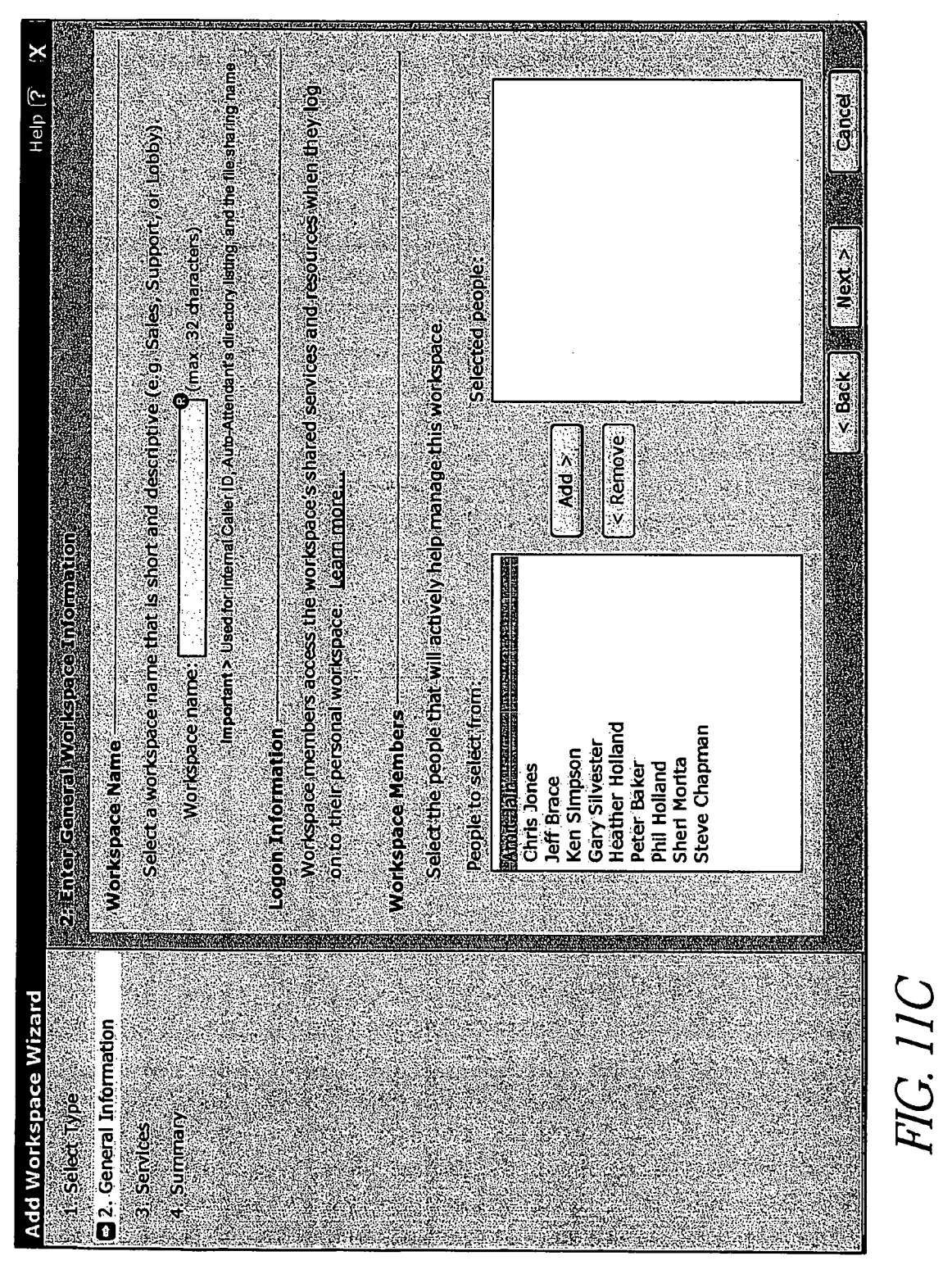

FIG. 11A shows the logic flow of this use case process and FIGS. 11B through 11D show the user interfaces for initial phases. The latter phases of this use case process (e.g., telephony and email setup) are similar to the ones shown for the personal workspace in the previous Section. As with the personal use case example, optional tasks (including voice messaging and call flow) are handled through tabs that lead to additional interfaces for configuring those optional tasks. FIG. 11B shows a user interface that asks the user to choose the type of workspace to be created. If the user chooses shared workspace, the use case process for creating a shared workspace is launched. In FIG. 11A, the process begins at state 1102, where the process queries the user for a team workspace name, and state 1104, where the process queries the user for team members for the new shared workspace. FIG. 11C shows the user interface for gathering the information. The process then moves to state 1106, where a workspace is created. The creation involves confirming the name of the workspace with the user, creating the workspace, and creating the workspace file share. At state 1108, the process queries the user to see if phone service needs to be setup for the shared workspace. If so, at state 1110 the user is given a chance to configure the phone service as with the setup process for a personal workspace. Similarly, at state 1112, the process queries the user to see if email service needs to be setup for the shared workspace. If so, at state 1114 the user is given a chance to configure the email service as with the setup process for a personal workspace. A user interface summarizing the setup is display at state 1116.

5.3.3 Use Case for Adding a Corporate Receptionist

Another use case process allows the addition users to the corporate permanent receptionist shared workspace by adding their personal workspaces as members. In one embodiment, the use case-based management system assumes that an Auto Attendant is desired. To that end, as workspaces are created in the use case-based management system, by default an Auto Attendant directory entry is created for each workspace, allowing the workspace to be dialed by name. In addition, the Reception call flow is processed through to the Auto Attendant automatically. Thus, by default, incoming calls to the company are forwarded to the Auto Attendant to allow the caller to direct their calls internally.

For those small businesses or organizations that prefer human receptionists to answer calls, the Reception Workspace can have a phone added directly to this permanent shared workspace. This may be appropriate, for example, where a permanent reception station exists but may be shared amongst a number of individuals. A benefit of the Reception workspace is it provides shared email, shared file sharing services, and other benefits on behalf of all those with reception duties. An alternative where alternate receptionists sit at other desks within the company or organization is to add the telephones of the members of the Receptionist's workspace into the Reception Workspace Call flow. This would then have an incoming call directed first to the reception phone, then if it is not answered be directed to all the phones of members of the Reception Workspace, and if still not answered be directed to the Auto Attendant.

Figure 12:
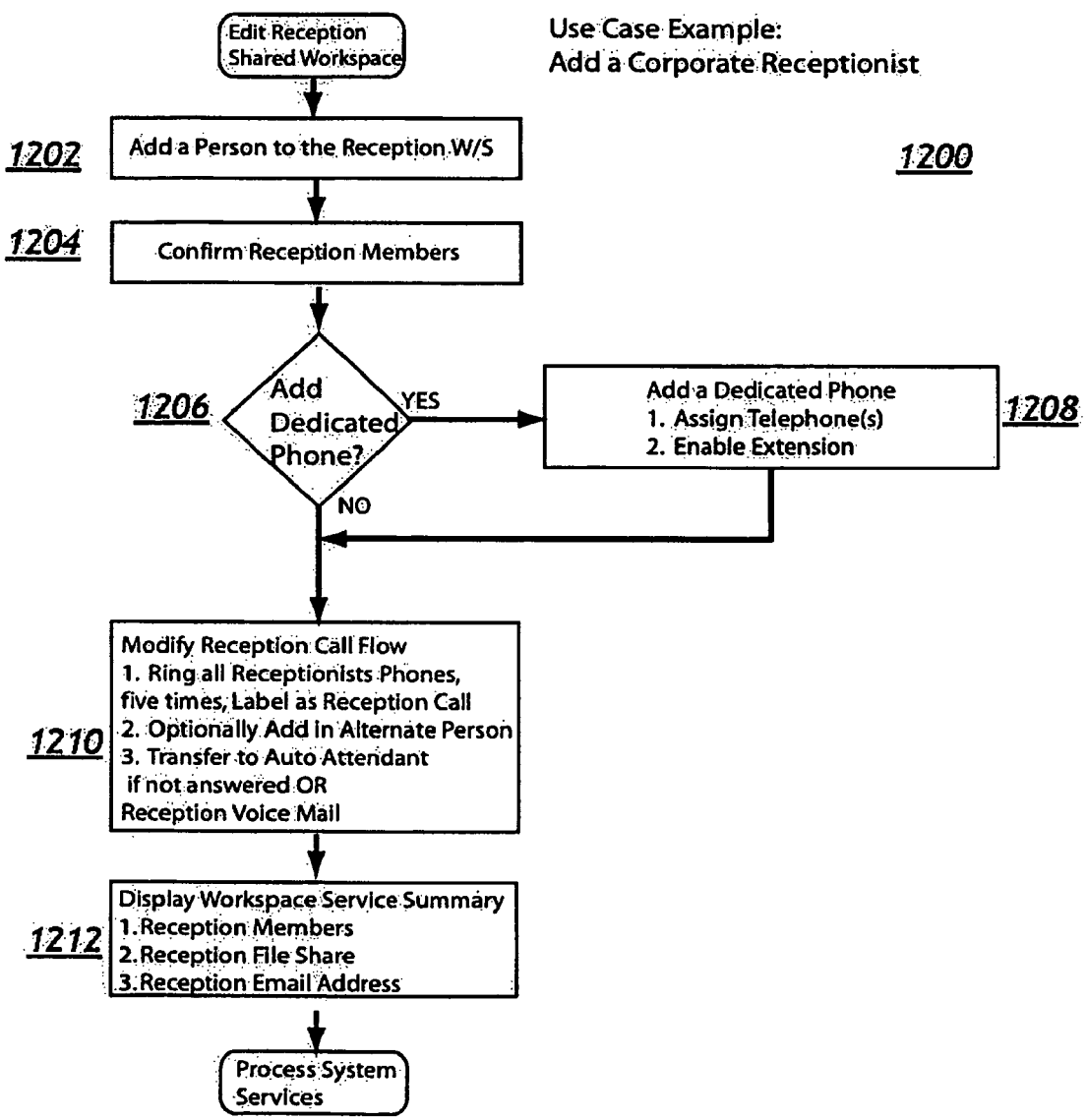
FIG. 12 is a flow diagram showing the use case process of adding a corporate receptionist according to one embodiment.

FIG. 12 is a flow diagram illustrating the use case process for configuring a receptionist workspace to accommodate a human receptionist. At state 1202, a person is added to the Reception Workspace. Then at state 1204, the Reception Members are confirmed. A user is given the option to add a dedicated phone (most likely the line of the human receptionist) at state 1206. If selected, the user configures the dedicated phone at state 1208. Then at state 1210, the user can configure the Reception Call Flow. In one embodiment, personal workspace(s) are added into the Permanent Reception Shared Workspace. The Call Flow may thus first ring all Receptionist Phones several times, and label the incoming call as a Reception Call. Thus all phones of workspaces that are members of the Reception Workspace will ring. When a dedicated phone is added, the Reception Workspace Call Flow can be set to ring that phone first, followed by the members of the Reception Workspace. Then the call may be transferred to an Auto Attendant or the human receptionist's voicemail if it is not answered. Finally, at state 1212, a summary of the Reception Workspace is displayed.

6 REMOTE SERVICES

Figure 13A:
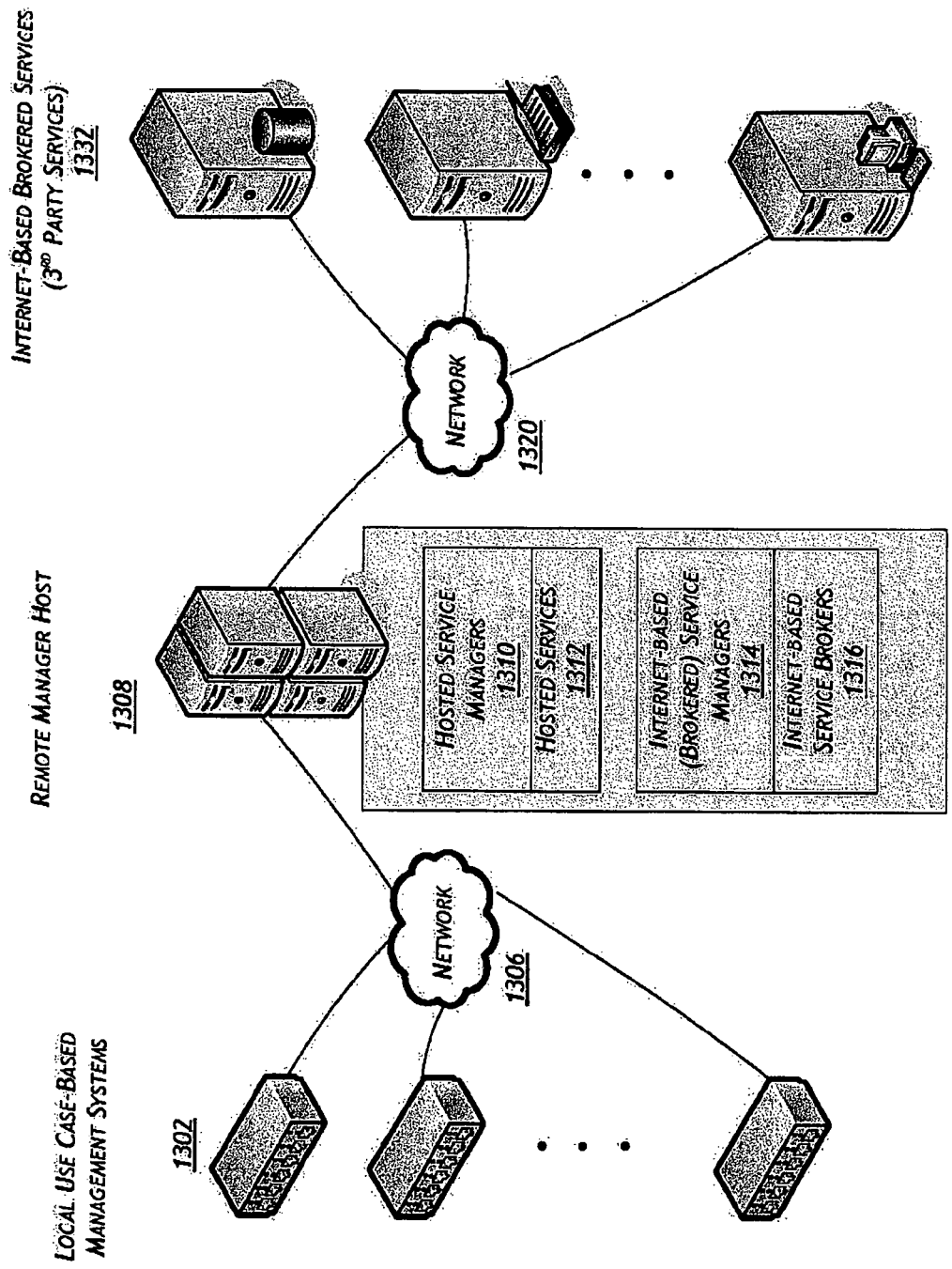
FIG. 13A is system block diagram showing the application environment of the remote service management embodiment.

In addition to managing local LAN-based services, resources, and devices, the use case-based management system may be applied to manage entities (services, resources, and devices) that may be located remotely and accessed over a wide area data network such as the Internet. FIG. 13A shows a use case-based management system embodiment that can manage additional remote services. As shown, a number of use case-based management systems 1302 are connected via a network 1306 to a remote manager host 1308. In one embodiment, the use case-based management systems are implemented on integrated system management appliances (e.g., multiple services routers) as previously described in conjunction with FIG. 4.

In one embodiment, there are two types of remote services—hosted services and Internet-based services provided by parties other than that which hosts the remote manager host 1308. The remote manager host 1308 may host one or more hosted service managers 1310 and one or more hosted services 1312. In one embodiment, the remote manager host 1308 may additionally host one or more Internet-based (brokered) service managers 1314 and one or more Internet-based service brokers 1316. The hosted services 1312 may be provided directly to the use case-based management systems 1302 connected to the remote manager host 1308. One or more Internet-based services 1332 may be connected to the remote manager host 1308 through a network 1320. These Internet-based services are brokered through the service brokers 1316.

6.1 Brokered Service Management

Figure 13B:
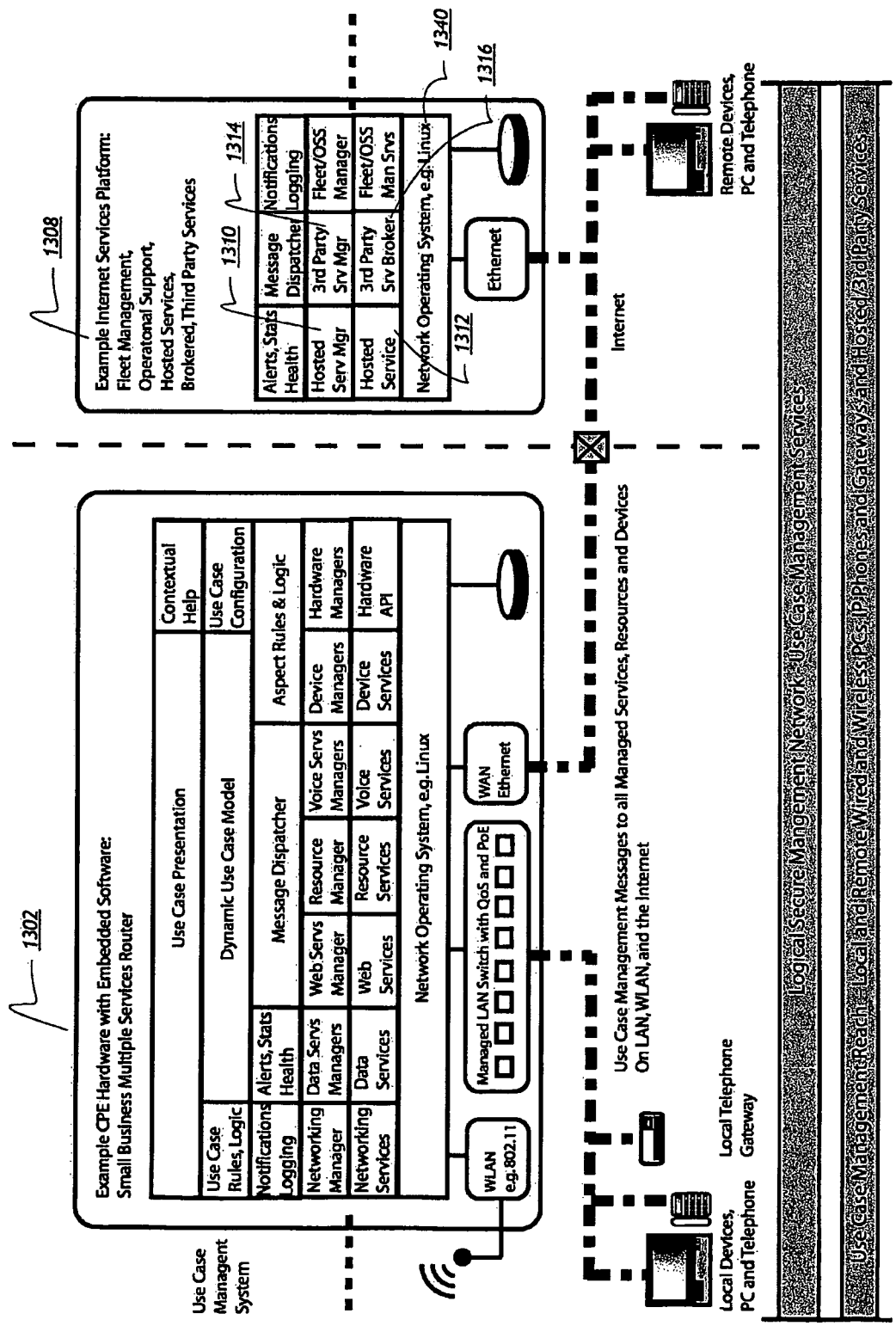
FIG. 13B is system block diagram showing the components that support remote service management in accordance with one embodiment.

FIG. 13B further illustrates the components of the remote manager host 1308 and with an individual use case-based management system 1302 that may be executed on an integrated system management appliance (e.g., a multiple services router). The components of the use case-based management system 1302 are the same as those depicted in the use case-based management system 100 of FIG. 2B, except now the use case-based management system 1302 is shown as interfacing with the remote manager host 1308. To facilitate management of the remote services, a remote service manager (e.g., manager 1310 or 1314) receives generalized system management requests from the use case-based management system 1302 via secure messages such as XML-RPC or SOAP over HTTPS in one preferred embodiment. The manager, be it a hosted service manager 1310 or a brokered (third party) service manager 1314, then translates these requests into the specific management instructions such as configuration file changes and service, resource, or device start, restart, initialize, provision, pause, or stop commands. As services managed by the brokered (third party) service manager 1314 are provided by third parties outside of the remote manage host 1308, these specific management instructions may be forwarded via the service brokers 1316 to these Internet-based services hosted elsewhere. While these operations take place remotely, i.e., remote to the use case-based management system, they are analogous to the operations performed by the local device or service managers as previously described in connection with FIG. 2B.

Other brokered service manager tasks may include the subscription and registration of new managed services and service status and health monitoring. This information is sent to the system status and health component 232 for aggregation, mediation, and processing into reflective changes to the dynamic use case models.

While the brokered service managers can be used to manage any external non-integrated service, one embodiment brings ISP, ASP, and ITSP services that are of significant interest and utility to small businesses into the use case-based management system. Service subscription, configuration, management, and provisioning can be handled through brokered interfaces to a particular ISP, ASP, or ITSP Operational Support System (OSS). In the example embodiment of a multiple services router, an ISP or ITSP service provider or their agents could monitor the health of all of their customers' routers, provide remote technical assistance when necessary, and optionally manage the individual customers' routers. The Fleet Management/OSS components, in one embodiment, are a brokered service to third parties who provide ISP and ITSP connection services. These components translate between the party specific management systems and protocols of the third parties and the generalized system requests of the use case management system.

The security system in the Fleet Management/OSS components 1324 and 1326 requires external management to be granted permission by the end customer before it can manage anything other than the Customer Premises Equipment (CPE) gateway components. For example, an OSS system of an ISP might be allowed to manage and change the ISP connection parameters or the OSS of an ITSP might be allowed to manage and change the ITSP service profile of their service. However, these service providers would not be allowed to reach in arbitrarily and change internal corporate functions or access internal data or voice services including the data that might make up these services. To access more than their service profiles and parameters they would need to be granted further access by the user.

The use case-based management system supports this external management by the sending of a unique temporary security credential to the managing third party (e.g., the ISP or ITSP). In one embodiment, the aspect rules and logic are used in enforcing the security and permissions model needed to support external management. In this case, the OSS is, through the brokered service manager, indirectly generating the generalized system management commands that could, in some circumstances, bypass the use case models. Therefore, the aspect rules and logic are used to enforce permissions from the context of the commands (who generated them and at what permission level), allowing the message dispatcher to enforce the security model. This ensures that these externally generated commands are consistent and not exploitable as a mechanism for malicious attacks.

This remote service management embodiment extends the use case-based management system to manage remote services that may be useful to the non-technical user, but may otherwise be too complicated for the non-technical user to setup and manage without skilled technical assistance. For example, a small business may want to complement the services provided by a multiple services router as described above with a variety of useful services located remotely on the Internet. With the use case-based management system, these remote Internet-based services may be managed as if they were present locally, and the user can interact with familiar interfaces of the use case-based management system and take advantage of the high usability of the use case-based approach.

As shown in FIG. 13B, the managers used for remote services operate on top of a network operating system 1340 that provides standard network protocols. Hence, the specific service, resource, or device service interactions of requests and responses can be transmitted over standard client-server network based protocols.

6.2 Internet-Based Services Pre-Integration and Service Authentication

Where Internet-based services require specific technical service options to be set within the integrated system management appliance, the use case-based management system presents to the user a selection list of a library of pre-integrated services. The user can enable these services by simply selecting them, and associated profiles with technical settings will be loaded. The user can then enter service authentication credentials (e.g. account name and password) previously obtained from the service provider. This selection of services and their library of pre-integrated profiles may be resident on the integrated system management appliance (e.g., multiple services router) or be downloaded from a co-operating server on the Internet.

6.3 Internet-Based Service Brokering

To assist with the account generation and server side provisioning of specific services, the Internet-based service broker 1306 can simplify service application and provisioning for the user. For example, if account information is already largely known to the use case-based management system through other previously collected information in other use case models, such as through the registration steps within the initial setup use case model, it is possible to provide to the third party service provider, with the permission of the user, account and potentially account payment information that simplifies or possibly fully automates service acquisition. In addition, information about the user's local network may be provided by the use case-based management system so that compatible remote services can be configured without the need for the additional input of configuration details from the user.

6.4 Example Remote Services

A number of example remote (hosted and Internet-based) services are described below.

6.4.1 Sub-Domain and Domain Name Registration Services

In one embodiment, the use case-based management system provides a registration page as part of an initial setup use case. One field of that setup use case allows the user to enter the company name. As part of the system setup, or alternatively at another time, the entered company name is used to interrogate a dynamic domain name service (Dynamic DNS) of the domain hosting the remote manager host 1308 for available sub-domains (e.g., companyname.hostdomain.com) under host domain's control. These sub-domains are then offered to the user as an Internet name for the user's business and for the services offered by the integrated system management appliance (in addition to a numeric public Internet address). Once the user has confirmed the use of a particular name, that name is assigned to the user's public Internet address and services within the Internet's Domain Name Services. Integration of the host domain's Dynamic DNS with the use case-based management system follows the general remote service management methods described above.

This name registration service could be extended to full domain names in addition to sub-domains that are under the exclusive control of the host domain's Dynamic DNS. As these full domains are under third party control, e.g., a top-level domain registrar, the use case-based management system would access the third party's Dynamic DNS through the Internet-based service broker 1316 as previously described. In this case, a sub-domain under the exclusive control of the host domain's Dynamic DNS would still be granted as a temporary domain name to ensure immediate service, while queries are made as to the availability of a top-level domain (e.g., companyname.com) from the appropriate top-level domain registrars for .com, .net, .us, .ca, and other domains. Once the user has selected a domain, the appropriate transaction would be brokered to the top-level domain register and the top-level domain name would be entered into the Internet's Domain Name Services in replacement of or in addition to the automatically granted sub-domain.

6.4.2 Email Seconding Services

Another example of a remote service is an email seconding service. Email seconding services allow for a backup email destination should the primary email server become unavailable to other mail servers on the Internet seeking to deliver email to a domain. The use case-based management system can automatically create an entry in the domain records to point email to a secondary server that will receive email on behalf of a domain should the primary email server (e.g., the email server within the multiple services router) become unavailable for any reason. When the primary email server becomes available again, the secondary server relays the email to the primary email server, ensuring that no mail is returned because of the inability to deliver it. This service can be automatically enabled by the use case-based management system in conjunction with the aforementioned domain services. Alternatively, it can be selectively enabled through management requests as outlined in the general remote service management methods described above.

6.4.3 Internet Telephony Services and Service Profiles

Internet telephony services can either be managed by the use case-based management system as a hosted service or a brokered service. However, it has been the common practice that Customer Premises Equipment (CPE) adapts to the specific registration, authentication, signaling, and voice parameters implemented by the service provider. In contrast, the use case-based management system may store and offer a number of pre-integrated and tested Internet Telephony Service Provider (ITSP) service profiles that the user may select. An Internet telephony service can then be enabled on the integrated system management appliance (e.g., multiple services router) by the user simply entering the service authentication credentials and a minimum of other non-technical parameters supplied by the ITSP when the user's account is obtained.

As an extension of this selection mechanism of ITSP technical setting profiles, the use case-based management system may query an Internet service that provides the profiles in real time and offer them to the user. Once the user selects a particular service, the profiles associated with the selected service are then sent to the use case-based management system and used to set the technical parameters required to enable the service. In another embodiment, where this service is tied to an ITSP brokering service, the use case-based management system provides registration and account information to obtain an account from the ITSP and the enabling authentication credentials on behalf of the user from the selected ITSP. By merging this information with the technical settings in the ITSP profile and replying with this enhanced information, the use case-based management system can further simplify the service enabling process by eliminating the manual entry of the account information.

6.4.4 Enabling Secure Remote Technical Support Services

Enabling secure remote access for technical support services for an integrated system management appliance such as a multiple services router may be a non-trivial problem. While in the preferred embodiment the use case-based management system of such an integrated system management appliance would use secure web technology and therefore be available for remote management, the management of the administrative login credentials that must be shared with various tiers of remote support provided by a service provider, or the installer, reseller, or the manufacturer of the integrated system management appliance remains non-trivial. Complicating this credential management problem is the fact that any communication leg that transits public email is not secure, administrative credentials have wide ranging powers and accessibility, and there can be constant turnover of authorized support personnel within the organizations providing tiered support.

To provide a solution for credential management, the use case-based management system in one embodiment allows the user to enable a temporary credential for System Administrative access. This credential may be set to expire automatically after a specific time period, e.g., 24 hours or one week, if the user forgets to do so. This credential in encrypted form is passed to the appropriate tier of technical support either through email directly to the support person or through the services of an intermediary Internet service (in one embodiment as part of the same multiple services router support services that provide software update, dynamic DNS, and other services).

The encrypted credential can then be retrieved from the intermediary service by the appropriate tier of technical support by logging into their account on this intermediary service or by having it manually or automatically emailed or otherwise transmitted to them while still in the encrypted form.

To ensure the credential is secure, the credential in one embodiment is not a simple password but a cryptographic key and cannot be used by anyone other than the appropriate tier of technical support personnel who holds the multiple master secrets. In one embodiment, the credential is generated by combining multiple master secrets, a random number, and the serial number of the use case-based management system. The cryptographic key is generated randomly and combined with a master secret key that is appropriate to each tier of technical support as obtained from the intermediary service over the Internet and communicated through a secure channel. Although there is a slight chance that two instances of the key generation algorithm on different integrated system management appliances could generate the same seed for the key, this chance is further reduced as the unit serial number of the integrated system management appliance or use case-based management system is also factored into the key generation.

Having a different master secret key for each technical support tier means that the final login passwords are unique for each tier for a given remote support activation on a given integrated system management appliance. For example, this multiple combination with different master secret keys could provide unique different access privileges for Tier 1 customer support commonly provided by third parties and manufacturer support provided by the manufacturer of the integrated system management appliance. For example, Tier 1 customer support may only be granted access to the use case-based management system with its administrative functions, while the manufacturer may be able to additionally have lower level secure operating system access in order to explore any issues not fully addressed by Tier 1 support at a deeper level. This approach can be arbitrarily extended to N tiers of support.

To guard against issues where the master secrets may be obtained by some clandestine method, these master secrets may be changed via software updates or update requests to the same intermediary support services that provide other support services to the integrated system management appliance.

In one embodiment, this key, when combined with unit serial number of the integrated system management appliance (e.g., multiple services router) and the master secret in a cryptographic manner (using a keyed-Hash Message Authentication Code (HMAC) or other appropriate cryptographic method), produces a temporary login password for a known user account with administrative privileges for the original integrated system management appliance where the user enabled temporary technical support to that integrated system management appliance.

One embodiment of the use case-based management system provides centralized logging where all use case management requests are logged centrally regardless of the individual who makes the requests. This centralized logging allows a unified historical view of the management changes to a system. The use case-based management system provides a mechanism for emailing these logs to a technical support person providing remote assistance if the person is unable to access these logs.

6.4.4.1 Process for Enabling Secure Remote Technical Support Services

Figure 14:
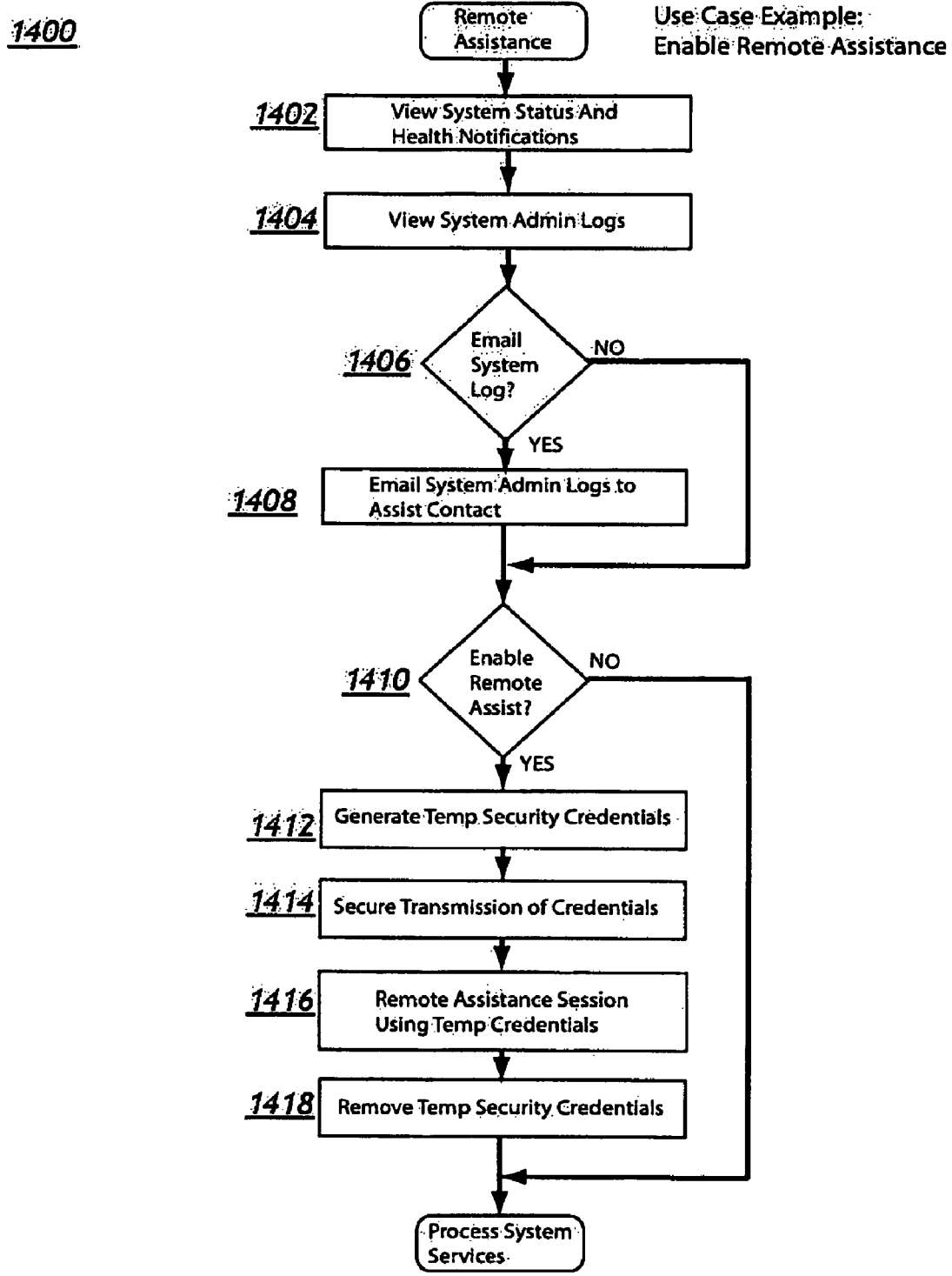
FIG. 14 is flow diagram showing the use case process for enabling remote technical assistance according to one embodiment.
Figure 15:
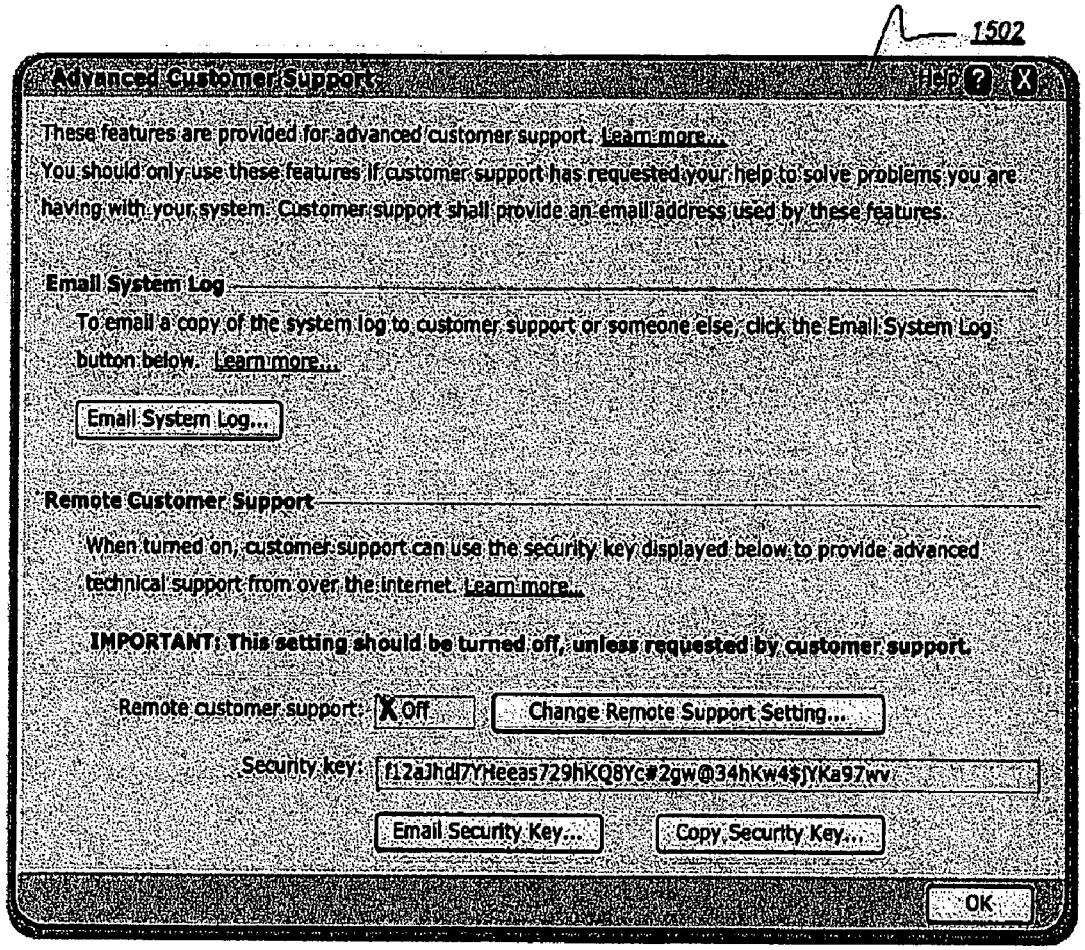
FIG. 15 illustrates example user interfaces for the remote technical assistance use case according to one embodiment.
Figure 15:
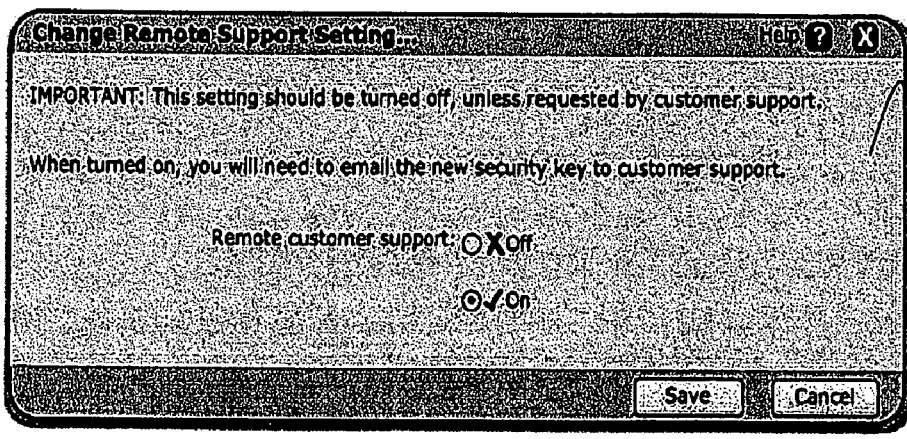

FIG. 14 illustrates the logic flow for resolving technical issues with an integrated system management appliance. At state 1402, system status and health notifications may be viewed. Then at state 1404, system administrative logs may be viewed. If the logs are determined at state 1406 to be needed for assisting technical support, the system logs may be emailed at state 1408. Optionally, at state 1410 a determination is made as to whether remote assistance should be enabled for technical support personnel to resolve the issues at hand. If so, at state 1412 temporary security credentials are generated and at state 1414 the generated security credentials are securely transmitted to the technical support personnel. The technical support personnel may then use the temporary credentials to access the integrated system management appliance at state 1416 to attempt to resolve the technical issues. After a certain time period, at state 1418 the temporary credentials will expire and will no longer allow access to the integrated system management appliance. FIG. 15 shows two example user interfaces 1502 and 1504 for sending system logs and enabling remote technical support in the manner described above.

6.5 Updating the System

In one embodiment, the use case-based management system may support mechanisms for receiving or retrieving automatic updates to itself, the underlying integrated system management appliance, or other attached devices or services. Updates can include any software or firmware modules used in the system, regardless of whether that software executes on the integrated system management appliance or another managed device. For example, updates to IP Telephone firmware may be required to match a PBX service software update and ensure proper operation of the managed telephone system.

Figure 16:
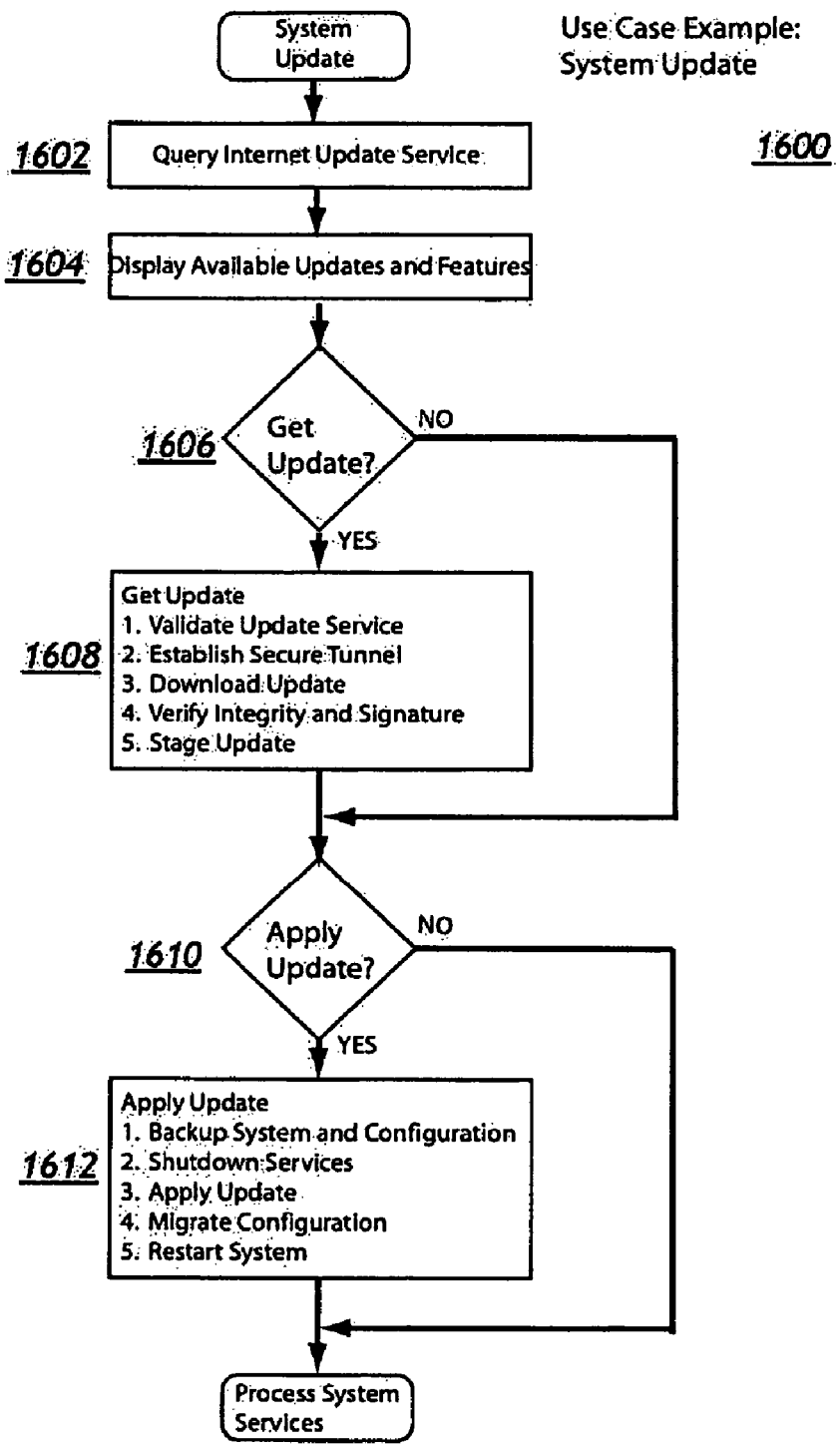
FIG. 16 is flow diagram showing the use case process for enabling remote system update according to one embodiment.

With the use case-based management system, the technical details involved with the updates are hidden from the non-technical user. For example, managed device firmware updates for the IP telephones are packaged along with PBX software and other services in a single update package so the user is not required to look for them individually. FIG. 16 illustrates the logic flow of the system update use case. At state 1602, the use case-based management system queries the Internet update service to determine whether there are available updates and new features. At state 1604, any available updates and new features are displayed to the user. If the user elects to obtain the update, then at state 1408 the use case-based management system begins the get update process. The process involves (1) validating the update service, (2) establishing a secure channel, (3) downloading the update, (4) verifying the integrity and signature of the update, and (5) staging the update. If the user decides to apply the update at state 1410, then the use case-based management system proceeds to apply the update by (1) backing up the existing configuration of the system, (2) shutting down services, (3) applying the update, (4) migrating the configuration, and (5) restarting the system.

The use case management system can update the configuration of a specific device by issuing a reconfigure or restart command to a specific device or service. For example should the user edit their personal workspace to add and additional telephone to their workspace or edit parameters to change the label on their telephone or other such preference, the IP telephone will be restarted or re-provisioned without a system wide restart. Another example would be if the health monitoring of the system services were to detect a telephony or other service malfunction, the use case management system would attempt to repair service by restarting just the affected service. A system-wide restart would only be attempted only if this limited restart was not successful. The use case management system limits the scope of such restarts or re-provisioning commands to just those services, resources, and devices that require the restart to alter their services to be consistent with the use case model.

Should internal data structures of the workspace databases change between the previous system and the updated system, the use case-based management system can apply correct migration rules between the configuration of the previous system and that of the updated system.

6.6 Other Example Internet-Based Services

By extension, a number of other Internet services can also be enabled using the remote service management methods specified above. These methods allow the use case-based management system support a wide variety of special purpose and general third-party Internet-based services including:
Internet File Services
Internet Backup Services
Email Ingress and Egress Spam and -virus Services
Blackberry and Mobile Device Email and SMS Services
Paging Services
Hosted Email Relay Services
Security Certificate Services
Software Update Services

7 CONCLUSION

All of the processes described above may be embodied in, and fully automated via, software code modules executed by one or more general purpose computers. The code modules may be stored in any type of computer-readable medium or other computer storage device. Some of all of the methods may alternatively be embodied in specialized computer hardware. In addition, the components referred to herein may be implemented in hardware, software, firmware, or a combination thereof.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

One skilled in the relevant art will appreciate that the methods and systems described above may be implemented by one or more computing devices, such as a memory for storing computer executable components for implementing the processes shown, as well as a process unit for executing such components. It will further be appreciated that the data and/or components described above may be stored on a computer readable medium and loaded into memory of computer device using a drive mechanism associated with a computer readable storing the computer executable components such as a CD-ROM, DVD-ROM, or network interface. Further, the component and/or data can be included in a single device or distributed in any manner.

Although the foregoing system has been described in terms of certain embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein.

The invention claimed is:

1. A system for providing integrated voice and data services to a business, the system comprising:
a plurality of integrated services routers, each integrated services router locally connected to a respective set of user devices and to a network, each integrated services router configured to provide at least telephone, email, and file sharing services to user devices, and configured to provide shared workspaces for managing user access to services and associated resources, at least one of the integrated services routers including an embedded wireless access point; and
a remote manager host that is coupled via said network to each of the plurality of integrated services routers, said remote manager host providing access to additional services that are not implemented by the integrated services routers, said additional services including a health monitoring service that enables a health of the plurality of integrated services routers to be remotely monitored.

2. The system of claim 1, wherein the additional services further include a domain name registration service.

3. The system of claim 1, wherein the additional services further include an email seconding service that provides a backup email destination when an email server within an integrated services router becomes unavailable.

4. The system of claim 1, wherein the additional services further include a fleet management service that enables the plurality of integrated services routers to be remotely configured via a secure connection.

5. The system of claim 1, wherein the additional services further include an update service that provides software updates to the integrated services routers.

6. The system of claim 1, wherein the remote manager host provides the integrated service routers access to (1) at least one hosted service hosted by the remote manager host, and (2) at least one brokered service provided by a third party service provider.

7. The system of claim 1, wherein at least one of the integrated services routers is configured to implement a shared workspace that defines a call flow for processing incoming calls to an organization, said call flow specifying multiple successive destinations for routing an incoming call when the call is unanswered.

8. The system of claim 1, wherein at least one of the integrated services routers is configured to implement a shared workspace that provides a defined group of individuals with shared access to files, email accounts and voice services.

9. The system of claim 1, wherein the integrated services routers are additionally configured to implement personal workspaces that are personal to respective users.

10. The system of claim 1, wherein each integrated services router is configured to connect to and manage a respective group of telephonic devices and computing devices.

11. A system for providing integrated voice and data services within a business organization, the system comprising:
a plurality of integrated services routers, each integrated services router configured to be connected to a respective set of user devices and to a network, each integrated services router configured to provide at least telephone, email, and file sharing services to user devices, and configured to provide shared workspaces for managing user access to services and associated resources, at least one of the integrated services routers including an embedded wireless access point; and
a remote manager host configured to connect via said network to each of the plurality of integrated services routers and to provide access to additional services that are not implemented by the integrated services routers, said additional services including at least one of the following: (a) a health monitoring service that enables a health of the plurality of integrated services routers to be remotely monitored, (b) an email seconding service that provides a backup email destination when an email server within an integrated services router becomes unavailable, (c) a domain name registration service, (d) a management service that enables the plurality of integrated services routers to be remotely configured via a secure connection.

12. The system of claim 11, wherein the additional services include a health monitoring service that enables a health of the plurality of integrated services routers to be remotely monitored.

13. The system of claim 11, wherein the additional services include an email seconding service that provides a backup email destination when an email server within an integrated services router becomes unavailable.

14. The system of claim 11, wherein the additional services include a domain name registration service.

15. The system of claim 11, wherein the additional services include a management service that enables the plurality of integrated services routers to be remotely configured via a secure connection.

16. The system of claim 11, wherein at least one of the integrated services routers is configured to implement a shared workspace that defines a call flow for processing incoming calls, said call flow specifying multiple successive destinations for routing an incoming call when the call is unanswered.

* * * * *